United States Patent
Libori et al.

(10) Patent No.: US 7,174,078 B2
(45) Date of Patent: Feb. 6, 2007

(54) DUAL CORE PHOTONIC CRYSTAL FIBERS (PCF) WITH SPECIAL DISPERSION PROPERTIES

(75) Inventors: Stig Eigil Barkou Libori, Soborg (DK); Jes Broeng, Birkerød (DK); Anders Bjarklev, Roskilde (DK); Niels Asger Mortensen, Charlottenlund (DK); Jacob Riis Folkenberg, Kokkedal (DK)

(73) Assignee: Crystal Fibre A/S, Birkerod (DK)

( * ) Notice: Subject to any disclaimer, the term of this patent is extended or adjusted under 35 U.S.C. 154(b) by 198 days.

(21) Appl. No.: 10/474,030

(22) PCT Filed: Apr. 11, 2002

(86) PCT No.: PCT/DK02/00245

§ 371 (c)(1),
(2), (4) Date: Aug. 26, 2004

(87) PCT Pub. No.: WO02/084350

PCT Pub. Date: Oct. 24, 2002

(65) Prior Publication Data

US 2005/0069269 A1    Mar. 31, 2005

(30) Foreign Application Priority Data

| Apr. 11, 2001 | (DK) | 2001 00609 |
| May 5, 2001 | (DK) | 2001 00701 |
| Nov. 16, 2001 | (DK) | 2001 01709 |
| Feb. 13, 2002 | (DK) | 2002 00219 |

(51) Int. Cl.
G02B 6/02 (2006.01)
G02B 6/32 (2006.01)
G02B 6/28 (2006.01)
G02B 6/36 (2006.01)
G02B 6/00 (2006.01)

(52) U.S. Cl. ............... 385/125; 385/123; 385/124; 385/126; 385/127; 385/128; 385/141; 385/142; 385/143; 385/144; 385/145

(58) Field of Classification Search ........ 385/123–128, 385/141–145
See application file for complete search history.

(56) References Cited

U.S. PATENT DOCUMENTS

| 5,568,583 A | 10/1996 | Akasaka et al. | 385/123 |
| 5,802,236 A | 9/1998 | DiGiovanni et al. | 385/127 |
| 2002/0061176 A1 | 5/2002 | Libori et al. | 385/125 |
| 2004/0052484 A1* | 3/2004 | Broeng et al. | 385/125 |
| 2004/0071423 A1 | 4/2004 | Libori et al. | 385/127 |

FOREIGN PATENT DOCUMENTS

| EP | 0905834 | 3/1999 |
| EP | 1118887 | 7/2001 |
| WO | 99/64903 | 12/1999 |
| WO | 99/64904 | 12/1999 |
| WO | 00/06506 | 2/2000 |
| WO | 00/16141 | 3/2000 |
| WO | 00/49436 | 8/2000 |
| WO | 00/60390 | 10/2000 |
| WO | 00/65386 | 11/2000 |
| WO | 01/42829 | 6/2001 |
| WO | 01/63328 | 8/2001 |
| WO | 01/98819 | 12/2001 |

OTHER PUBLICATIONS

"Novel Design of a Dispersion Compensating Fiber", K. Thyagarajan et al, IEEE Photonics Technology Letters, vol. 8, No. 11, Nov. 1996.
1800 ps/ (nm.km) chromatic dispersion at 1.55μm in dual concentric core fibre, Electronics Letters, Sep. 2000, vol. 36, No. 20.

* cited by examiner

*Primary Examiner*—Brian Healy
*Assistant Examiner*—Jerry Martin Blevins
(74) *Attorney, Agent, or Firm*—Jacobson Holman PLLC

(57) ABSTRACT

An optical fiber for transmitting light, said optical fiber having an axial direction and a cross section perpendicular to said axial direction, said optical fiber comprising: (1) a first core region comprising a first core material having a refractive index $N_{co,1}$; (2) a microstructured first cladding region surrounding the first core region, said first cladding region comprising a first cladding material and a plurality of spaced apart first cladding features or elements that are elongated in the fiber axial direction and disposed in the first cladding material, said first cladding material having a refractive index $N_{cl,1}$ and each said first cladding feature or element having a refractive index being lower than $N_{cl,1}$, whereby a resultant geometrical index $N_{ge,cl,1}$ of the first cladding region is lowered compared to $N_{cl,1}$; (3) a second core region surrounding said first cladding region, said second core region comprising a second core material having a refractive index $N_{co,2}$, and (4) a second cladding region surrounding the second core region, said second cladding region comprising a second cladding material having a refractive index $N_{cl,2}$, wherein the first core material, the first cladding material and the first cladding features, the second core material, and the second cladding material are selected and arranged so that $N_{co,1} > N_{ge,cl,1}$, $N_{co,2} > N_{ge,cl,1}$, and $N_{co,2} > N_{cl,2}$.

124 Claims, 38 Drawing Sheets

$R_1/R = 28.0/13.88$
$d/R = (19.01-13.88)/3.88$ $R_1/R = 4$
$d/R = (19.01-13.88)/13.88$

DUAL CORE PHOTONIC CRYSTAL FIBERS (PCF) WITH SPECIAL DISPERSION PROPERTIES

This is a nationalization of PCT/DK02/00245 filed Apr. 11, 2002 and published in English.

BACKGROUND OF THE INVENTION

The present invention relates to new designs of microstructured fibers providing improvements with respect to dispersion compensation (including dispersion slope compensation) for fiber optical communication systems and with respect to non-linear optical fibers for applications at near-infrared wavelengths.

THE TECHNICAL FIELD

The development of optical amplifiers operating in the 1550 nm wavelength band of optical communication has during the past ten years formed the basis for a tremendous development of wavelength division multiplexed optical communication systems typically operating in the wavelength interval from 1530 nm to 1610 nm—and rapidly expanding. These amplifiers have to a large degree removed the loss limitations of the optical communication links, and have paved the way for much longer transmission spans operating at significantly higher transmission bit rates (having a much higher transmission capacity). At the same time the development of optical fiber amplifiers at first had the result that systems originally developed to operate in the 1310 nm wavelength band could be upgraded to the 1550 nm band with significant advantages—provided that the dispersion limitations of these systems could be compensated in an efficient manner.

To provide a picture of the possibilities and needs for dispersion compensation, it may be noted that when the bit rate is increased to 10 Gbit/s, the dispersion limits the transmission to around 50 km, which obviously raises the need for some sort of dispersion compensation. As described by Grüner-Nielsen et al., ECOC'2000, pp.91–94, non-zero dispersion fibers (NZDF) seems to be the choice for future communication systems due to their low-dispersion and low-non-linear penalties. For bit-rates of 10 Gbit/s NZDFs will not need dispersion compensation before some hundred kilometres of transmission. However, in the future, when the bit rate increases to 40 Gbit/s, dispersion compensation will be needed already after approximately 5 kilometres for non-shifted fibers and after around 30 kilometres when NZDFs are used.

It is noteworthy that today several different types of optical transmission fibre are installed with various dispersion properties. However, still a significant part of the installed optical fiber cables make use of non-shifted single-mode fibers, i.e. optical fibres with zero dispersion wavelength at 1310 nm and a dispersion of about 17 ps/km/nm at the wavelength of 1550 nm. The most established dispersion-compensation method today is the use of dispersion compensating fibers (DCFs) operating in the single-mode regime. The use of dispersion compensating fibers was proposed by Lin, Kogelnik, and Cohen, Optics Letters, Vol.5, pp.476–478, 1980.

The first DCFs were step index fibers, where the zero dispersion wavelength was moved to wavelengths above 1550 nm by increasing the core index and narrowing the core diameter (see Onishi et al., Electronics Letters, Vol. 30, pp. 161–163, 1994, and Bjarklev et al., Optics Letters, Vol.19, pp. 62–64, 1994). These relatively simple fiber designs allow for control of the dispersion value at a given wavelength, but they do generally not provide the possibility of simultaneous control of the dispersion slope value.

It could be argued that one of the ultimate limits for the dispersion compensating properties of this simple step index fiber design may be obtained for a very thin rod of a high index material placed in vacuum (the low-index cladding). At this point it is relevant to refer to the recent development within the area of fiber optics, where a large interest has been pointed towards so-called microstructured fibers, also known as photonic crystal fibers, photonic band gap fibers, hole-assisted fibres and holey fibers. These are fibers providing a number of new properties that are of interest to a wide range of areas such as optical communications, sensor technology, spectroscopy, and medicine (see e.g. Broeng et al., Optical Fiber Technology, Vol. 5, pp. 305–330, 1999; Broeng et al., Optics Communications, Vol. 156, pp. 240–244, 1998; Broeng et al, Optics Letters, Vol. 25, pp. 96–98, 2000; WO 99/64903; WO 99/64904; WO 00/60390; Birks et al., Electronics Letters, Vol.31, pp.1941–1943, October 1995; Knight et al., Journal of the Optical Society of America, A., Vol.15, pp.748–752, March 1998; Knight et al., Optical Materials Vol. 11, pp. 143–151, 1999; U.S. Pat. No. 5,802,236; Monro et al., Journal of Lightwave Technology, Vol. 17, pp. 1093–1102, 1999; Ferrando et al., Optics Letters, Vol. 24, pp. 276–278, 1999; WO 00/06506). The fibres are characterized by having a core surrounded by thin, parallel, voids/holes in a background material. The background material is most often a single material such as e.g. silica glass, and the voids/holes commonly contain air or vacuum, but they may also be filled with other glass materials, polymers, liquids, or gasses.

Depending on the application, the voids/holes may be periodically or randomly distributed, or they may be distributed in specially designed arrangements incorporating both periodic and non-periodic regions (see e.g. WO 99/64903; WO 99/64904; WO 00/60390; U.S. Pat. No. 5,802,236, Monro et al., Optics Letters, Vol. 25, pp. 206–208, 2000). Now returning to the picture of a single rod of high-index material placed in vacuum, it should be noted that Birks et al. (in IEEE Photonics Technology Letters, Vol.11, pp. 674–676, 1999) argued that properties of photonic crystal fibers (PCFs) could be modelled by a silica rod in air. Such approximate calculations indicated that the dispersion of PCFs could exceed −2000 ps/km/nm—or they could compensate (to within + or −0.2%) of the dispersion of 35 times their length of standard fiber over a 100 nm wavelength range.

As already mentioned, it is a disadvantage of the step-index fibers that they cannot perform simultaneous compensation of dispersion and dispersion slope, and it is a further disadvantage that very high index contrasts are needed (either obtained through high co-dopant levels or by placing single rods in air). The high-index contrast step-index fibers also have to be designed with very narrow core dimensions in order for the fibers to be single-moded. Regarding non-linearity, this is a further disadvantage especially for systems operating at 40 Gb/s or higher.

After now having discussed the simplest approach of obtaining dispersion compensation in standard optical fibers and in photonic crystal fibers, it is useful to look at the further development of standard technology DCFs. As we already have mentioned, one of the key limitations to the simple step-index design was the lack of simultaneous control of dispersion and dispersion slope. One may argue that this limitation simply is due to a quite limited number of design parameters (for a step-index fiber only the core-cladding refractive index difference and the core radius may be selected). The approach in obtaining more design flexibility dates back to the early days of standard fiber technology, and dispersion modification techniques were already studied in the early 1980'ies (see e.g., Monerie, IEEE Journal of Quantum Electronics, Vol.18, pp.535–542, 1982), where double-clad designs (also known as W-fibers) were evaluated. Fibers of this double-clad type also have equivalents realised by photonic crystal fiber technology, and these microstructured fibers have also been explored for dispersion compensating applications. The first microstructured fibers for such applications were disclosed by DiGiovanni et al. (see EP 0 810 453 and U.S. Pat. No. 5,802,236). DiGiovanni et al. discussed how microstructured fibers with a cladding divided into two regions could provide improved dispersion characteristics compared to conventional fibers. DiGiovanni et al. used microstructured fibers with an inner, microstructured cladding region having a lower effective refractive index compared to an outer, microstructured cladding region to obtain a dispersion of more than −1500 ps/nm/km.

The fibers disclosed by DiGiovanni et al. comprise a single core region (preferably in the centre of the fiber), and it is stated in U.S. Pat. No. 5,802,236 that "In general, the microstructure cladding features should be disposed such that the cladding region does not contain any matrix regions of extend in the x-y plane sufficient to act as a secondary core, i.e. to support a propagating radiation mode". The present inventors have, however, realised that it is advantageous to design microstructured fibres that have at least one region that can support one or more propagating modes other than the mode(s) supported in the central core region. Hence, such a region (that has larger dimensions than the central core and an effective refractive index higher than $(N_o+N_c)/2$, where $N_o$ is the core refractive index and $N_c$ is the effective refractive index of the cladding) that may act as a second core is preferred. In fact, the present inventors have realized that coupling between a mode in the central core region and a mode in the second core is highly advantageous for microstructured optical fibers with special dispersion properties. It is further important to notice that the fiber may be operated to guide light only in a single of the cores—preferably the central core. This desired mechanism may also be described as avoided "crossing" of the core modes, as shall be discussed at a later stage in the detailed description of the invention.

It should at this point be noted that strong dispersion compensation generally is obtained by spectrally shifting the effective refractive index of the guided mode(s). This requires refractive index profile control on a sub-wavelength scale, and the effect is closely related to the spatial redistribution of the optical mode as a function of wavelength. When this spatial redistribution of the guided mode takes place in a W-fiber design, the guided mode shifts (for increasing wavelengths) from the high index core to the cladding. This is an effect that generally ties the dispersion compensating effect strongly together with a strong leakage loss and macro bending loss sensitivity very near the desired wavelength for dispersion compensation. Consequently, W-designs have to be made for an extremely narrow selection of production parameters, and this fiber design, therefore, becomes less attractive than designs, where the spatial distribution of optical power is shifted within guided regions of the fiber core. This is also the reason why standard fiber technology generally utilises triple-cladding designs for dispersion compensation (see e.g., Vengsarkar et al., OFC'93, San Jose, USA, Feb. 21–26, 1993, Post deadline paper PD13; Antos, and Smith, IEEE Journal of Lightwave Technology; vol.12, pp. 1739–1745, 1994; Vengsarkar et al., OFC'94, paper ThK2, pp. 222–227, 1994; Onishi et al., ECOC'94, pp.681–684,1994; Akasaka et al., OFC'96, paper ThA3, pp. 201–202,1996). These designs have several advantages over the step index design—among others is negative dispersion slope to provide partly or full dispersion slope compensation.

Using standard fiber technology, triple-cladding designs have a narrow high-delta core (i.e. highly doped to obtain a large refractive index difference compared to pure silica) surrounded by a deeply depressed cladding followed by a raised cladding (we here mention the different elements in an order starting at the centre of the fiber cross-section and stepping outwards in radial direction). The third cladding layer is generally made of pure silica. It should also be noted that in order to suppress higher-order mode guidance (lowering the cut-off wavelength of the DCF) an additional depressed cladding layer is often introduced between the raised cladding layer and the outermost cladding. However, for simplicity (and because its influence on the fundamental mode properties often are limited) this fourth cladding layer is often not discussed in large detail.

As we have discussed with the more simple standard fiber designs, also triple-cladding design equivalents using microstructured—or PCF—technology have been considered by Fajardo et al. WO 00/16141. Fajardo et al. describe an optical waveguide in which the density and thus the effective refractive indices of the cladding layer is caused to change in a pre-selected way axially along the fiber. The axial change in density of the cladding layer is due to the fraction of the cladding volume that is air or a glass composition different from that of the base cladding glass. Fajardo et al. argue that the axial variation in clad indices changes the signal mode power distribution, thereby changing key waveguide fiber parameters such as magnitude and sign of dispersion, cut-off wavelength and zero dispersion wavelength along the fiber length.

It is a disadvantage of the dispersion compensating fibers using standard fiber fabrication techniques (i.e., fibers fabricated from doped silica) that limited dopant levels (given by internal stress, material deposition efficiencies etc.) does not provide as large (negative) dispersion values as other competing techniques. It is a further disadvantage that standard single-mode DCFs typically have significantly smaller spotsize values than the transmission fibers, whose dispersion they are to compensate. The spotsize mismatch generally leads to significant coupling losses, and/or complicated splicing techniques including intermediate fibers, special techniques of material diffusion control etc.

When a DCF is used for discrete compensation at the terminal sites, one of the drawbacks of DCFs is that the total link attenuation is increased. The added attenuation must be compensated with additional gain in amplifiers, which degrades the signal-to-noise ratio and increases the cost of the system. To minimise this problem, the DCF should have as high a negative dispersion, $D_{DCF}$, as possible and as low attenuation, $\alpha_{DCF}$, as possible. Therefore, a figure of merit (FOM) for dispersion compensating fibers may be defined as the numerical value of $D_{DCF}/\alpha_{DCF}$. Typical FOM values of presently employed DCFs is around 200 ps/nm/dB, where the attenuation is around 0.5 dB/km and the dispersion is around −100 ps/nm/km. Hence, for a fiber according to the present invention providing a dispersion of −400 ps/nm/km or more negative, loss issues are less restricting than for conventional DCFs—or DCFs according to the present invention may provide higher FOM for similar loss levels. For a dispersion compensating fiber according to the present invention that provides for example a dispersion of −1000 ps/nm/km or more negative, an improved FOM may be achieved for fiber attenuation of up to 5 dB/km compared to conventional DCFs.

It should be noted that dispersion compensating fibers fabricated in large-scale production using standard fiber technology normally are designed to have a dispersion of about −100 ps/km/nm at the wavelength of 1550 nm—and having FOM in the order of 200 ps/nm/dB (see e.g., Grüner-Nielsen et al. ECOC'2000, Munich, pp. 91–94). However, more negative dispersion values may be obtained—still having good FOM values, and as an example the work of Knudsen et al., LEOS'2000 annual meeting, Paper TuZ2, pp.338–339 may be mentioned. This works demonstrated a dispersion of −190 ps/km/nm for a FOM of 307 ps/nm/dB at 1550 nm.

Considering the background of dispersion compensation through the use of specially designed fibers it also becomes relevant to examine the dispersion compensating fibers described by Thyagarajan et al., IEEE Photonics Technology Letters, Vol.8, pp. 1510–1512, 1996. In this letter, Thyagarajan et al. describe how very large negative dispersion values (as low as −5100 ps/km/nm) are predicted for fibers consisting of two concentric cores. The desired dispersion compensation is obtained using a centrally placed high-index core (from 2–2.5% relative refractive index difference) and a ring shaped core, chosen independently so that each of the cores supports a single azimuthally symmetric propagating mode at a wavelength of 1550 nm. The idea described by Thyagarajan et al. is that the two-core fiber design then will support two azimuthally symmetric modes (similar to two so-called super modes of a directional coupler), and that these modes are nearly phase matched at 1550 nm. Close to this phase matching wavelength, the mode index of the composite core fiber changes rapidly due to a strong coupling between the two individual modes of the inner core and outer core. Due to a strong refractive index asymmetry between the two cores, there is a rapid change in the slope of the wavelength variation of the fundamental mode index (of the composite structure) leading to a large dispersion around 1550 nm. A fiber of this dual concentric core type has been fabricated, and dispersion results as low as −1800 ps/km/nm at the wavelength of 1550 nm has recently been presented by Auguste et al., IEE Electronics Letters, Vol. 36, pp. 1689–1691, 2000. Also in this work the functionality of the fiber is described through the coupling between two super modes—one of the super modes having a large negative dispersion and the other having a large positive dispersion—and light being guided through the fiber only in the super mode having negative dispersion. Note also that fibers of this type has been further described by Auguste et al., Optics Communications, Vol. 178, pp. 71–77, 2000, where the influence of a central dip—generally present in fibers fabricated by the modified chemical vapour deposition (MCVD) method—is studied and demonstrated to be of importance. Considering these dual concentric core fiber designs, it is important to note that the fiber propagation properties also may be interpreted by a more ordinary mode description using linearly polarised (LP) modes in optical fibers. If we look at the dual concentric core designs from this point of view, we find that the $LP_{01}$ mode (representing one of the previously mentioned super modes) shows a strong negative dispersion. At the same time, the $LP_{02}$ mode (representing the other of the previously mentioned super modes) shows a strong positive dispersion, and more important—the fiber supports guidance of the $LP_{02}$-mode. Looking closer at the fiber designs presented by Thyagarajan et al., one also finds that the $LP_{11}$ mode is strongly guided by the fiber structure.

It may be a disadvantage of the dual concentric core designs fabricated by standard fiber technology that the fibers strongly guide several modes. It is a further disadvantage of the dual concentric core designs fabricated by standard fiber technology that very high co-dopant concentrations generally are needed, since it may result in highly increased fiber attenuation, and moreover, it is difficult to maintain a homogeneous, and reproducible dopant level. The latter issue is indicated by Auguste et al. (Optics Communications, Vol. 178, pp. 71–77, 2000), where it is described how the well known central index dip in MCVD fabricated fibers may introduce strong variations in the spectral location of the dispersion peak (more than 100 nm shifting was reported). It is yet a further disadvantage of the standard technology dual concentric core fibers that the limited index contrast in doped glass technology makes it necessary to operate with ring shaped cores of rather wide outer radii (fibers presented by Thyagarajan et al. and Auguste et al. have radii of the outermost core near 20 microns). This leads to a strongly spatially extended fundamental mode field for wavelengths above 1550 nm, which eventually may result in significant macro-bending sensitivity.

High dopant levels are not necessary in PCFs, because index contrast may be obtained through microstructuring. Therefore, the parameter sensitivity may be reduced, and fibers with different guiding properties between the guided and higher order modes may be obtained (mode discrimination is possible).

Through a wider range of design possibilities using PCF technology, we may solve the bending loss problem, and at the same time obtain a larger negative dispersion.

It is an object of the present invention to provide improved designs and design parameters for microstructured fibers employed for dispersion compensating applications (including dispersion slope compensation). The improvements relates to strong dispersion, control of dispersion slope, low bending losses, large mode-field diameters, lower sensitivity on parameter fluctuations—allowing better reproducibility compared to prior art fibers, and lower requirements on doping levels of silica.

Photonic crystal fibres (PCFs) having multiple cladding layers have been described by Hasegawa et al. in EP 1 118 887 A2. Hasegawa et al. claim an optical fiber including a core region and cladding regions of not less than three layers, which surround the core region in order, wherein at least one of the cladding regions has lower mean refractive index than both adjacent cladding regions, and at least one cladding region is provided with a plurality of sub medium regions each having a refractive index lower than a main medium constituting this cladding region.

The present inventors have, however, realised that it is advantageous to design microstructured fibers that have at least one region that can support one or more propagating modes other than the mode(s) supported in the central core region.

It is a disadvantage of the fibers described by Hasegawa et al. that they do not include such a region that may act as a core in its own right supporting a propagating mode, since it may limit the possible magnitude of the obtainable dispersion.

Furthermore, the present inventors have realised that it may be advantageous not to have a cladding region with a lower effective refractive index than two adjacent cladding regions. In fact the present inventors have realised that it is an advantage to have a region with a higher effective refractive index than two adjacent cladding—such a region is here termed "second core".

The fibres disclosed by Hasegawa et al. exhibit a negative dispersion of around −200 ps/km/nm, whereas the microstructured fibers disclosed by the present inventors provides negative dispersion in excess of −10000 ps/nm/km.

In the patent application by Hasegawa et al., it is given that the mean refractive index $n_3$ of the outer cladding region obeys the relation $n_2 > n_3$, where $n_2$ is the refractive index of the second inner cladding. Hasegawa et al. obtains this relation by incorporating low-index features in cladding region 3. This is in contrast to a number of preferred embodiments of the present invention, where the outer cladding consists of a homogeneous material.

SUMMARY OF THE INVENTION

In a first aspect, the present invention relates to an optical fiber having an axial direction and a cross section perpendicular to said axial direction.

The optical fiber has negative dispersion in the vicinity of a predetermined wavelength. The optical fiber is characterised by a number of regions:

1) a first core region being positioned substantially in a center of the optical fiber, the first core region comprising a first core material of refractive index, $N_{co,1}$. In the present context, "positioned substantially" means that it is desired to have the first core placed in the center, but manners of production may introduce minor structural deviations such that a center of the first core region and a center of the whole optical fiber may not coincide. Also, the optical fiber may have a non-circular outer shape in the cross section, making the definition of a center of the optical fiber less stringent. In the case of a non-circular outer shape, the center is determined as the center-of-gravity of a two-dimensional element with the same outer shape as the optical fiber.

2) a first cladding region surrounding the first core region, the first cladding region comprises a multiplicity of spaced apart first cladding features that are elongated in the axial direction and disposed in the first cladding material, said first cladding material having a refractive index $N_{cl,1}$;

3) a second core region surrounding the first cladding region, the second core region comprising a second core material of refractive index, $N_{co,2}$, and the second core region having a substantially annular shape in the cross section. Since the interface between the inner cladding and the outer core may be an interface where at least on one side there is a microstructure (the inner cladding region), the interface may not necessarily be seen as a smooth interface (e.g. in the case of the two regions having identical background refractive indices). Therefore, the shape of the outer core region may not necessarily be a viewed as a smooth ring-like shape—hence the wording "substantially annular shape";

4) a second cladding region surrounding the second core region, the second cladding region comprising a second cladding material of refractive index, $N_{cl,2}$, and the second cladding region having a substantially annular shape in the cross section. In the present context, the wording "substantially annular shape" is used for the same reasons as discussed above.

Typically, the predetermined wavelength is in a range from 1.3 μm to 1.7 μm, such as from around 1.5 μm to 1.62 μm.

In a preferred embodiment, the optical fiber has a higher refractive index in the first core region than in the second core region.

In another preferred embodiment, the optical fiber has identical refractive index in the first core region and in the second core region. This allows for example to manufacture the fiber in a single material, such as e.g. pure silica.

In a preferred embodiment, the optical fiber has a lower refractive index in the first core region than in the second core region. This allows for example to have a very large mode field diameter.

In another preferred embodiment, the first cladding region has a substantially annular shape in the cross section. The wording "substantially" being used for the same reasons as previously discussed.

In another preferred embodiment, the optical fiber has a first inscribed core diameter, $D_{co,1}$, being larger than 3 times said predetermined wavelength, such as larger than 5 times said predetermined wavelength, such as larger than 7 times said predetermined wavelength, such as larger than 10 times said predetermined wavelength.

In another preferred embodiment, $D_{co,1}$ is in the range from 4 μm to 25 μm, such as in the range from 4.0 μm to 5.0 μm, such as in the range from 5.0 μm to 6.5 μm, such as in the range from 6.5 μm to 10.0 μm, such as in the range from 10.0 μm to 25.0 μm.

In another preferred embodiment, the first core region has a varying refractive index profile, said varying refractive index profile having a highest refractive index equal to $N_{co,1}$, and said varying index profile being characterised by an □-profile, where □ is in the range from 0 to 100, such as □ equal to 2, 3 or higher.

In another preferred embodiment, the second core region is a homogeneous region.

In another preferred embodiment, the second core region is microstructured. This increases the effective refractive index ranges that are available for the second core region without the use of doping.

In another preferred embodiment, the microstructured features in the second core are positioned substantially circularly symmetric with respect to a center of said first core region. This is preferred in order to lower polarisation mode dispersion (PMD) in the fiber.

An optical fiber according to any one of the preceding claims, wherein said second core features are arranged in a single layer surrounding said first core region, such that a distance from a second core feature to a center of said first core region is substantially identical for all second core features. This is preferred in order to lower PMD, and further preferred for ease of fabrication.

In another preferred embodiment, the second core features are arranged in two or more layers surrounding said first core region. This is preferred to reduce bending losses.

In another preferred embodiment, the number of second core features is equal to or larger than 6, such as equal to or larger than 18. A high number is preferred to modify the effective refractive index of the second core region.

In another preferred embodiment, the second core features have a diameter $D_{co,2}$ and a center-to-center spacing between nearest second core features of $\Lambda_{co,2}$, and $D_{co,2}/\Lambda_{co,2}$ is in the range from 0.01 to 0.5, such as from 0.1 to 0.2. Generally, the microstructured features in the second core should be relatively small in order to ensure the possibility of the second core to support a limited number of modes.

In another preferred embodiment, $D_{co,2}$ is in the range from 0.1 μm to 5 μm. Typically, this is the design parameter range that provides strongest dispersion.

In another preferred embodiment, $\lambda/\Lambda_{co,2}$ is in the range from 0.2 μm to 20 μm. Typically, this is the design parameter range that provides strongest dispersion.

In another preferred embodiment, the first cladding features are positioned substantially circularly symmetric with respect to a center of said first core region. This is preferred to lower PMD in the fiber.

In another preferred embodiment, the first cladding features are arranged in a single layer surrounding said first core region, such that a distance from a first cladding feature to a center of said first core region is substantially identical for all first cladding features. This is preferred to lower PMD in the fiber.

In another preferred embodiment, the said first cladding features are arranged in two or more layers surrounding said first core region. This is preferred to lower bending losses in the fibers and/or to provide stronger dispersion.

In another preferred embodiment, the number of said first cladding features is equal to or larger than 3, such as equal to or larger than 6, such as equal to or larger than 8, such as equal to or larger than 18. This range of numbers of features allows for tailoring of the birefringence of the fiber to a large degree. Higher numbers of features may be desired to provide low PMD for example through more circular symmetric feature arrangements.

In another preferred embodiment, the first cladding features have a diameter $D_{cl,1}$ and a center-to-center spacing between nearest first cladding features of $\Lambda_{cl,1}$, and $D_{cl,1}/\Lambda_{cl,1}$ is in the range from 0.2 to 0.8, such as from 0.4 to 0.6. To provide strong dispersion, relatively large features are required. Hence, the features should be large enough to provide a buffer region between the two cores.

In another preferred embodiment, $D_{cl,1}$ is in the range from 0.1 μm to 10 μm. Typically, this range provides the most attractive design parameter range in order to obtain strong dispersion for wavelengths around 1.55 μm.

In another preferred embodiment, $\Lambda_{cl,1}$ is in the range from 0.2 μm to 20 μm. Typically, this range provides the most attractive design parameter range in order to obtain strong dispersion for wavelengths around 1.55 μm.

In another preferred embodiment, $D_{cl,1}/\Lambda_{cl,1}$ is larger than $D_{co,2}/\Lambda_{co,2}$. This is preferred to ensure that the first cladding region acts as a buffer between the two cores.

In another preferred embodiment, the second cladding region comprises a multiplicity of spaced apart second cladding features that are elongated in the axial direction and disposed in said second cladding material.

This provides further means for tailoring the dispersion properties of the fiber.

In another preferred embodiment, second cladding features have a diameter $D_{cl,2}$ and a center-to-center spacing between nearest second cladding features of $\Box cl,2$, where $D_{cl,2}/\Lambda_{cl,2}$ is in the range from 0.01 to 0.5, such as from 0.1 to 0.2. It is often preferred that these features are comparable to the features of the second core. It may be preferred that the second core is only weakly guiding or has a cut-off close to or around the operational wavelength. Hence the second cladding features may be preferred to have a limited size in order to not provide strong confinement for the second core—or alternatively not to provide confinement of a high number of modes in the second core.

In another preferred embodiment, $D_{cl,2}$ is in the range from 0.1 μm to 5 μm. In accordance with the above-stated preferred embodiment, this is preferred to have the second cladding features being comparable in size to the second core features. Similarly, it is further preferred that $\Lambda_{cl,2}$ is in the range from 0.2 μm to 20 μm.

In another preferred embodiment, $\Lambda_{cl,1}$ is larger than $\Lambda_{cl,2}$. This is preferred in order to allow the first and second cladding regions to have the same background material, but the effective refractive index of the two regions to be different at a given wavelength, such as the predetermined wavelength. In particular, it is preferred to have $\Lambda_{cl,1}$ larger or equal to $3\Lambda_{cl,2}$ as such a ratio may easily be realised using well known methods for fabricating microstructured fibers, such as methods employing stacking of capillary tubes.

In another preferred embodiment, $\Lambda_{cl,1}$ is substantially identical to $\Lambda_{cl,2}$. This may be preferred as similar pitches (i.e. center-to-center features spacing or lattice period in the case of cladding comprising periodic feature arrangements) often allow simple fabrication, thereby improving reproducibility of the fiber.

In another preferred embodiment, $D_{cl,1}$ is larger than $D_{cl,2}$. This is preferred in order for the first cladding region to have a lower effective, refractive index than the second cladding.

In another preferred embodiment, $D_{cl,1}/\Lambda_{cl,1}$ and $D_{cl,2}/\Lambda_{cl,2}$ are substantially identical. This may be preferred as similar hole and pitch sizes provide the simplest fabrication, thereby improving reproducibility of the fiber.

In another preferred embodiment, the optical fiber comprises one or more glass materials.

In another preferred embodiment, the optical fiber comprises silica.

In another preferred embodiment, the optical fiber comprises polymer.

In another preferred embodiment, the first cladding features, second core features, and/or second cladding features are voids comprising vacuum, air, or another gas.

In another preferred embodiment, the optical fiber has a non-circular shape of the outer cladding, such as a non-polygonal shape, such as an elliptical shape. This may be advantageous for a range of reasons—for example for fibers with high birefringence (for example for handling splicing issues), or to ensure bending in certain preferred directions.

In another preferred embodiment, the outer shape has a predetermined orientation in the cross section, the predetermined orientation being determined from the position of said first cladding features. This may be preferred to further ensure bending in certain preferred directions with respect to the actual directions in the microstructure in and/or around the core region. Also for polarisation maintaining, dispersion compensating fibers this is preferred.

In another preferred embodiment, the first core region has a non-circular shape in the cross section, such as an elliptical shape. This is preferred to provide a high birefringence in the optical fiber.

In another preferred embodiment, the first cladding region has a non-circular, inner shape in the cross section, such as an elliptical, inner shape, providing a high birefringence in the optical fiber. This is further preferred for polarisation maintaining, dispersion compensating fiber applications.

In another preferred embodiment, the optical fiber guides light at predetermined wavelength in a single mode.

In another preferred embodiment, the optical fiber guides light at predetermined wavelength in a higher order mode. This is preferred as higher order modes may provide even stronger dispersion than the fundamental mode including the possibility of strong positive dispersion.

In another preferred embodiment, the invention covers an article comprising a module, where the module is employed for dispersion compensation in an optical communication system, and the module comprising an optical fiber according to the invention.

In a second aspect, the present invention relates to an optical fiber having an axial direction and a cross section perpendicular to said axial direction. The optical fiber has positive dispersion in the vicinity of a predetermined wavelength. The optical fiber is characterised by a number of regions:

1) a first core region being positioned substantially in a center of the optical fiber, the first core region comprising a first core material of refractive index, $N_{co,1}$. In the present context, "positioned substantially" means that it is desired to have the first core placed in the center, but manners of production may introduce minor structural deviations such that a center of the first core region and a center of the whole optical fiber may not coincide. Also, the optical fiber may have a non-circular outer shape in the cross section, making the definition of a center of the optical fiber less stringent. In the case of a non-circular outer shape, the center is determined as the center-of-gravity of a two-dimensional element with the same outer shape as the optical fiber.

2) a first cladding region surrounding the first core region, the first cladding region comprises a multiplicity of spaced apart first cladding features that are elongated in the axial direction and disposed in the first cladding material, said first cladding material having a refractive index $N_{cl,1}$;

3) a second core region surrounding the first cladding region, the second core region comprising a second core material of refractive index, $N_{co,2}$, and the second core region having a substantially annular shape in the cross section. Since the interface between the inner cladding and the outer core may be an interface where at least on one side there is a microstructure (the inner cladding region), the interface may not necessarily be seen as a smooth interface (e.g. in the case of the two regions having identical background refractive indices). Therefore, the shape of the outer core region may not necessarily be viewed as a smooth ring-like shape—hence the wording "substantially annular shape";

4) a second cladding region surrounding the second core region, the second cladding region comprising a second cladding material of refractive index, $N_{cl,2}$, and the second cladding region having a substantially annular shape in the cross section. In the present context, the wording "substantially annular shape" is used for the same reasons as discussed above.

In a preferred embodiment, the predetermined wavelength is in a range from 1.3 μm to 1.7 μm, such as from around 1.5 μm to 1.62 μm.

In another preferred embodiment, the optical fiber guides light at the predetermined wavelength in a higher-order mode. This is preferred as a higher order mode in a fiber according to the present invention may exhibit a very high positive dispersion or a very high negative dispersion.

In a preferred embodiment, the present invention covers an article (this being a fiber optical communication system or parts thereof) that includes a module being employed for dispersion compensation in an optical communication system. The module comprises an optical fiber according to the present invention.

In another preferred embodiment, the present invention covers an article that comprises a mode-converter that enables coupling from a conventional single mode fiber to an optical fiber according to the present invention.

Finally, it should be mentioned that the present invention covers both fibers that guide light by a modified version of total internal reflection as well as fibers that guide light by photonic band gap effects.

Glossary and Definitions

For microstructures, a directly measurable quantity is the so-called "filling fraction" that is the volume of disposed features in a microstructure relative to the total volume of a microstructure. For fibers that are invariant in the axial fiber direction, the filling fraction may be determined from direct inspection of the fiber cross-section, e.g. using inspection methods known in the art.

In this application we distinguish between "refractive index", "geometrical index" and "effective index". The refractive index is the conventional refractive index of a homogeneous material—naturally, this is also used to describe the refractive indices of the various materials themselves in a microstructured medium. The geometrical index of a structure is the geometrically weighted refractive index of the structure. As an example, a micro-structure consisting of air features that occupy 40% of the structure (the air features themselves having a refractive index=1.0) and a background material of silica (the silica background material having a refractive index ≈1.45) has a geometrical index of 0.4×1.0+0.6×1.45=1.27. The procedure of determining the effective refractive index, which for short is referred to as the effective index, of a given micro-structure at a given wavelength is well-known to those skilled in the art (see e.g., Joannopoulos et al., "Photonic Crystals", Princeton University Press, 1995, or Broeng et al., Optical Fiber Technology, Vol. 5, pp. 305–330, 1999).

Usually, a numerical method capable of solving Maxwell's equation on full vectorial form is required for accurate determination of the effective indices of microstructures. The present invention makes use of employing such a method that has been well documented in the literature (see previous Joannopoulos-reference). In the long-wavelength regime, the effective index is roughly identical to the weighted average of the refractive indices of the constituents of the material, that is, the effective index is close to the geometrical index in this wavelength regime.

BRIEF DESCRIPTION OF THE DRAWINGS

In the following, by way of examples only, the invention is further disclosed with detailed description of preferred embodiments. Reference is made to the drawings in which:

FIG. 4 (prior art) shows the effective index of microstructures comprising air holes as a function of normalised wavelength for different air hole dimensions for.

DETAILED DESCRIPTION

Figure 1A:
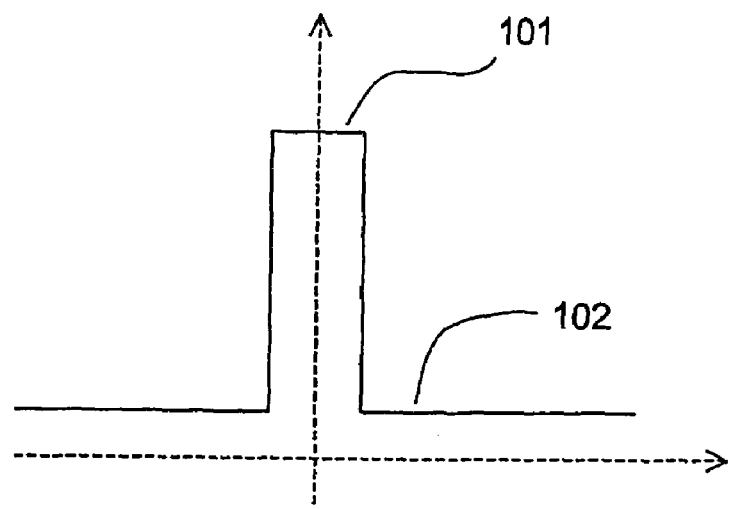
FIG. 1a (prior art) shows schematically the refractive index profile of a conventional step-index fiber.
Figure 1B:
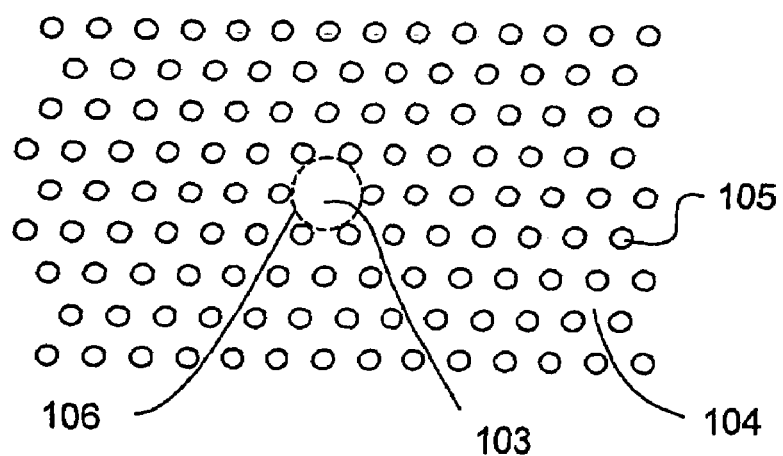
FIG. 1b (prior art) shows schematically the cross-section of an equivalent index-guiding photonic crystal fiber.

In FIG. 1a, the index profile of standard step-index fiber design according to prior-art is illustrated. In this type of fiber design, the core region 101 is generally formed by a narrow circular section, which is strongly co-doped by germanium to provide the raised index in comparison with the surrounding cladding region 102. It should, however, be noted that the fiber also may be realised by an un-doped (pure silica) core surrounded by a doped cladding region (typically F-doped silica). The design also includes a thin solid rod of glass placed in air (or vacuum) or even another lower index material compared to the core glass. In FIG. 1b, the equivalent microstructured fiber is shown schematically. In this realisation, an un-doped core 103 is surrounded by a cladding 104 that is formed by placing air holes 105—or voids—in a silica background material. This realisation of the cladding provides an average refractive cladding index, which is lower than the refractive index of the core. The inscribed, dashed circle 106 in FIG. 1b indicates one division between the core region and the cladding region—defining the core diameter, $D_{co}$, as the inscribed diameter.

Figure 2A:
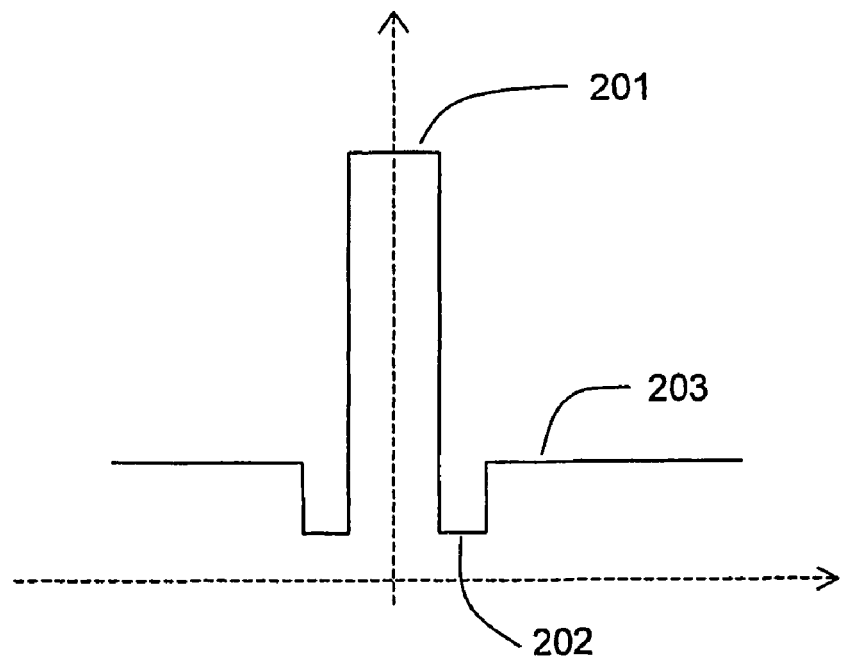
FIG. 2a (prior art) shows schematically the refractive index profile of a conventional W-type fiber generally suggested for dispersion management.

In FIG. 2a, the refractive index profile of a prior art fiber of the so-called w-profile type is illustrated. This type of refractive index is characterised by a core 201—typically formed by an index raised by germanium co-doping. The core is surrounded by a depressed (typically through flour co-doping) cladding region 202, and this inner cladding region is surrounded by an outer cladding 203, which typically is realised in pure silica. As described in the background description of the invention, these fibers operate by a spectrally dependent effective mode index, which is related to spectrally dependent power redistribution of the fundamental mode.

Figure 2B:
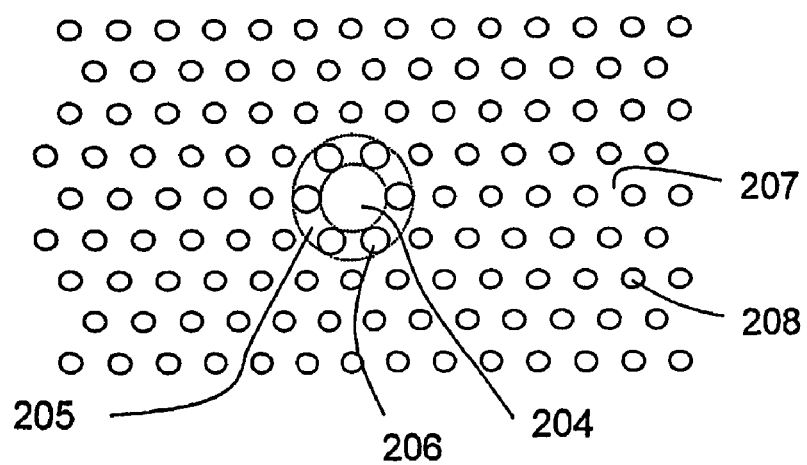
FIG. 2b (prior art) shows schematically the cross-section of a microstructured fiber with two different air-void dimensions used to obtain an effective index profile of the W-type.

FIG. 2b (prior art) illustrates an example of a microstructured fiber realised to form an equivalent to the W-profile fiber of standard technology. Here, the core is formed by a solid core region 204 surrounded by an inner cladding region 205 in which air holes 206 is placed. Since the air holes 206 of the inner cladding region have a larger cross section than the air holes 208 of the outer cladding 207, the effective index of the inner cladding becomes smaller than that of the outer cladding. Generally, this type of W-profile fiber will show significant macro-bending losses near the wavelength where a significant negative dispersion is obtained.

Figure 3A:
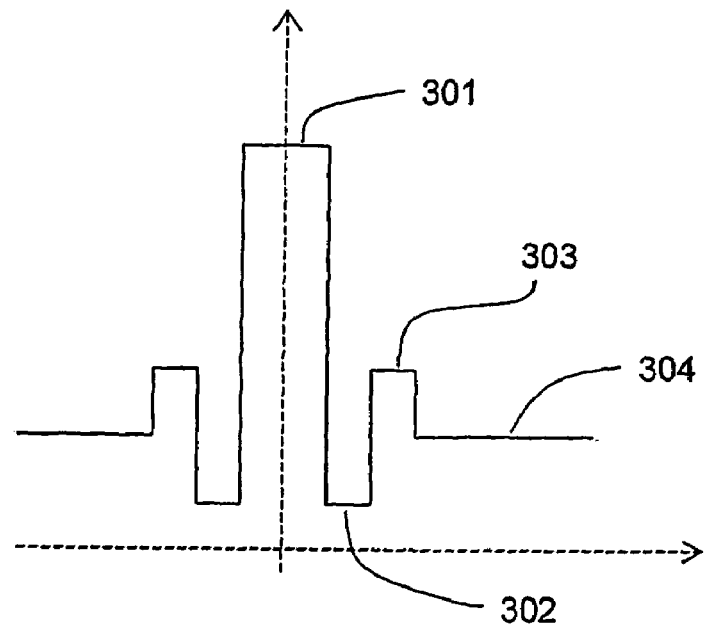
FIG. 3a (prior art) shows schematically the refractive index profile of a conventional triple-clad fiber of a type generally used for standard dispersion compensating fibers.

In FIG. 3a (prior art), the index profile of a triple-cladding standard optical fiber for dispersion compensation (DCF) is illustrated. A DCF of this type has a narrow highly-doped core 301 (typically germanium is used as index raising dopant) surrounded by a depressed cladding 302 (typically flour-doped to refractive index levels in the order of –0.5%) This germanium doping in the central part of the fiber may typically result in an increase of the refractive index of 2–3% using rather narrow core radii in the order of 1–2 µm. The highly doped core is favourable as it enables a high negative dispersion, but the drawback is increased attenuation (as described by Grüner-Nielsen et al., ECOC'2000, pp.91–94). The depressed cladding decreases the dispersion and is necessary to obtain negative dispersion slope around 1550 nm. Another index ring 303 with raised index compared to the cladding is often introduced to improve bending properties, but the refractive index is normally not raised much above 0.5%, since a high index value will lead to multimode operation of the fiber. Outermost the fiber has a pure silica cladding 304.

Figure 3B:
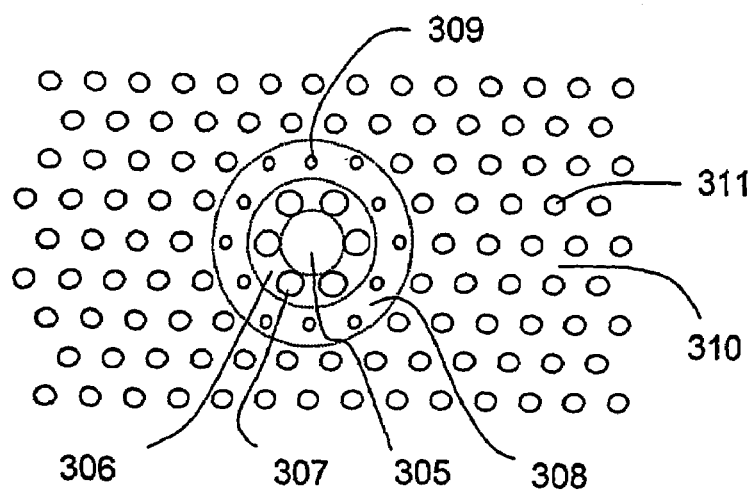
FIG. 3b (prior art) shows schematically the cross-section of a microstructured fiber with three different air-void dimensions used to obtain an effective index profile of the triple-clad type.

FIG. 3b (prior art) illustrates the transversal cross section of a microstructured optical fiber designed to make use of similar (but enhanced) properties compared to standard fiber technology. The illustration shows the core 305 formed by a solid material. The core is surrounded by an inner cladding 306 in which air holes having relatively large cross sections 307 are placed to form an effective depressed cladding. The inner cladding is, furthermore, surrounded by a second region 308 in which small air holes 309 are placed to form a higher effective index compared to that of the inner cladding region 306. Finally, the waveguide consist of an outermost cladding 310 in which air holes 311 of a medium size (compared to those of the inner regions) are placed.

It should be noted that we throughout this description generally will assume that the basis material is silica or doped silica, since this is the most commonly used material for fabrication of optical fibers. However, the principles and ideas behind the invention is not limited to these material combinations, and it may for future applications, where new spectral ranges of the optical fiber technology is explored, be more advantageous to use different material compositions, such as (but not limited to) different compound glasses (e.g. chalcogenide), polymers and/or low-melting point glasses.

Microstructured fibers are generally divided into two types depending on the physical mechanism responsible for the light guidance: index-guiding microstructured fibers are characterised by a core having a higher refractive index than a surrounding cladding region (as known from conventional optical fibers), and photonic band gap micro-structured fibres are characterised by a core having effectively a lower refractive index than a surrounding cladding region having periodically distributed features (see Broeng et al, Optical Fiber Technology, Vol. 5, pp. 305–330, 1999 for a presentation of the classification of the two groups). While the physical mechanism causing the waveguidance in the two types of microstructured fibers is different, the improvements disclosed by the present inventors relate to both types of microstructured fibers.

Figure 4:
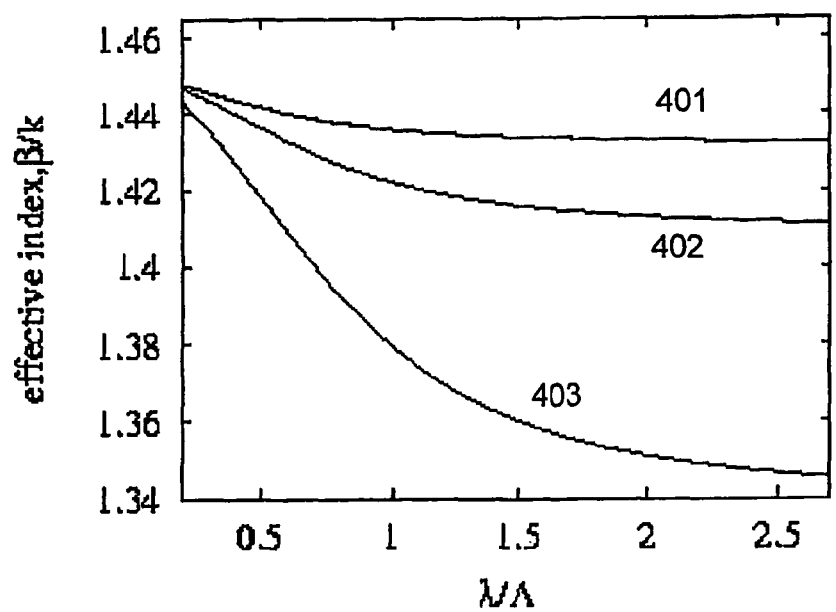

In FIG. 4 (prior art) is depicted how the effective index of the fundamental space filling mode (the "effective refractive index"), β/k, of a periodic structure varies with the normalised wavelength, λ/Λ. Here λ is the free space wavelength of light, Λ is the distance between the centres of two nearest neighbouring air holes, β is the propagation constant and k is the free space wave-number, all of which are well known by those skilled in the art. The periodic structure consists of circular air holes (the refractive index of air is 1.0 in the calculations) placed on a triangular lattice on a silica background (the refractive index of silica has been approximated by a refractive index of 1.45). Three curves are shown: the curve at the top 401 is for a periodic structure where the air holes are placed in a triangular lattice (also known as close-packed arrangement) and have a diameter, d, of 0.2Λ, where Λ is the lattice period (equal to the center-to-center of the air holes for the triangular lattice). The curve 402 is for a similar structure but with d=0.3Λ, while the curve at the bottom 403 is for a similar structure but with d=0.5Λ. Notice that the effective refractive index is low and not strongly dependent on the wavelength when the wavelength, λ, is large compared to the structural size (symbolised by Λ). It is known from the prior art that a low refractive index of the cladding is an advantage if strong dispersion compensation is desired.

If a photonic crystal fiber (PCF) with a silica core region (see FIG. 1b), surrounded by a periodic cladding region (such as the ones for which effective indices have been calculated as shown in FIG. 4) is to be used as a dispersion compensating fiber one may, therefore, assume that an inner cladding region with a small pitch, compared to the wavelength, is to be used, since this gives the lowest cladding index according to the effective index curves for periodic structures shown in FIG. 4.

Furthermore, since the effective index of the cladding according to FIG. 4 is lowest when large air filling fractions are employed, one may assume that one should employ cladding structures with large air-filling fractions to obtain maximum dispersion compensation. This is in agreement with the teachings by Birks et al. in IEEE Photonics Technology Letters, Vol. 11, pp.674–76, 1999 and Optical Fiber Communication Conference, FG2-1, pp. 108–10. 1999, and DiGiovanni et al. in U.S. Pat. No. 5,802,236. In the Birks-references, the cladding index is assumed to be one (which is of course less than the actual index of any real life microstructured cladding), while the core is supposed to be a circular glass-rod of very small diameter (0.4–1.2 μm).

According to the invention, PCFs for dispersion compensating purposes can, therefore, be made with a cross-section similar to the one shown schematically in FIG. 1b. If the air-filling fraction of the cladding is large, the group velocity dispersion will typically have minimum values when the inter-hole distance of the cladding is small compared to the wavelength. This corresponds to a core diameter, which is small compared to the wavelength, in agreement with the findings by Birks et al. One should notice that a number of problems are associated with small core sizes: coupling light into the fiber using standard splicing techniques is associated with significant coupling losses because of a poor mode-overlap with the standard fiber coupled from or to. This is well understood by those skilled in the art. Further, small core sizes enhance non-linear effects in the high bit rate systems of the future. This is also well understood by those skilled in the art. However, the group velocity dispersion values that may be obtained, using the schematic design shown in FIG. 1b, are very impressive: group velocity dispersion may be as low as −2000 ps/nm/km according to Birks et al.

It is a disadvantage of the microstructured fibers with a cross-section similar to the one depicted in FIG. 1b with group velocity dispersion less than −400 ps/nm/km, that the fibers have small core size of around or less than 1 μm and, therefore, poor coupling coefficient to standard optical fibers.

It is a further disadvantage of the microstructured fibers with a cross-section similar to the one depicted in FIG. 1b with group velocity dispersion less than −400 ps/nm/km, that the fibers have small effective mode-areas and, therefore, suffer from non-linear effects in the future high bit rate transmission system. Such fibers would, therefore, have a detrimental effect on the bit rates that can be transmitted by the future multi-gigabit systems.

The present inventors have realised that a number of ways exist of designing microstructured fibers with large negative group velocity dispersion, while avoiding the small core sizes that results from the large index contrast inherent in the designs suggested so far for dispersion compensating PCFs. To understand the basic idea, consider again the mode-indices of FIG. 4. If one could design a fiber with a core index that abruptly rises above the cladding index as the frequency is increased, one would obtain a mode-index that curves upward in an index plot similar to the index plot shown in FIG. 4. This corresponds to large negative group velocity dispersion, GVD, according to the formula for group velocity dispersion:

$$GVD = -\frac{\lambda}{c} \frac{d^2 n}{d\lambda^2}.$$

The only apparent problem with this approach is that the index curves shown in FIG. 4 never seem to cross. However, the index curves shown in FIG. 4 are for a specific class of periodic structures. The problem has already been solved for microstructured fibers of the prior art: By enlarging the inner cladding air-holes, such as shown schematically on FIG. 2b, the field is not allowed to be guided in the core region with a mode-index, which exceeds that of the cladding index at large wavelengths. At some wavelength, the mode-index of the fundamental cladding mode rises very abruptly, leading to large negative group velocity dispersion over a limited wavelength range. This is because the fundamental mode is localised within the central core region at short wavelengths, which causes the mode-index to rise abruptly, while the mode at the same time becomes guided. Unfortunately, this abrupt rise in mode-index happens, when the core region is relatively small compared to the core region of standard optical fibers, thus giving the same problems with non-linear effects and poor coupling as the basic fiber design depicted in FIG. 1a.

The present inventors have realized, however, that by doping the central core region, giving it an index of refraction that is higher than the index of refraction of the background material of the cladding region, one may obtain large negative group velocity dispersion, while having larger core regions than the core regions of the prior art fibers. Such a design is shown schematically in FIG. 5, which shows the higher refractive index of the core region 500, the inner cladding air holes 501, the outer cladding air holes 502 and the background material 503 with a lower refractive index than 500. It should be noticed that the doped core is not in contact with the inner cladding features 501. As shall be discussed in more details later, in connection with FIG. 31, the present inventors have realized that this provides an advantageous design direction for lowering the mode field overlap with the low-index features and thereby lowering potential loss-mechanisms associated with the low-index features and their interfaces with the background material of the fiber (such as absorption and scattering).

Figure 5:
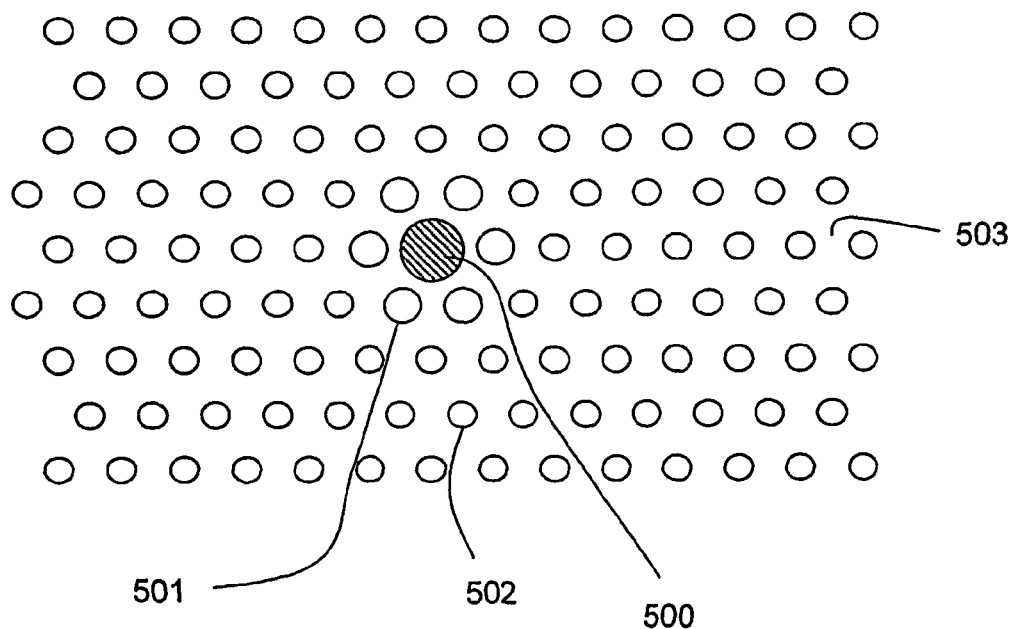
FIG. 5 (prior art) shows schematically the cross-section of a microstructured fiber for dispersion compensation, the fiber having a doped central core surrounded by an annular inner cladding section containing larger air holes than those used to form the microstructured outer cladding; The fiber comprises further a high-index features in the center of the core.
Figure 6:
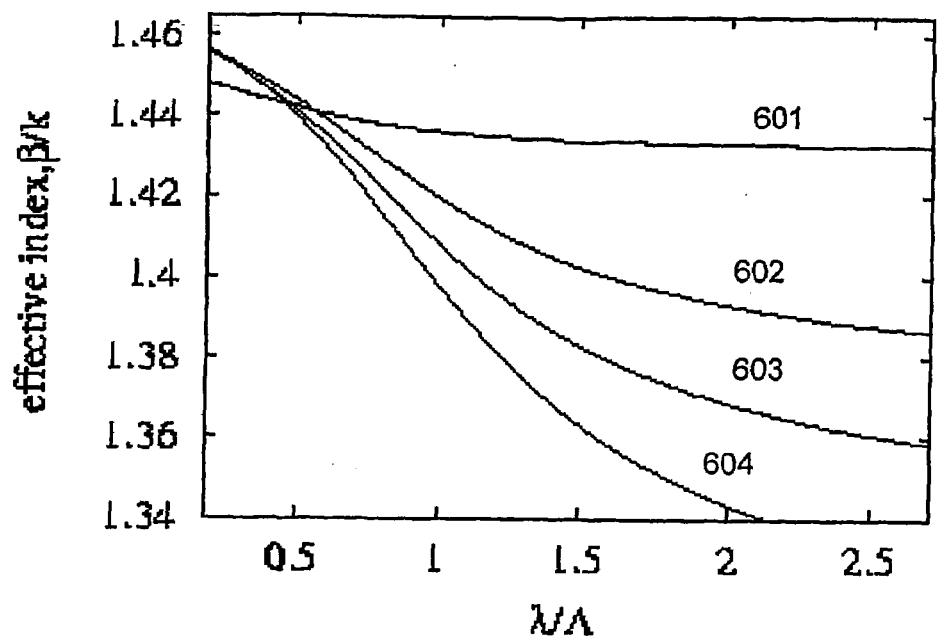
FIG. 6 (prior art) shows the effective mode indices of periodic outer cladding regions and of a hypothetical honeycomb structures shown in FIG. 5 (representing the central fiber region) as a function of the normalised wavelength. Curves are shown for honeycomb structures with different air-hole dimensions.

In FIG. 6 (prior art) there is illustrated a number of mode-indices of periodic structures, which illustrates why effective dispersion compensation may be obtained by a fiber design as illustrated in FIG. 5. The curve at the top 601 repeats the effective index of the curve 401 of FIG. 4—this curve is referred to as the outer cladding index, since it is supposed to represent the outer cladding structure of the micro-structured fiber shown in FIG. 5 (502 and 503). The illustration also shows the effective indices of hypothetical honeycomb periodic structures, where the background has an index of refraction of 1.46. In a sense, these honeycomb structures may represent a periodic version of the central core region and its surrounding 6 holes of inner cladding structure—see for example Riishede et al. Proc. 27th Eur. Conf. On Opt. Comm (ECOC'01), pp. Th.A.1.5, 2001. Three curves are shown: curve 602 corresponds to a honeycomb-structure with a hole diameter, d, of 50% of the inter-hole distance, $\Lambda$, (center-to-center), 603 corresponds to d=0.6$\Lambda$, and 604 corresponds to d=0.7$\Lambda$. The present inventors have realized that any strictly guided modes must have an effective index that lies above the effective cladding index, yet below the effective refractive index of the core region (approximated by the honeycomb-index).

At some wavelength ($\lambda/\Lambda$ around 0.5–0.6 for the design parameters of this example), the honeycomb indices are seen from FIG. 6 to rise above that of the outer cladding index. This is caused by the higher refractive index of the central core region compared to the background refractive index of the cladding region. The central core, therefore, only guides light at shorter wavelengths than the wavelength, where the honeycomb index and the cladding index cross (to the left of the crossing point in FIG. 6). As before, the guiding is associated with the fundamental mode being localised to the core region, thus giving large negative group velocity dispersion, when the cladding index abruptly rises above the core index—here the mode field distribution of the fundamental mode will shift away from the central core. However, by doping the central core we can employ small holes—or complete elimination of these—in the outer cladding structure, and quite large holes in the inner cladding region, and still obtain a crossing wavelength. Actually, a crossing wavelength will always exist, if the core region has a region with higher refractive index than any index of refraction in the outer cladding region.

One may vary the hole-size and obtain different crossing points. FIG. 6 also illustrates that enlarging the inner cladding air holes moves the crossing point to the left. This is an advantage, since for a fixed operational wavelength, $\lambda$, this corresponds to a larger structure size, $\Lambda$, and, therefore, a larger core region. To exemplify; 602 crosses 601 at $\lambda/\Lambda$=0.57, 603 crosses 601 at $\lambda/\Lambda$=0.46 and 604 crosses 601 at $\lambda/\Lambda$=0.44. Choosing $\lambda$=1.55 µm as the operation wavelength this corresponds to $\Lambda$=2.72 µm for 602, $\Lambda$=3.37 µm for 603 and $\Lambda$=3.52 µm for 604. One can, therefore, adjust the core size corresponding to large negative group velocity dispersion relatively freely, by simply adjusting the inner cladding hole size. The above-mentioned $\Lambda$-values correspond to inscribed core diameters of between: 4.1 µm for 602, 4.7 µm for 603, and 4.6 µm for 604.

Figure 7:
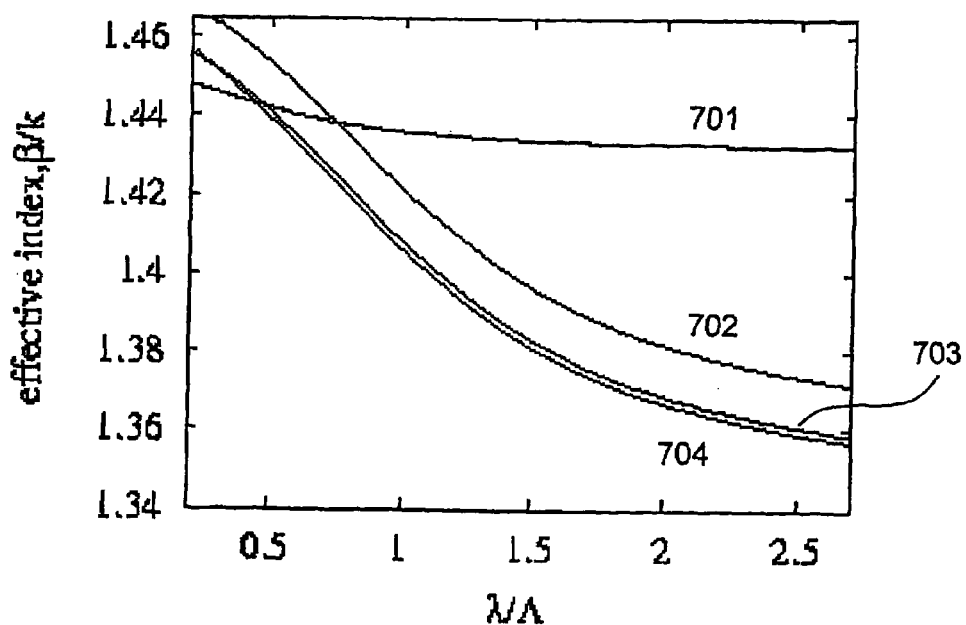
FIG. 7 shows the effective mode indices of periodic outer cladding regions and of a hypothetical honeycomb structures (representing the central fiber region) as a function of the normalised wavelength. Curves are shown for different doping levels in the central core, and for different honeycomb air-hole dimensions.

Other possibilities of adjusting the core size to a desired value exist, however. The cladding index 601 is repeated as 701, and the honeycomb index for a fiber with an inner cladding-hole diameter of 60% of the inter-hole distance 603 is repeated as 703 in FIG. 7. The diameter of the core region with refractive index of 1.46 is equal to the inter-hole distance in 703. In FIG. 7 is also shown the dramatic effect of changing the doping levels of the central core region: If the refractive index of the region with increased index is raised to 1.47 (curve 702) while maintaining the diameter (relative to the hole distance) of the doped region, the crossing point may move significantly to the right (from $\lambda/\Lambda$=0.46 to $\lambda/\Lambda$=0.72). This can be counter-acted by reducing the diameter of the doped region to 50% of the inter-hole distance as shown by 704. For a wavelength of 1.55 µm (curve 702) corresponds to $\Lambda$=2.15 µm, curve 703 corresponds to $\Lambda$=3.37 µm and curve 704 corresponds to $\Lambda$=3.52 µm at their respective crossings with curve 701.

A large number of possibilities, therefore, exist for adjusting the core size (and thereby the mode field diameter) with this design. These possibilities include:

1) The value of the cladding index. The higher the cladding index the larger the core for a given core design.

The present inventors have realised that largest core region is obtained when the outer cladding is a homogeneous material (such as pure, fused silica or silica glass doped with for example Fluorine).

2) The size of the inner cladding air holes.

3) The maximum of the refractive index in the doped core and the refractive index profile. Generally, a larger refractive index step between the central core and the background material of the outer cladding leads to a smaller core size as shown by FIG. 7.

4) The diameter of the up-doped central part of the core region. Generally a smaller diameter leads to larger $\Lambda$, and thereby a larger core area, and larger mode field diameter, as shown by FIG. 7.

The actual combination of parameters that should be employed depends on the specific application of the micro-structured fiber. For dispersion and dispersion slope compensating applications, there is a general interest in core regions that are relatively large in order to eliminate degrading effects caused by non-linearity. The present invention, therefore, applies to fibers with a core diameter that is more than three times the free space wavelength of the light that should be dispersion compensated. For standard purposes (dispersion compensation in the so-called communication window) this means that that the core diameter of the fibers of the present invention should be larger than 4.0 µm. On the other hand, the design ideas outlined in the present invention may also be used to tailor the dispersion to zero or close-to-zero at wavelength around 1550 nm for fibers with small core sizes—such as core sizes below 4 µm in diameter. The present invention, therefore, also covers fibers for non-linear applications.

The present invention does not limit itself to structures with the principal design shown in FIG. 5. It is well known that dispersion-compensating fibers with a depressed cladding region tend to have large bending losses. As a general rule, the bending losses increase when a larger core region is employed. Since the present invention in a main aspect relates to large core regions it would be advantageous to design the fiber such that bending losses are suppressed. The present inventors have realised that this is indeed possible with the type of design shown schematically in FIG. 8. The core region 800, the inner cladding region comprising low-index features 801, and the outer cladding region 803 and 804 are similar to those shown in FIG. 5. However, some of the innermost cladding air holes have been removed at positions 802.

This effectively creates what may be termed a raised outer cladding region (similar to that shown in FIG. 3 and denoted 308), or alternatively it may be termed an outer core region 802 if one follows the line of thought presented by Thyagarajan et. al. in IEEE Photonics Technology Letters, Vol. 8, no. 11, November 1996, pp. 1510–12. Note, however, that compared to the approach by Thyagarajan et al., the microstructured fiber does not need high doping levels, which are difficult to control, and we may even operate with much larger effective index contrasts.

Since one may in some sense view the inner core 800 and the inner cladding 801 as one core (which was theoretically exploited to let honeycomb indices represent the core index in FIG. 6), we approximately know the slope of the effective guided mode index of the central core region. Looking at FIG. 6, we realise that strong negative group velocity dispersion will result, if the slope of this mode is numerically large, while the slope of a mode guided mainly within an outer core is numerically small.

In designs such as that shown in FIG. 3a, the negative group velocity dispersion depends critically on the type of design. If 303 cannot be seen as capable of supporting guided mode(s), only modest dispersion may result (a typical result will be less than nominally 300 ps/nm/km). If on the other hand 303 represents an outer core, strong dispersion may result (even more negative than –5000 ps/nm/km). It should be understood that by using the term "represent an outer core" is meant that the core may support a guided mode, but not necessarily does so—for example if no light is coupled into the core from the input end of the fiber. With designs such as that shown in FIG. 8 on the other hand, the numerical value of the dispersion may be large in both cases (and actually can be equally large in structures such as the one shown in FIG. 5). This is because the core index may have a large negative slope, when it crosses the cladding index, as illustrated in FIG. 6.

Figure 8:
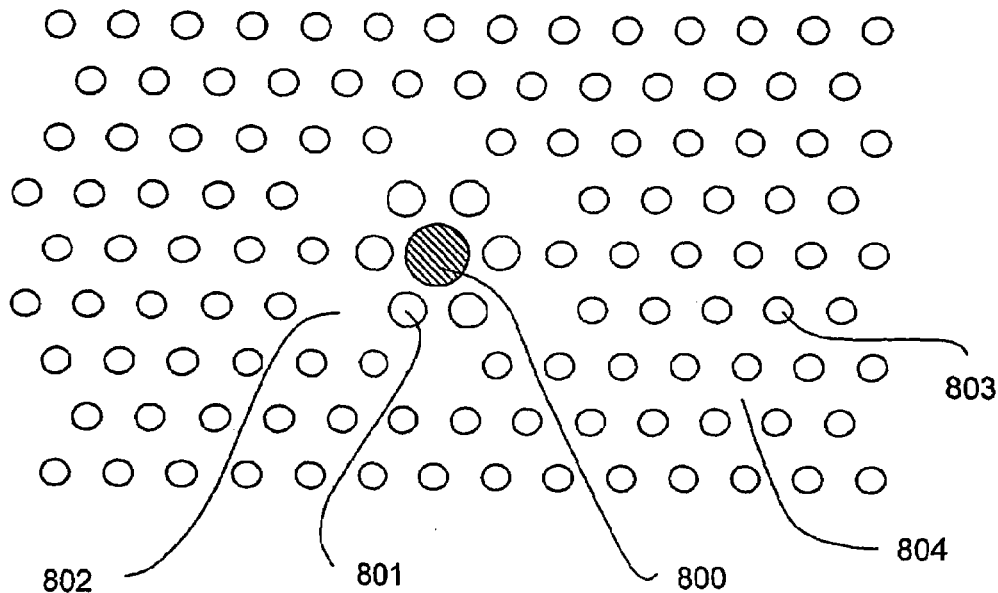
FIG. 8 (embodiment) shows schematically the cross-section of microstructured fiber for dispersion compensation, the fiber having a doped central core surrounded by an annular inner cladding section containing larger air holes than those used to form the microstructured outer cladding. Between the inner and outer cladding regions, a higher effective index is obtained in an annular segment, where air holes have been removed (compared to the outer cladding).

One additional functionality is that the numerical value of the group velocity dispersion of micro-structured fibers such as shown in FIG. 8, therefore, does not depend critically on whether the outer core guides an independent mode in region 802 or not—it may still affect the guided mode in the central core 800. It may still be advantageous to have an outer core capable of supporting a mode. This is because this will lift the effective index of the fundamental mode above the effective cladding index at the wavelength regime of strong dispersion and thereby reduces the bending losses.

Figure 9:
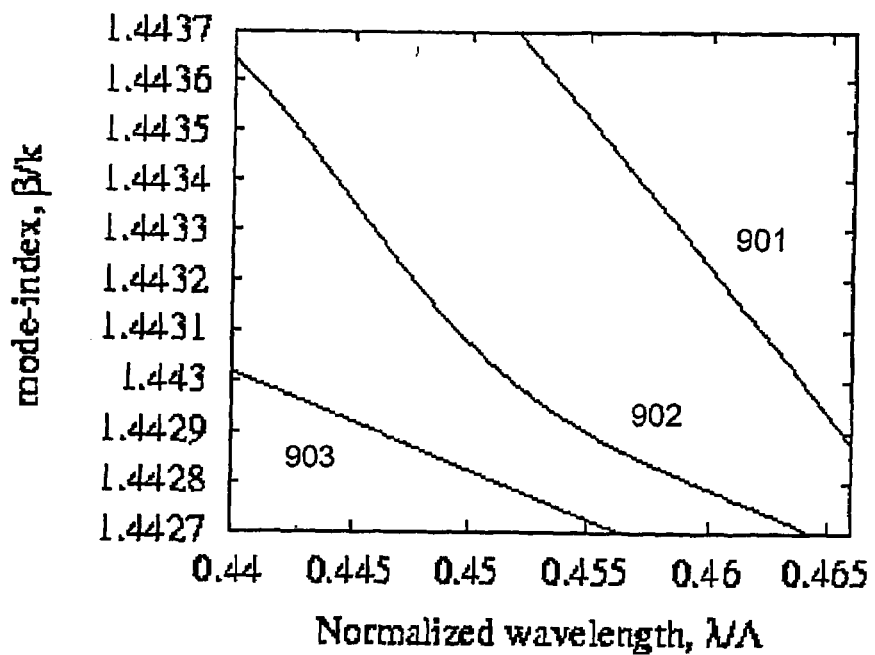
FIG. 9 shows a simulation of the mode indices for a fiber according to the present invention.

FIG. 9 shows the operation of a microstructured fiber with the design schematically shown in FIG. 8. Curve 901 shows the effective core index as a function of the normalised wavelength, curve 903 shows the effective cladding index as a function of the normalised wavelength and curve 902 shows the effective mode-index of the fundamental mode as a function of the normalised wavelength. For this fiber, the refractive index of the up-doped central part of the inner core 800 is 1.46. The diameter of 800 is equal to the inter-hole distance, $\Lambda$. The refractive index of the background material of the rest of the fiber 804 is 1.45. The diameter of the inner cladding air holes is 0.6$\Lambda$. The diameter of the outer cladding air holes is 0.2$\Lambda$. Six of the innermost outer cladding holes were removed to create the outer core region 802 in the manner shown in FIG. 8.

Looking at FIG. 9, it is seen how the mode-index of the fundamental mode 902 has a slope similar to the mode-index of the cladding 903 at long normalised wavelengths. At normalised wavelengths near 0.45 the slope of the fundamental mode 902 changes and approaches the slope of the core index 901. This gives a strong upward curvature on 902 that correspond to numerically large negative group velocity dispersion of the fundamental mode 902. In this wavelength regime, where the fiber exhibits strong negative dispersion, the central and the outer core may support modes of approximately similar effective index.

Figure 10:
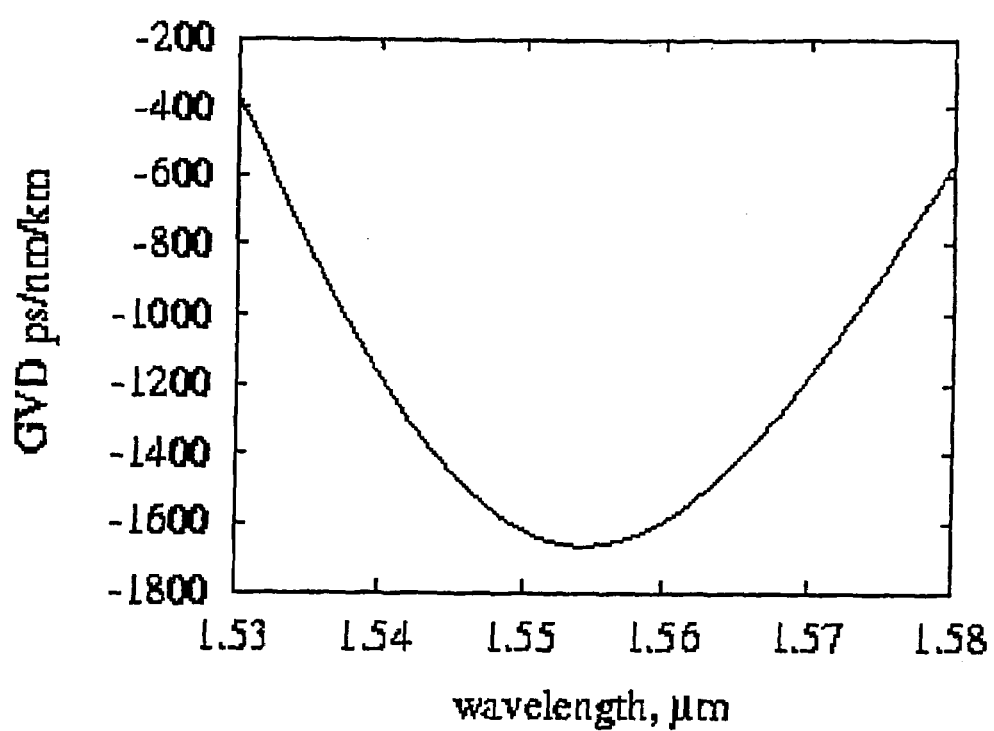
FIG. 10 shows a simulation of the dispersion of a dispersion-compensating fiber according to the present invention.

The actual group velocity dispersion is shown in FIG. 10 for a fiber such as the one described above for FIG. 9. FIG. 10 is for a fiber with $\Lambda$=3.45 µm. This corresponds to a central core 800 with refractive index=1.46 and diameter=3.45 µm. The inner cladding air holes have diameter 2.07 µm (giving an inscribed diameter of 4.8 µm), while the outer cladding air holes have diameter 0.69 µm. The background refractive index is 1.45.

In agreement with the effective index variation 902, FIG. 10 shows strong negative group velocity dispersion, GVD, of less than –1600 ps/nm/km. Designs with larger doping levels show even numerically larger group velocity dispersion values (down to –10000 ps/nm/km). Also the large negative slope on the group velocity dispersion at wavelengths shorter than 1.55 µm should be noticed. Such a large dispersion slope makes these fibers ideal for dispersion slope compensation schemes. In some instances, the slope of these dispersion compensation fibers may even be too large. However, systems having smaller slope (relative to the GVD-values) may be created by cascading fibers with different GVD characteristics. It is, therefore, an advantage of these fibers that they may be used to not only compensate the dispersion but also the dispersion slope of virtually any system with positive group velocity dispersion.

Figure 11:
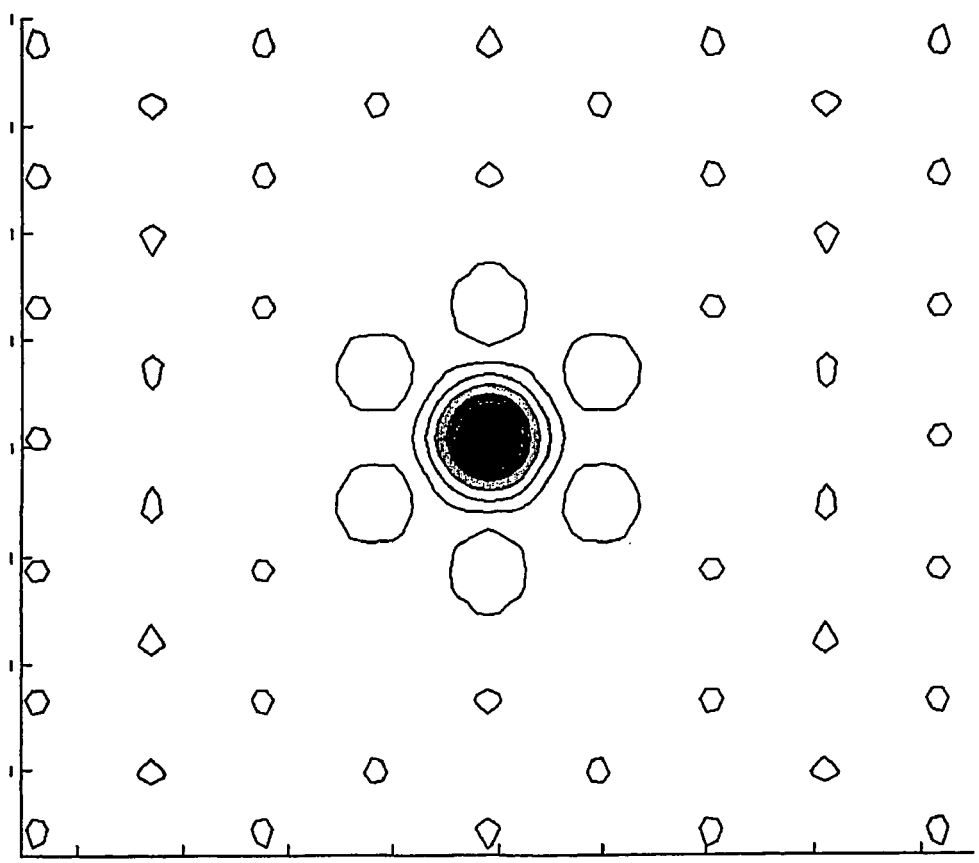
FIG. 11 shows the field distribution of the fundamental mode for a microstructured fiber according to the invention.

In order to illustrate the good mode confinement of the dispersion compensating fiber designs according to the present invention, FIG. 11 shows the mode field distribution of the fundamental mode calculated at a wavelength of 1550 nm. The fiber parameters are selected according to the description provided in connection with the illustration of the group velocity dispersion in FIG. 10. The field is seen to avoid the air holes in the inner cladding region, being advantageous in terms of low losses—as previously discussed. This being mainly attributed to the core region having a high-index features being not in contact with the inner-cladding region.

In a preferred embodiment of the present invention, the outer core contains material with a higher refractive index than the refractive index of the background material in the outer cladding. An example of a fiber that has a number of high-index features present in the outer core is illustrated in FIG. 12. In order to reduce fabrication efforts, it may further be preferred to eliminate the use of low-index features in the outer cladding. The fiber in FIG. 12, therefore, consists of a first high-index type core region 1200, a single layer of low-index features 1201 surrounding the core and a single layer of high-index features 1202 surrounding both the core region 1200 and the low-index features 1201. Outside the core region only a single background material 1203 is present—this background material being similar for the inner cladding region, the outer core region and the outer cladding region. Due to the higher refractive index of the features 1202 compared to the background material and the low-index features 1201, the ensemble of high-index features may act as a core in its own right that may support a propagating mode. The outer core may also be formed from an annular region 1204 of high refractive index material. The two core regions (these being the central core region 1200 and the ensemble of high-index features 1202 or the annular region 1204) thereby are able to support each their different core modes. These core modes will be decoupled at most wavelengths and only couple to each other over a relatively short wavelength range. Within this short wavelength range, the mode distributions in the fiber will change dramatically and the fiber will exhibit a strong dispersion. The qualitative operation of this type of fiber is schematically illustrated in FIG. 13. As a function of wavelength, FIG. 13a shows schematically, the effective index of a mode that is guided in a fiber comprising only the central core region 1200 and of a mode that is guided in a fiber comprising only the outer core 1201 (this outer core mode being supported by the ensemble of high-index features 1203 or the annular region 1204). The two mode curves are seen to cross at a normalised wavelength, $\lambda_{coupling}/\Lambda$. Around this wavelength, the two cores will couple strongly to each other for a composite fiber comprising both cores. At the coupling wavelength, for a fiber with a design as for example shown in FIG. 12, the effective indices of modes supported by the two cores will have a lifted degeneracy—or so-called avoided crossing will take place. In this manner the fiber is capable of guiding light in a fundamental mode corresponding to the curve 1303 that exhibits a strong negative dispersion at wavelengths around $\lambda_{coupling}/\Lambda$. The fiber may support a second mode guided indicated by the curve 1304, but it is not necessary that the fiber carries any substantial energy in the mode 1304 in order to exhibit negative dispersion in mode 1303. The fiber of FIG. 13b will guide light in the central core at wavelengths shorter than the wavelength of strongest coupling (roughly equal to the coupling wavelength indicated in FIG. 13) and the fiber will here exhibit negative dispersion with a negative dispersion slope—this is the range that dispersion compensating fibers typically are preferred to operate in. The wavelength-axis in FIG. 13 has been normalised with respect to pitch (for example the center-to-center spacing between two adjacent low-index features 1201) to indicate that the coupling wavelength may be changed by changing the pitch. The figure also indicates the index of a homogeneous cladding with a refractive index of around 1.444—corresponding to pure silica being used as background material 1203. The higher refractive index of the core 1200 as well as of the high-index features 1202 compared to the background material 1203 cause the coupling wavelength to occur in a regime where both the index of both core modes are above the cladding index. In this manner, the coupling—and thereby the strong dispersion—may be obtain while the fiber is not sensitive to bending losses. It is worth noticing that the mode indices of both core modes may be lower than the cladding index at long wavelengths. This is due to the low-index features 1201 having a refractive index significantly below that of the cladding. The core modes may, however, well be guided for mode indices below the cladding index—as is the case for conventional one-material photonic crystal fibers—but the modes may in this case experience leakage losses. These leakage losses are typically reduced for one material photonic crystal fibers by having a sufficient number of low-index features surrounding the core region that supports a propagating mode—and the outer cladding may be microstructured as for the fiber in FIG. 8. For homogeneous outer cladding regions, the potential problem of leakage-loss at the coupling wavelength may be eliminated by the use of features 1202 having a higher refractive index than the background material 1203. It is an advantage that there are different maximum refractive indices in the two core regions—and that the core region with the lower maximum refractive index has a larger special extend than the other core region. As an example, the inner or central core region (referred to as first core) may have a maximum refractive index of 1.47 and the outer core region (referred to as second core) may have a maximum refractive index of 1.465. The first core should then be designed to have the smallest cross-sectional area of the two cores, whereby the index curve of the mode guided in the first core will have a more steep slope than the index curve for the mode supported by the second core.

The magnitude of the negative group velocity dispersion depends on various things. The strength of the coupling between the two modes may be quantified by the field overlap. At $\lambda_{coupling}/\Lambda$ (where the two un-coupled modes cross) the splitting of the two modes will be proportional to the coupling strength. Often the coupling strength will only have weak wavelength dependence and in that case the wavelength-range where coupling is efficient in changing the modes is strongly related to the slopes of the two mode curves. When the slopes of the coupling mode curves are as different as possible, the effective wavelength-range will be small and the modes (which have a curved behaviour) will get the smallest possible bending curvature, i.e. numerically large group velocity dispersion will be exhibited when the slopes are as different as possible.

The present inventors have realized that microstructured fibers with a coupled-core design may also be advantageous for non-linear applications, where it is desired to have fibers with small core and a dispersion close to zero over a broad wavelength range (e.g. around 1550 nm)—such as in the wavelength range from 1300 nm to 1700 nm (this is still in the regime of negative waveguide dispersion). Looking at FIG. 13, it is seen that it will be preferred to move the coupling wavelength to smaller values of wavelength/pitch in order to reduce the fiber dimensions at a given wavelength. Hence, it may be preferred that the two core regions have a maximum refractive index that is close to each other and that the area of the two core regions is not too different. Alternatively, it is preferred that the outer core region has an effective refractive index close to the (effective) refractive index of the cladding.

According to the present invention, a number of characteristics are preferred for fibers as schematically shown in FIG. 12:

Core region 1200 having a maximum refractive index, $N_{co,1}$. Typically, silica doped with Germanium and/or other doping materials will be used to form the core. Various refractive index profiles of the core may be preferred, but typically a profile as close to a step-index profile will be preferred. Hence, typically $N_{co,1}$ is larger than 1.444, such as preferably larger than 1.46, such as larger than 1.47 at wavelengths around 1550 nm.

Background material 1204 having a refractive index, $N_{cl,2}$, that is lower than $N_{co,1}$. Typically, the background material is pure silica, having a refractive index of around 1.444 at wavelength around 1550 nm, but silica doped with a doping material to lower the refractive index of $N_{cl,1}$ below 1.444 may also be preferred, such as fluorine-doped silica glass.

Low-index features 1201 having a refractive index, $N_{cl,1}$, a diameter, $d_{cl,1}$, and a center-to-center spacing between two adjacent low-index features, $\Lambda_{cl,1}$. Typically, these low-index features are voids, hence $N_{cl,1}$ is around 1.0, but low index features formed from down-doped silica may also be preferred. For dispersion compensation applications, typically the low-index features will have a diameter, $d_{cl,1}$, in the range from around $0.5\Lambda_{cl,1}$ to $0.9\Lambda_{cl,1}$ and for non-linear fiber applications, typically, $d_{cl,1}$ will be in the range from $0.2\Lambda_{cl,1}$ to $0.5\Lambda_{cl,1}$. In order to reduce degrading effects, such as polarisation mode dispersion, PMD, it is often preferred that all low-index features are identical and equally spaced. Also other numbers of low-index features than 6 is covered by the present invention as well as more than one "ring" of low-index features surrounding the core region 1200.

High-index features 1202 having a refractive index, $N_{co,2}$, a diameter, $d_{co,2}$, and a center-to-center spacing between two adjacent high-index features, $\Lambda_{co,2}$. Typically, these high-index features comprise doped silica glass, hence $N_{co,2}$ is larger than 1.444 at wavelengths around 1550 nm, but high-index features formed from pure or down-doped silica may also be preferred. For dispersion compensation applications, typically the high-index features will have $N_{co,2}$ in the range from 1.444 to 1.460 at wavelengths around 1550 nm and a diameter, $d_{co,2}$, in the range from around $0.1\Lambda_{co,2}$ to $0.9\Lambda_{co,2}$ and for non-linear fiber applications, typically, $d_{co,2}$ will be in the same range. Furthermore, in order for the ensemble of high-index features to support only a single-mode, it is often preferred that the size of the high-index features is smaller than the size of the low-index features 1201. The present inventors have further found that it is an advantage that the refractive index profile of the high-index features is as close as possible to a step-index profile in order for the coupling to be as dramatic as possible—and thereby the dispersion as strong as possible. In order to reduce degrading effects, such as polarisation mode dispersion, PMD, it is often preferred that all high-index features are identical and equally spaced. Alternatively, the ensemble of high-index features in the outer core may be substituted by a homogeneous high-index annular region 1204. Such an annular region—being either the complete or parts of the outer core region—may have the same functionality as the ensemble of high-index features. The width, the maximum refractive index and the index profile of the annular region are key parameters for the fiber. Also other numbers of high-index features than 6 is covered by the present invention as well as more than one "ring" of low-index features surrounding the core region 1200.

Figure 14A:
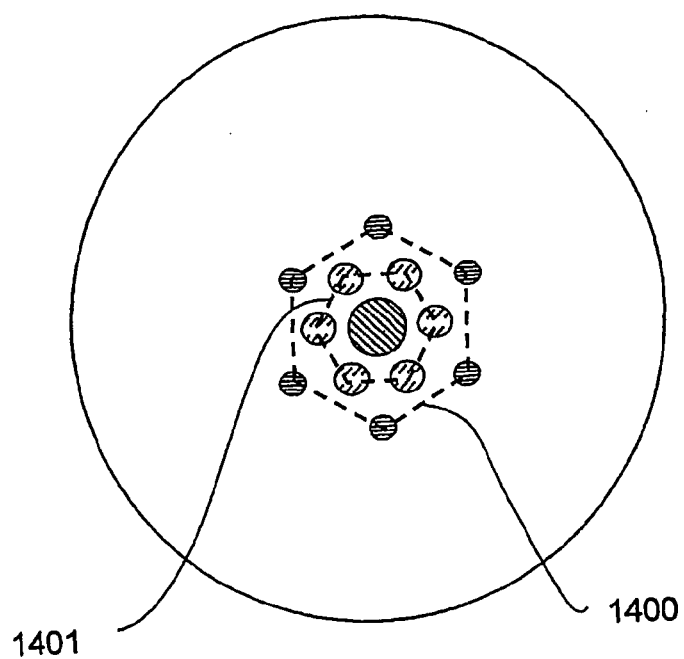
FIG. 14 shows schematically a preferred positioning of low-index features in the inner cladding and of high-index features in the outer core with respect to each other.
Figure 14B:
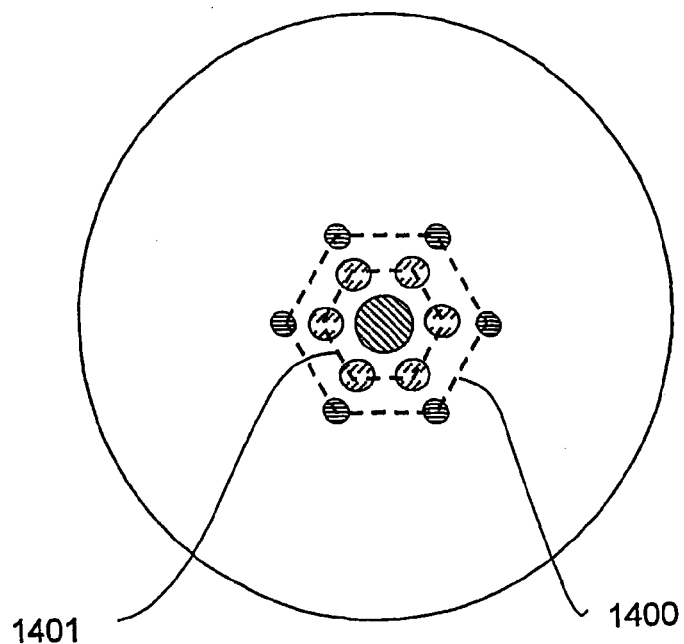
Figure 15:
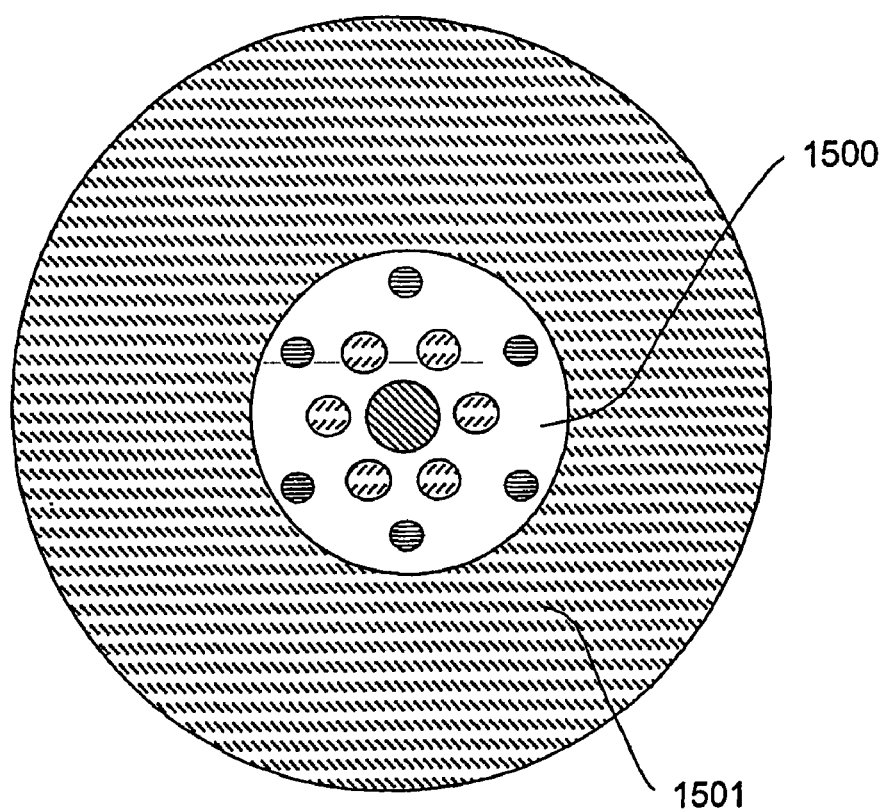
FIG. 15 shows schematically a fiber according to the present invention where the outer cladding is homogeneous and comprises a material different from the background material of the inner cladding and of the outer core. Typically, the outer cladding material has a lower refractive index than the background material of the inner cladding and of the outer core.

In order to optimise the coupling between modes supported by the first core region 1200 and the second core region (formed from the high-index features 1202), it is often preferred that the high-index features are positioned such that light penetrating between two low-index features from the core region 1200 will experience the high-index features most strongly. To quantify this, it may be preferred that a first polygon 1400 drawn from centres of high-index features and a second polygon 1401 drawn from centres of low-index features are concentric, but rotated with respect to each other an angle given by $0.5(N_1/360')$, where $N_1$ is the number of low-index features. Hence, for a fiber with 6 low-index features (as in FIG. 14), the first polygon 1400 is rotated 30 degrees compared to the second polygon 1401, and both polygons are coinciding. Alternatively, the second polygon may have a similar orientation as the first polygon. As schematically illustrated in FIG. 15, it may also be preferred that the outer cladding region 1501 comprises a different material—or a material with a different refractive index—than the background material 1500 of the inner cladding and/or the outer core.

It is important to notice that the above-described design ideas for providing microstructured optical fibers for dispersion and dispersion slope compensation as well as for non-linear applications is profoundly different from the ideas presented by DiGiovanni et al. in U.S. Pat. No. 5,802,236, where a second core region capable of supporting a propagating mode is taught to be disadvantageous.

Figure 12A:
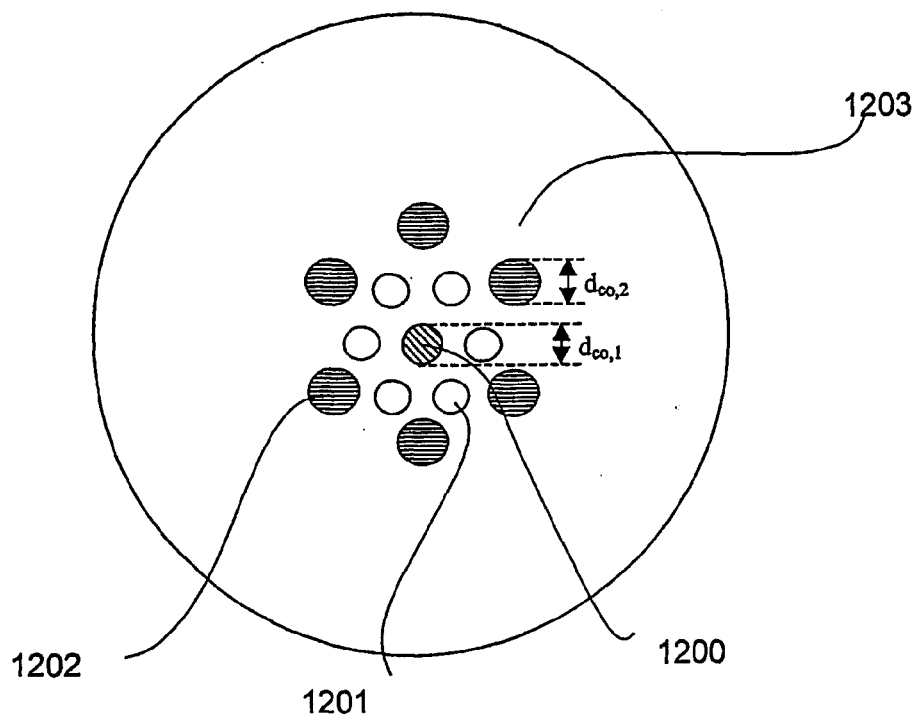
FIG. 12 shows schematically a fiber according to the present invention where the outer cladding is homogeneous and a) the outer core comprises high-index features or b) the outer core comprises an annular high-index region.
Figure 12B:
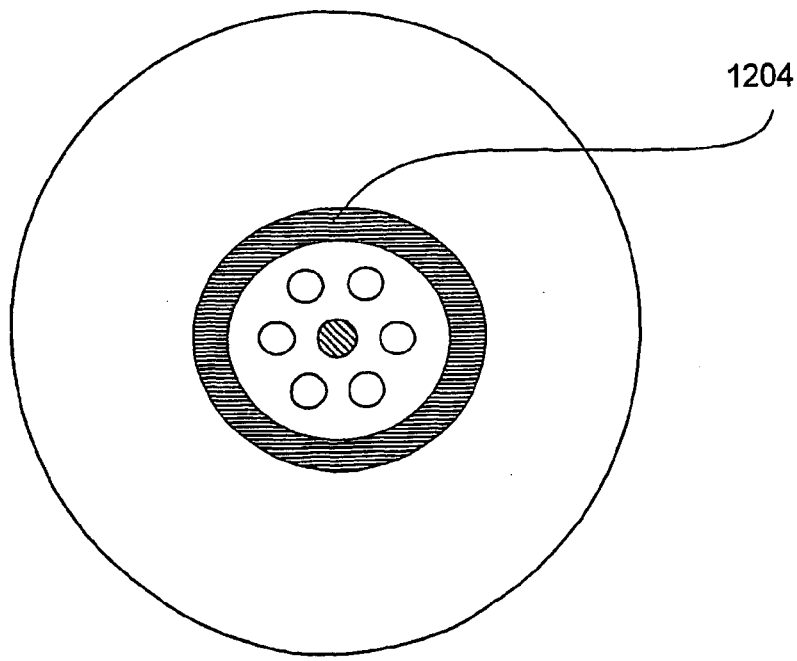
Figure 13A:
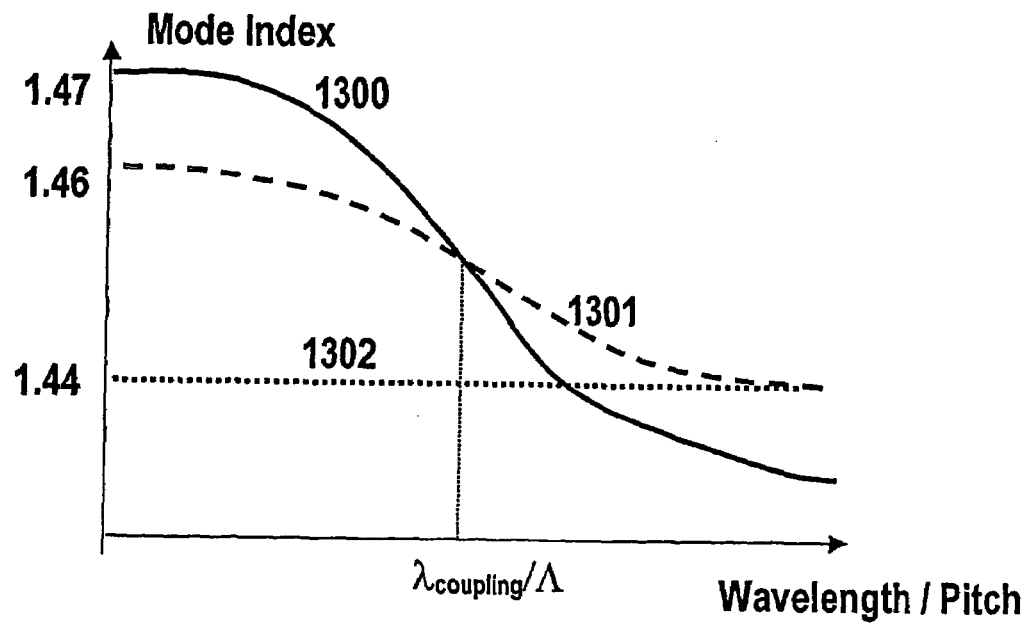
FIG. 13 shows qualitatively the operation of a dispersion compensation fiber according to the present invention that may have large negative dispersion and low bending losses.
Figure 13B:
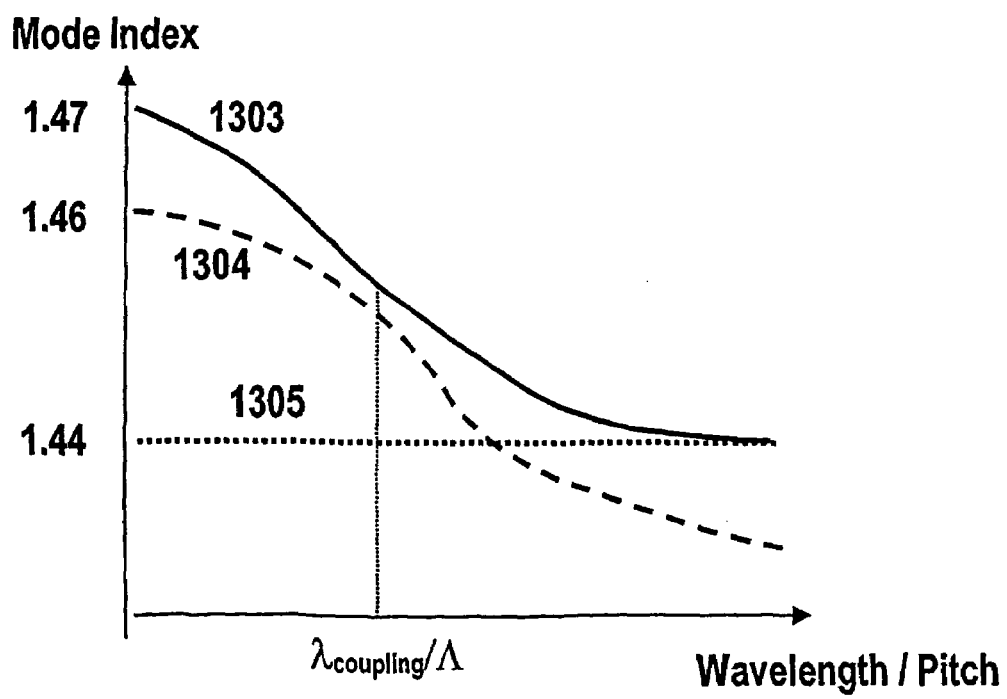

To illustrate in more detail the operation and some of the possibilities of fibers according to the present invention, various design parameters of fibers as shown in FIG. 12a shall be considered next.

Figure 16A:
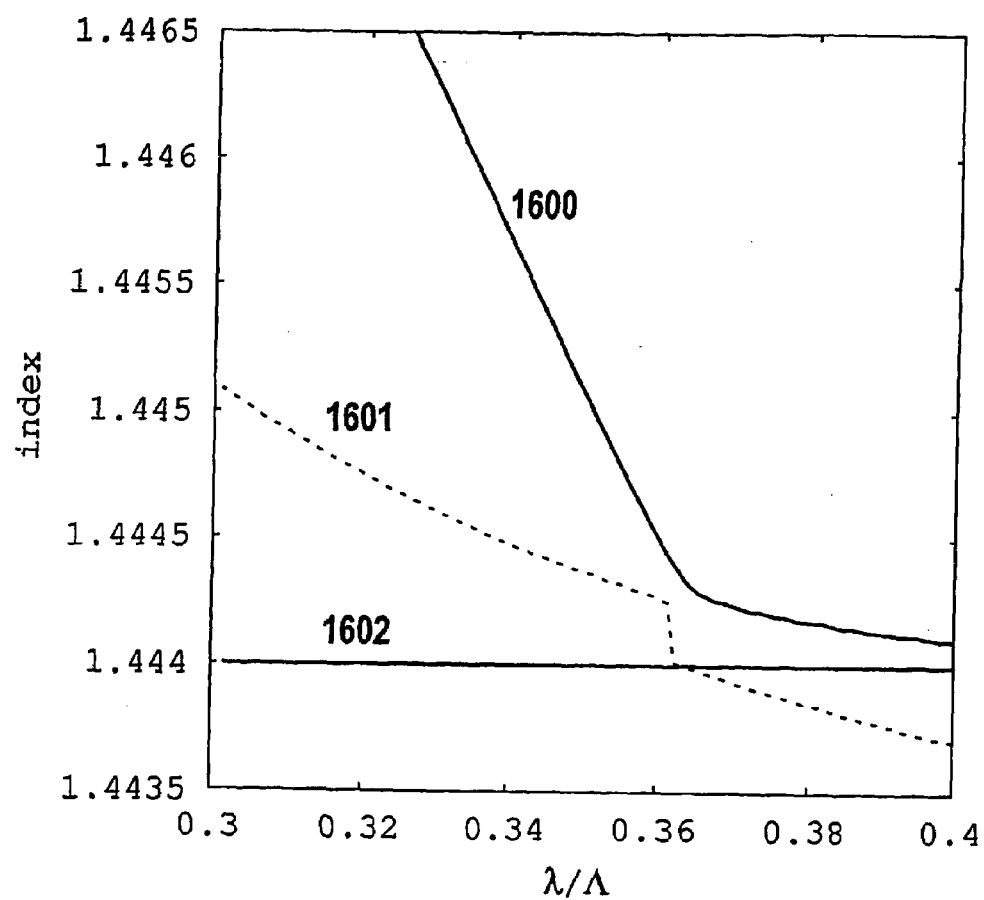
FIG. 16 shows a simulation of the mode indices for another fiber according to the present invention.
Figure 16B:
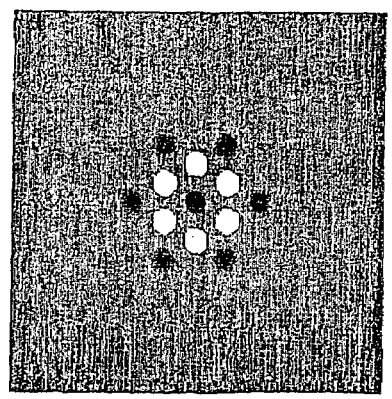

FIG. 16 shows a simulation of a fiber according to the present invention having a design as schematically shown in FIG. 12. The fiber has the following design parameters: The first core has a step-index profile with a maximum refractive index of 1.471 (corresponding to a refractive index change of 1.892% compared to pure silica having refractive index of 1.444 at $\lambda$=1550 nm) and a background material of refractive index 1.444 (pure silica). The inner cladding region comprises a background material of refractive index 1.444 and six voids of diameter $0.5\Lambda$, where $\Lambda$ is the center-to-centre spacing between to two nearest voids. The second core region comprises a background material of refractive index 1.444 and six high-index features of refractive index 1.459 (corresponding to a raised index of 1.055% compared to pure silica). The outer cladding region is homogeneous and comprises pure silica with a refractive index of 1.444. While the outer cladding region is homogeneous in this case, it may also comprise varies sub-regions for example for lowering bending losses. As seen from FIG. 16, the fiber supports a fundamental mode 1600 that has a strongly dispersive behaviour at normalized wavelengths, $\lambda/\Lambda$, of around 0.36. The curve 1601 represent the effective index of a mode that may be supported by the second core and the curve 1602 represent the refractive index of the outer cladding region. It should be noted that it is here chosen to use a normalisation factor, $\Lambda$. The fibre in FIG. 16 will have $\Lambda$ of around 4.3 µm for negative dispersion operation of around $\lambda$=1550 nm. This provides a core size that is significantly larger than the core sizes disclosed by the previously discussed DiGiovanni et al. and Birks et al. references. Furthermore, as shall be demonstrated next, the negative dispersion that may be exhibited by fibers according to the present invention can be significantly larger than for the fibers disclosed in the above-mentioned DiGiovanni and Birks references.

For tailoring fibers according to the present invention for given specifications, a wide range of parameters may be tuned. The following figures show examples of how various fiber characteristics (such as dispersion, RDS and core size) may be tuned by adjusting design parameters.

Figure 17:
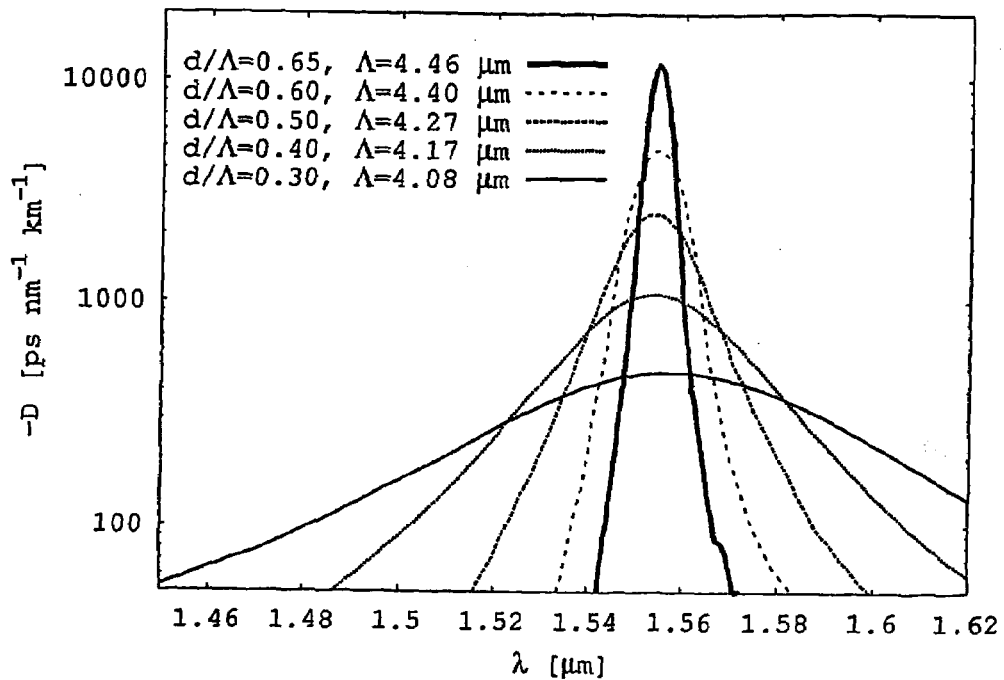
FIG. 17 shows a simulation of the dispersion of a range of fibers according to the present invention.

The present inventors have found that the negative dispersion depends strongly on the size of the inner cladding features. FIG. 17 shows a simulation of the dispersion characteristics of fibers as in FIG. 16, but with $\Lambda$ ranging from 4.08 µm to 4.46 µm, and inner features being voids with a size that ranges from d/$\Lambda$ of around 0.30 to 0.65. As seen from the figure, the dispersion has a characteristic "dip" with a dispersion minimum (the strongest dispersion) and a certain width. It is worth noticing varying the size of the inner cladding features has a strong influence on the minimum dispersion values as well as the width of the "dip" whereas the wavelength of strongest negative dispersion is only varied slightly. As seen from the figure, negative dispersion that is significantly beyond prior art dispersion compensating fibers is feasible.

Figure 18:
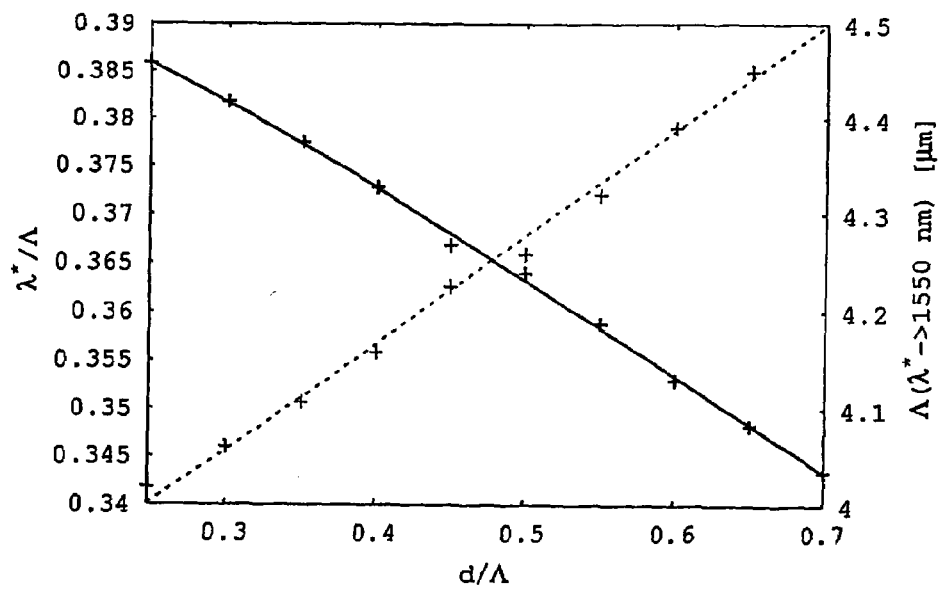
FIG. 18 shows a simulation of the wavelength of strongest negative dispersion and the corresponding hole spacing for a range of fibers according to the present invention designed for operation around 1550 nm.

FIG. 18 shows the normalized wavelength of strongest dispersion, $\lambda*/\Lambda$, as a function of size of the inner cladding features (solid curve). The figure shows that by adjusting the features size, d/$\Lambda$, from around 0.25 to 0.70, $\lambda*/\Lambda$ can be varied from around 0.34 to 0.385. For the strongest dispersion to occur at a wavelength of around 1550 nm, this corresponds to $\Lambda$ varying from around 4.03 µm to 4.50 µm (dashed curve), and d ranging from around 1.0 µm to 3.2 µm. These $\Lambda$ values provide a relatively large separation between the high-index feature in the core 1200 and the air holes 1201. The distance from the center of the fiber to a center of an air hole 1201 is similar to $\Lambda$, hence, the afore-mentioned separation is given by $s_1=\Lambda-d-d_{co,1}$. With $d/\Lambda$ ranging from 0.25 to 0.70 and $d_{co,1}$ ranging from $0.5\Lambda$ to $0.8\Lambda$ this provides a separation s1 ranging up to 1.2 µm. For other designs that are within the present invention, the separation may be larger as may be deduced from the various examples of fibers according to the present invention. A non-zero separation, s1, provides an important technical advantage in terms of lowering potential losses associated with the air holes—as shall be discussed in further detail at a later stage. Another important feature of fibers according to the present invention is the relatively large separation between the first core 1200 and the second core (ensemble of high-index features 1202 or ring-shaped element 1204). This separation is typically larger than $\Lambda$, such as larger than 4.0 µm as apparent from the various examples of the present application. Alternatively, this advantage is apparent in the relatively large diameter of the second core (the diameter being defined as the radial distance in the cross-section from the of the fiber to a center of the second core region (such as for example a center of one of the second core features 802, 1202 or a center of the ring-shaped region 1204). As apparent from the various examples of fibers according to the present invention, e.g. as illustrated in the various embodiments in the figures, this diameter is typically in the range from 10 µm to 20 µm. Larger diameters may be desired for fibers operating in a higher-order mode—as shall be discussed at a later stage. It is important to notice, that the above-described separations and diameters are significantly larger than for fibers disclosed by Fajardo et al. in WO 01/98819. The above-described feature is advantageous in separating the two cores for more simple in-coupling (including splicing) such that light may be coupled substantially only into the first core region. For splicing to a standard transmission fiber (which dispersion is desired to be compensated) it is an advantage that the second core has a diameter larger than the core diameter of the transmission fiber. Typical transmission fibers have a core diameter of around 8 µm, and in order to avoid coupling into the second core at a fiber splice, it is an advantage that the diamater of the second core is larger than 8 µm (preferably larger than 10 µm) such that its overlap with the core of the transmission fiber is limited or negligible when the center of the first core of the dual core fiber is aligned to the center of the core of the transmission fiber. Furthermore, in order to lower in-coupling losses, it is desired that the first core—and importantly the high-index feature of the first core—has a size that is approaching the size of the core of the transmission fiber nor an intermediate fiber that has been inserted between the transmission fiber and the dispersion compensating fiber to provide mode adaption. In the prior art, intermediate fibers having a core size smaller than the transmission fiber is often inserted between the transmission fiber and the dispersion compensating fiber in order to adapt the core sizes. Typically, intermediate fibers may adapt cores from around 8–9 µm in diameter to cores of down to 4 µm. Hence, it is desirable to realize dual core dispersion compensating fibers with a first core having a diameter of around 4 µm to 8 µm and a second core diameter of larger than 9 µm. As apparent from the present application, such a feature is characteristic for a number of fibers according to the present application.

The relatively large dimensions for the here-disclosed fibers provide several important technical advantageous as discussed throughout the application apart from the facilitated in-coupling—including relatively large MFD for lowering non-linear effects, lower PMD as lower birefringence is typically found for micro-structured fibers of larger dimensions and symmetric feature arrangements, lower losses as larger dimensions provide decreased field intensity in the air holes of the first cladding region for light guided in the first core. One or more of these technical advantages may be obtained for fibers according to the present invention at the same time as a stronger dispersion is obtained.

Figure 19:
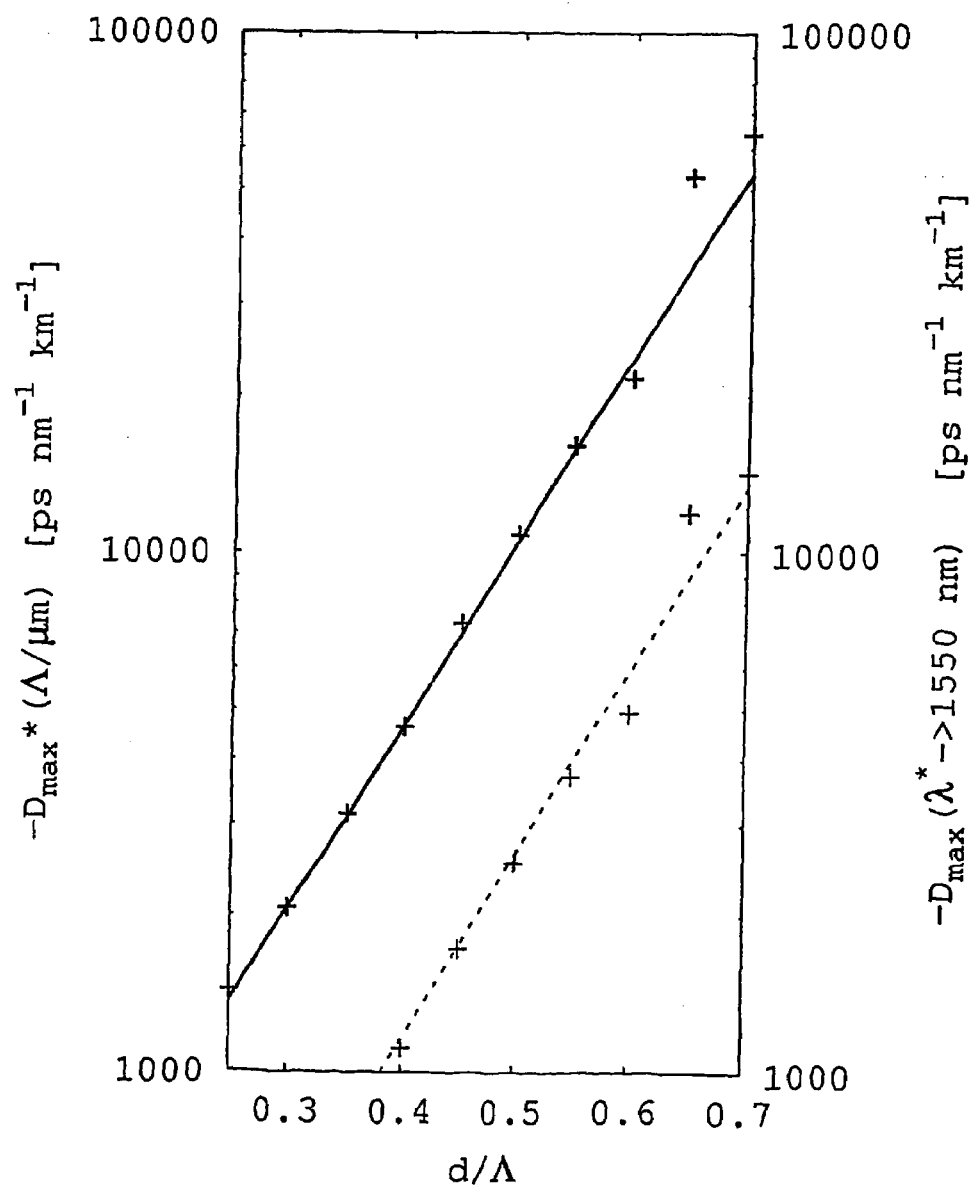
FIG. 19 shows a simulation of the strongest negative dispersion value of a range of fibers according to the present invention.

FIG. 19 shows a simulation of the value of minimum dispersion (strongest negative dispersion) for a fiber according to the present invention having inner cladding features varying in size from $d/\Lambda$ of around 0.25 to 0.70 (normalized dispersion is indicated with a solid line—right axis). For operation around 1550 nm, it is possible to vary the dispersion from around −400 ps/nm/km to more than −10000 ps/nm/km (dashed curve—left axis). As previously mentioned, such dispersion characteristics are significantly stronger than for any prior art optical fiber.

Figure 20:
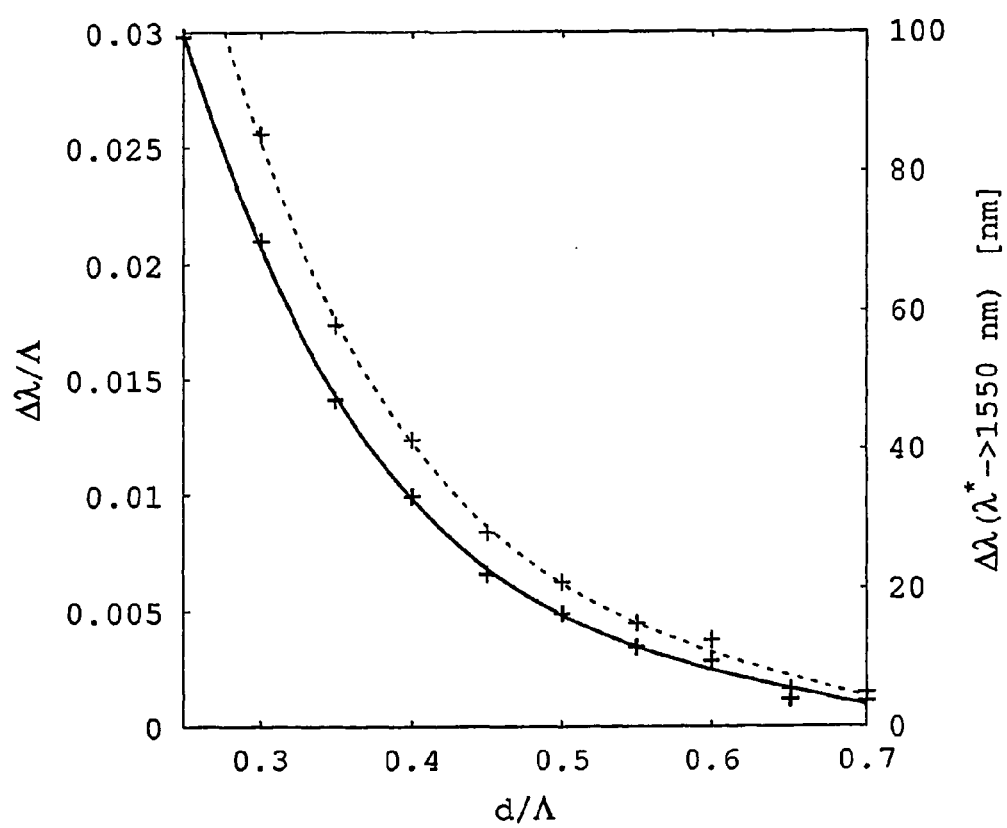
FIG. 20 shows a simulation of the width of the dispersion "dip" of a range of fibers according to the present invention.

As seen from FIG. 17, the width of the negative dispersion "dip" depends strongly on the size of the inner cladding features. Generally, a larger inner features size results in stronger dispersion, but a more narrow "dip". In FIG. 20, the width, $\lambda$, of the dispersion "dip" is simulated as a function of inner cladding features size (normalized width, $\Box\lambda/\Lambda$, is shown by solid line (right axis) and for operation at $\lambda=1550$ nm, the absolute width, $\Box\Box$, is shown by the dashed line (left axis)). The width is determined as the full-width-half-maximum (FWHM) of the numerical value of the dispersion. As seen from the figure, for a FWHM value of more, than 30 nm, the fiber should be designed with feature size, $d/\Lambda$, of around 0.45 or less.

Figure 21:
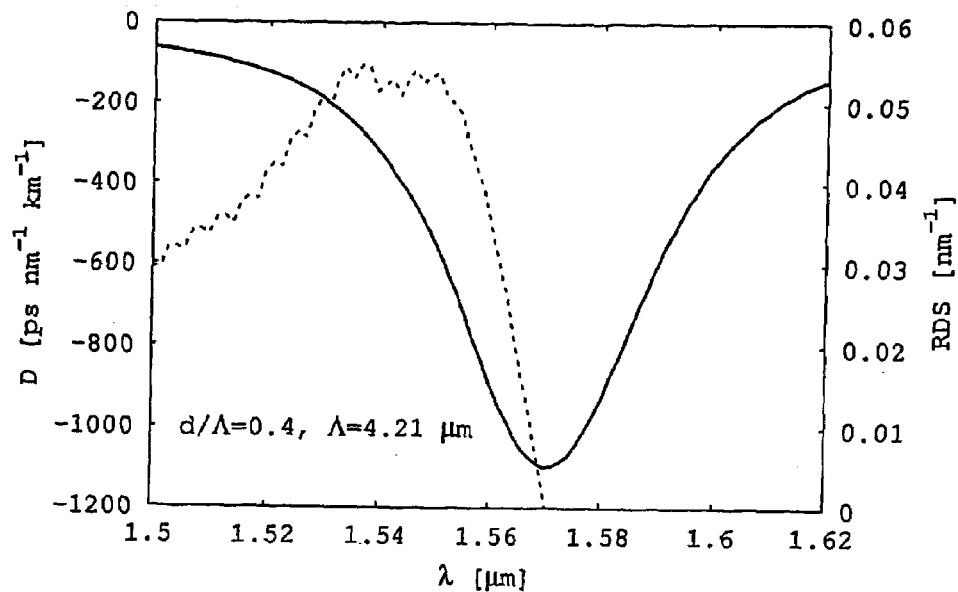
FIG. 21 shows a simulation of the dispersion and relative dispersion slope for a fiber according to the present invention.
Figure 22:
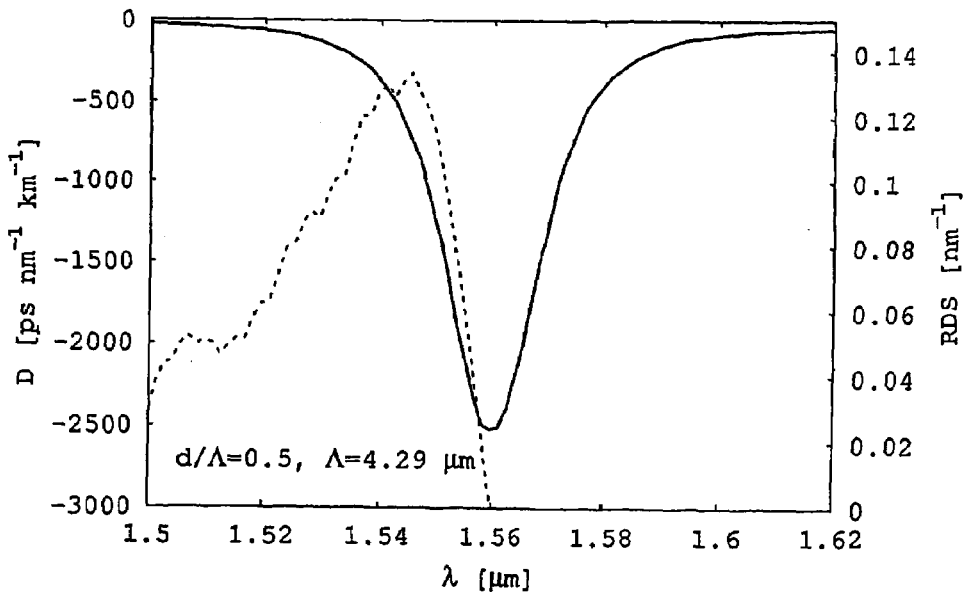
FIG. 22 shows a simulation of the dispersion and relative dispersion slope for another fiber according to the present invention.
Figure 23:
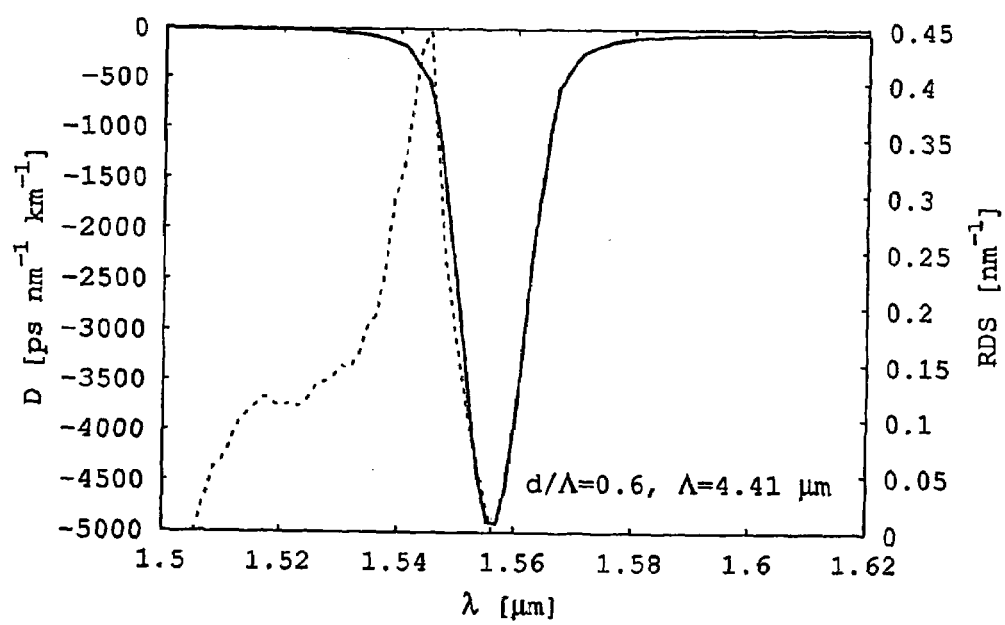
FIG. 23 shows a simulation of the dispersion and relative dispersion slope for yet another fiber according to the present invention.

FIG. 21 shows a calculation of the RDS values and the dispersion of another fiber according to the present invention having $d/\Lambda=0.4$ and $\Lambda=4.214$ µm. As seen from the figure, the fiber exhibits a strong negative dispersion of more than −500 ps/nm/km as well as a high RDS value of around 0.03 $nm^{-1}$ at a wavelength of 1550 nm. Such a fiber is well suited for dispersion and dispersion slope compensation. FIGS. 22 and 23 shows similar results for fibers having $d/\Lambda=0.5$ and $d/\Lambda=0.6$.

Figure 24:
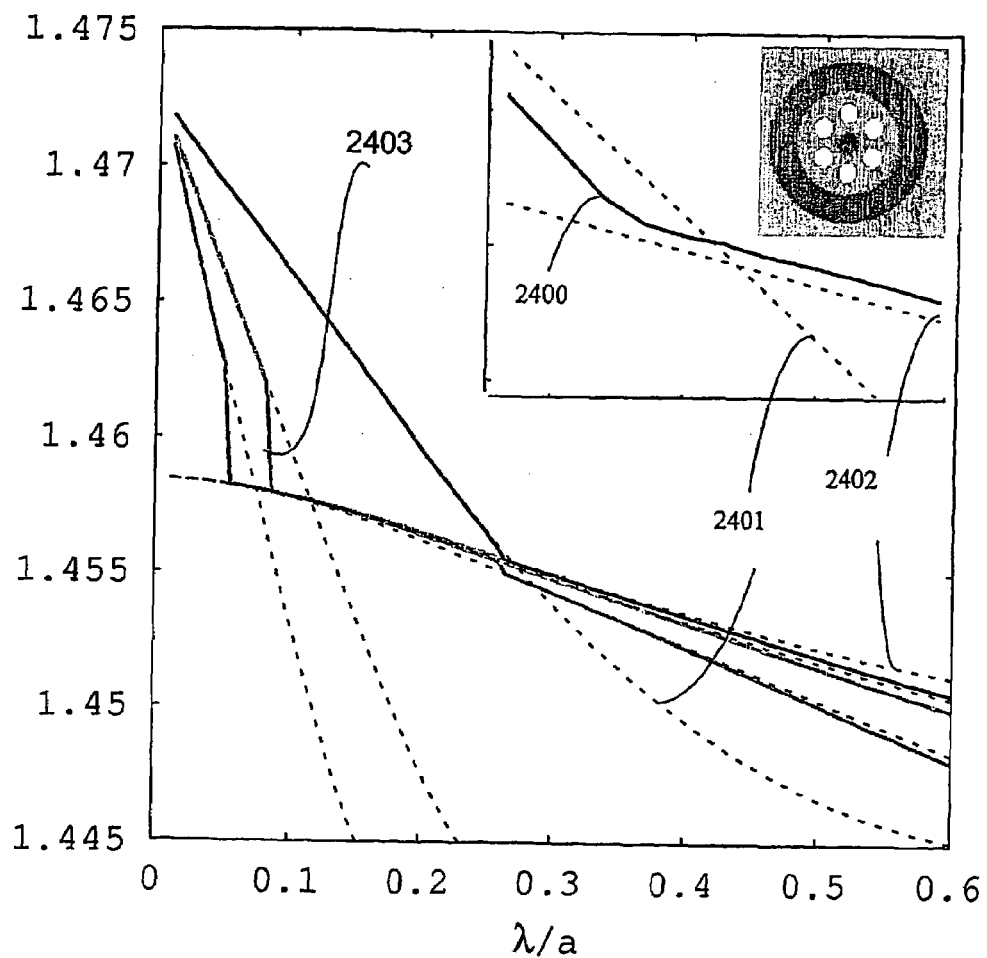
FIG. 24 illustrates the operation of another fiber according to the present invention. The figure illustrates the possibility of using higher order modes in the central core for dispersion compensating applications for fibers according to the present invention.

FIG. 24 shows another example of a fiber according to the present invention. In this figures, the outer core is a homogeneous material. The figure shows the operation of the fiber, which is similar to the previously discussed fibers of FIG. 12. It is important to notice that the fibre exhibits an abrupt cut-off both of the fundamental mode 2400 at $\lambda/a$ of around 0.28, as well as of higher-order modes at $\lambda/a$ around 0.1, where a is the radius of the high-index feature in the core (the first higher-order mode is shown by the line 2403). This behaviour is also characteristic for the other types of fibers disclosed in the present application. The higher-order mode with a cut-off of around $\lambda/a=0.1$ corresponds to an LP11 mode that is supported by the first core. This mode will exhibit a strong negative dispersion around $\lambda/a=0.1$ that may be utilized for dispersion compensating applications.

Hence, for operation at a given wavelength, the structural dimensions of the fiber should be scale approximately 0.28/0.10=2.8 times larger for operation in the higher order mode. An operation around $\lambda/a$ of 0.1 corresponds to a value of around 15 µm for operation at a wavelength of around 1550 nm. This results in a significantly larger core size compared to the core size of the previously discussed fibers operating in a fundamental mode. Furthermore, as the cut-off of the higher-order mode is seen to be even more abrupt for the higher order mode compared to the fundamental mode—even stronger negative dispersion may be obtained.

For the single-mode dispersion compensating fiber, $\lambda=1.55$ μm, dictates an a-value of around 5.5 μm, and for the higher-order mode dispersion compensating fiber, an a-value of around 15 μm is dictated. The present invention also relates to higher-order mode dispersion compensating fibers for other fiber designs that are disclosed by the present invention—dimensions must naturally be scaled and relations between design parameter may changes for transfer of a design for single-mode dispersion compensation to higher-order mode dispersion compensation.

Figure 25:
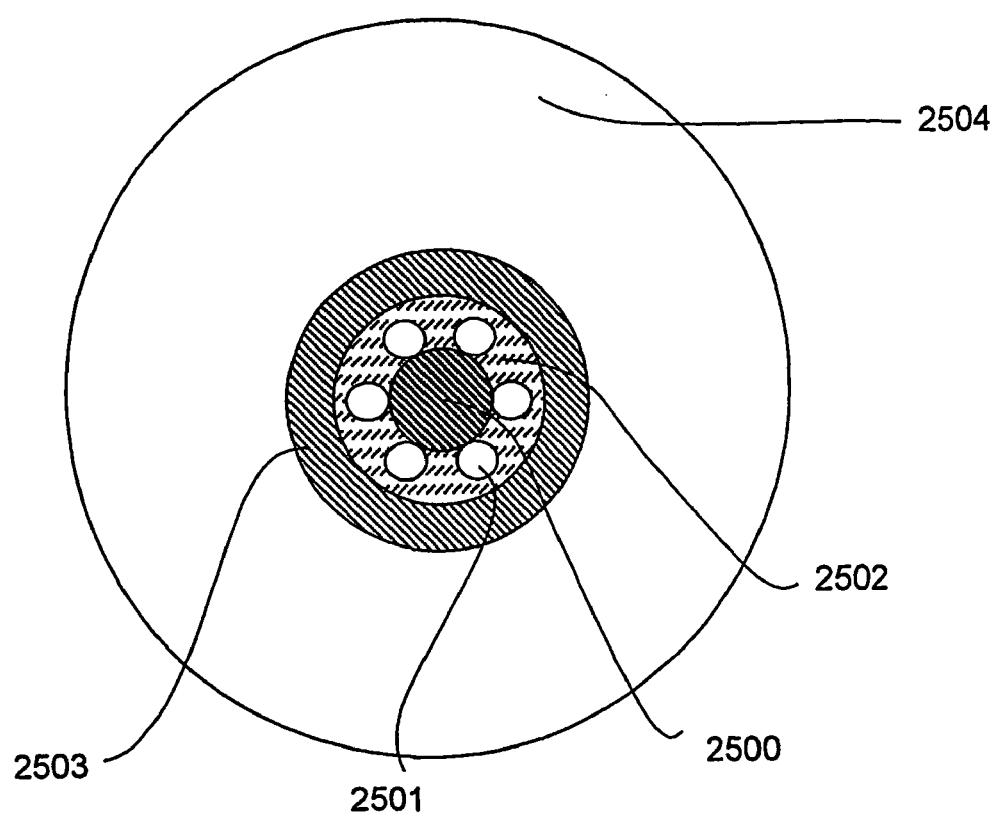
FIG. 25 shows a schematic example of another fiber according to the present invention.

FIG. 25 shows another schematic example of a dispersion compensating fibre according to the present invention. The fiber is characterized by a first core region 2500 in the center of the fiber, an inner cladding region (a first cladding region) comprising low-index features 2501 and a background material 2502, a second core region 2503 and an outer cladding region 2504 (a second cladding region). The first core 2500 has a size being adapted such that the core makes contact with features in the inner cladding 2501—this type of core has also been discussed by Fajardo et al. in WO 01/98819. The first core 2500 is characterized by a refractive index being higher than the refractive index of the features 2501 as well as that of the background material 2502 of the inner cladding. The second core 2503 that may either be homogenous (as shown in FIG. 25) or it may contain a number of micro-structured features (as discussed previously for example in FIG. 13). The second core comprises material with a higher refractive index compared to the effective index of the inner cladding region and a lower refractive index compared to a maximum refractive index of the first core. In a preferred, embodiment, the background material of the inner cladding region 2502 is identical to the refractive index of the second core 2503. The material of 2502 and 2503 may in this case be identical such as pure silica or silica comprising one or more index-raising dopants, such as for example Ge.

Figure 26A:
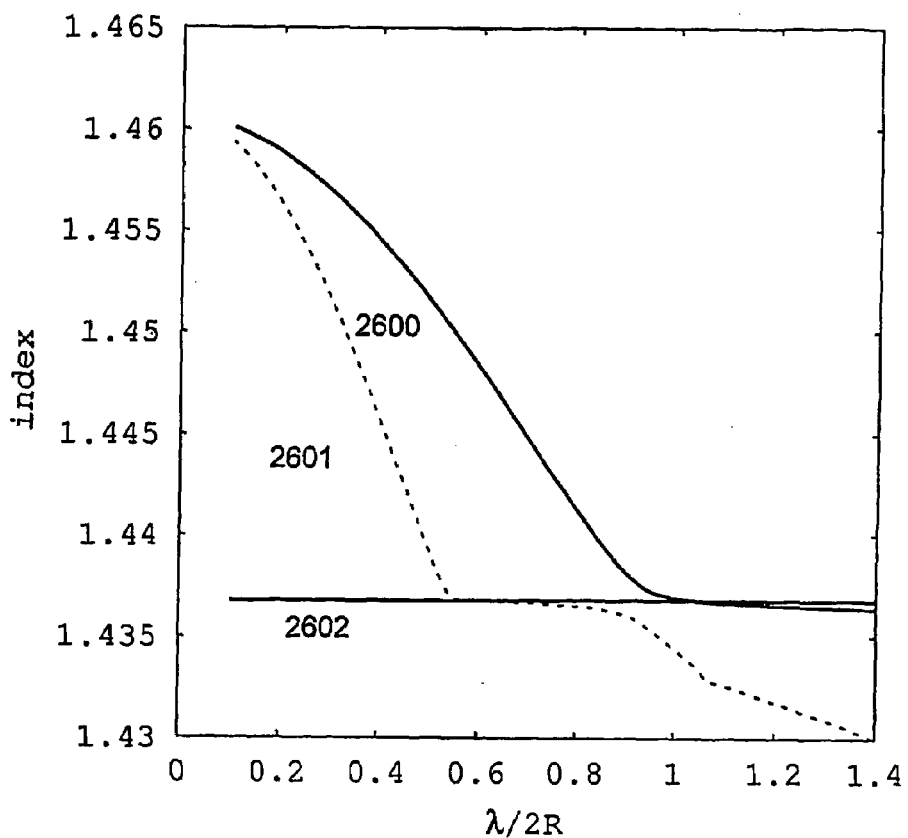
FIG. 26 illustrates the operation of a fiber according to the present invention having an outer core with the same refractive index as the refractive index of the inner cladding region.
Figure 26B:
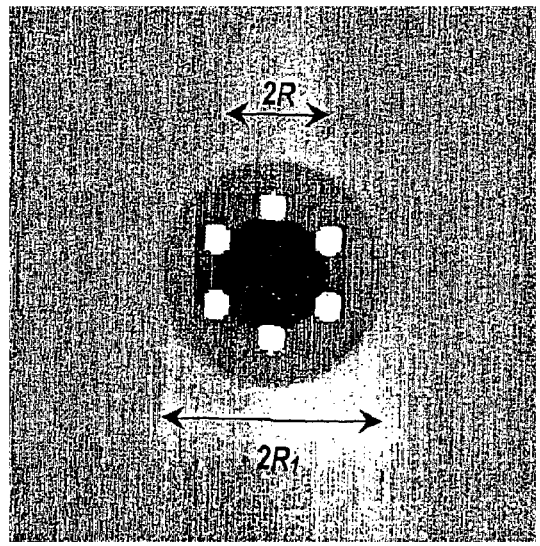

An important issue for dispersion compensating fibers is their bending losses. The present inventors have analysed a number of fibers according to the present invention and found an important design parameter related to the cross-sectional size of the second core (or the total area of high-index feature in the second core in the case of an ensemble of high-index features forming the second core). This parameter is important for lowering bending losses of the fibers as shall be demonstrated using the FIGS. 26 and 27. Looking first at FIG. 26, the fibre is characterized by a first core with a refractive index of 1.461 and the inner cladding region comprises six air holes with diameter, d. The background material of the inner cladding region is similar to the material of the outer core and it has a refractive index of 1.444 (pure silica). The outer cladding comprises silica with a refractive index of 1.437, this may be obtain for example by F-doping of silica. The fiber in FIG. 26 has an outer radius of the inner cladding region labelled R and an outer radius of the second core labelled $R_1$. The fiber has $R_1/R=2$ and $d/R=0.37$. In FIG. 26 is illustrated a simulation of the operation of the fiber. The figure illustrates the effective indices of various modes of the fiber as a function of normalized wavelength, $\lambda/2R$. The curve 2600 represents the fundamental mode guided in the core region, the curve 2601 represent a higher order mode that is supported by the fiber, but not necessarily carries any energy, and the curve 2602 represent the refractive index of the outer cladding region. The figure shows that the curve 2600 has a strongly dispersive behaviour at normalized wavelengths around 0.9. The dispersive behaviour is noticeable by the "bending" of the curve 2600. This shows that the fiber exhibits a strong negative dispersion at normalized wavelengths around 0.9— and the fiber may, therefore, in principle, be used for dispersion compensating applications. There is, however, an important issue to consider for this fibre. This issue relates to the index difference between the curves 2600 and 2602. The two curves have a relatively small difference in the wavelength regime of strongly dispersive behaviour (for this specific example the difference is around 0.001 or less at the wavelength of strongest dispersion). This small difference has the negative effect that the mode corresponding to curve 2600 will not be strongly confined at the strongly dispersive regime and may experience high bending losses.

Figure 27A:
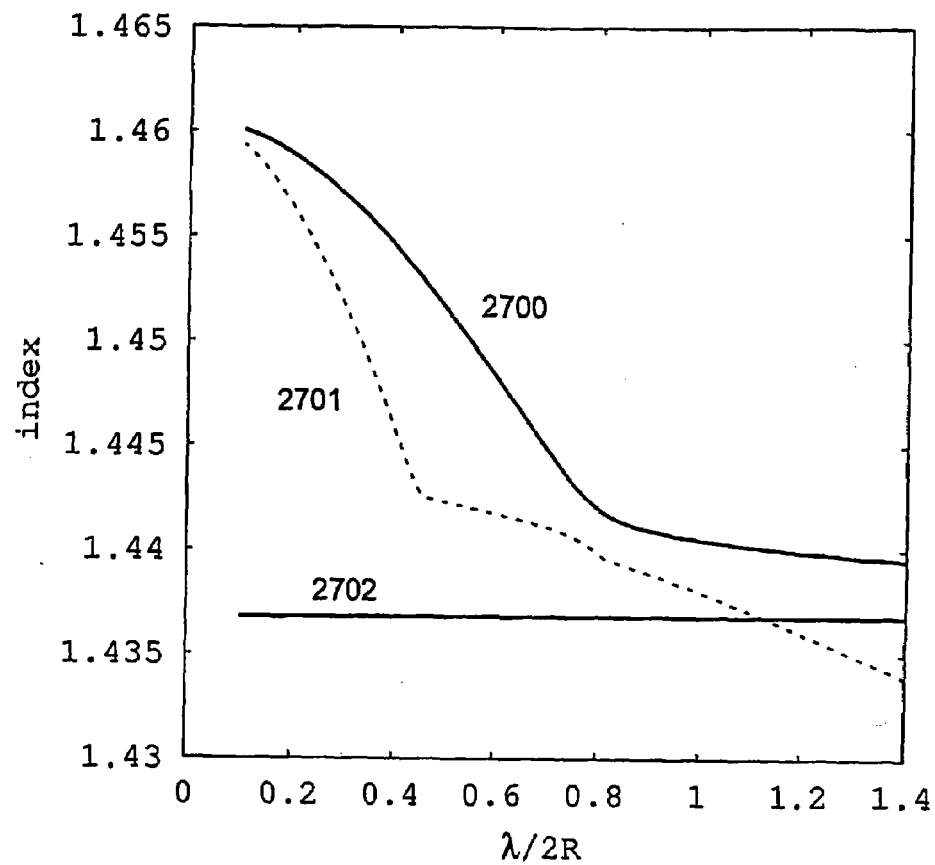
FIG. 27 illustrates the operation of a fiber according to the present invention being comparable to the fiber in the previous figure, but with a larger size of the outer core.

The present inventors have realized that the potential problem of bending losses may be solved by careful design of the second core—more specifically by increasing the cross-sectional area of this region—or equivalently its width. As shown in FIG. 27, the present inventors have found that for $R_1/R$ above 2, such as around 4, the strongly dispersive behaviour of the curve 2700 (to be compared with 2600 in FIG. 26), may be lifted significantly above the refractive index of the outer cladding 2702—thereby lowering the bending losses of the fiber. Hence, it is advantageous to have the outer diameter of the second core cladding region being more than two times larger than outer diameter of the inner cladding region (this diameter here being defined as 2R), and preferably around 4 times larger. Naturally, as those skilled in the art will understand, the exact position of the strongly dispersive regime depends on a number of design parameters including the refractive index of the various materials that the fiber is composed of as well as the morphology of the various microstructures and regions in the fiber (among others, these being size, shape and arrangement).

Figure 27B:
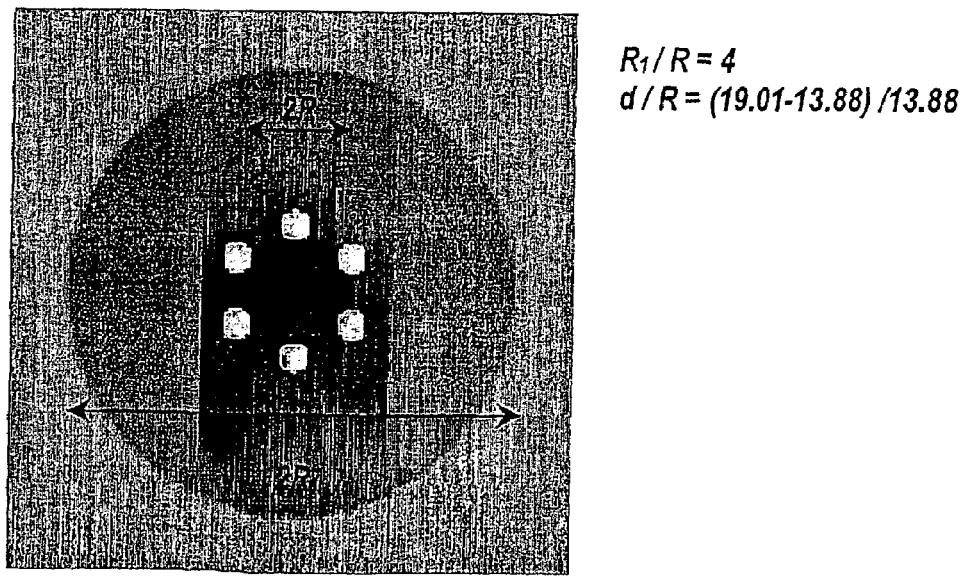
Figure 28:
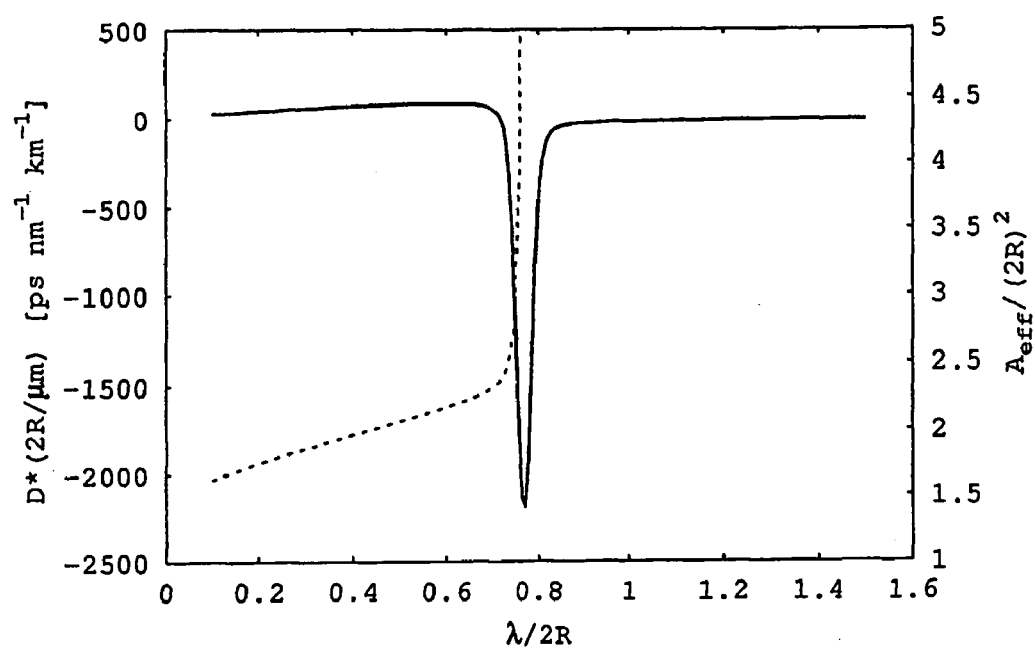
FIG. 28 shows a simulation of the dispersion and the effective area of the fiber of the previous figure.

Considering next the dispersion that may be obtained for the fiber of FIG. 27b, FIG. 28 shows the normalized dispersion (solid curve), where the factor 2R has been used for normalization. FIG. 28 also shows the effective mode area (dashed curve) of the fundamental mode. As seen, the effective area is strongly increasing as the negative dispersion regime is reached (it should be noticed that the fiber should be operated at the short wavelength side of the dispersion dip). The large increase in effective area is attributed to the fundamental mode being coupled to the second core at wavelengths longer than the minimum dispersion wavelength.

Figure 29A:
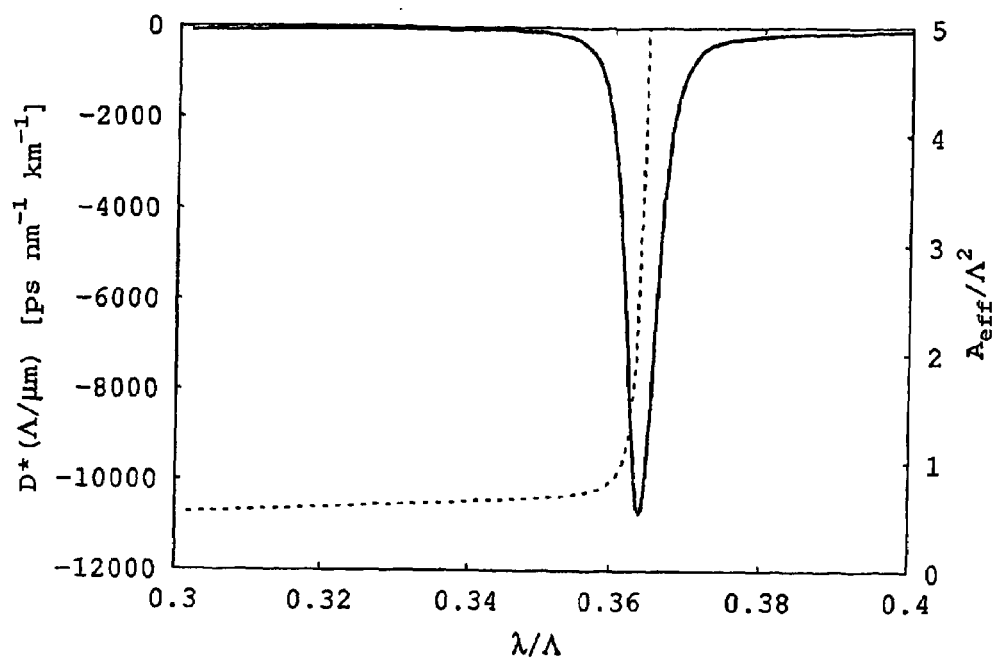
FIG. 29 shows a simulation of the dispersion and the effective area of a fiber according to the present invention having a high-index core not being in contact with the inner cladding.
Figure 29B:
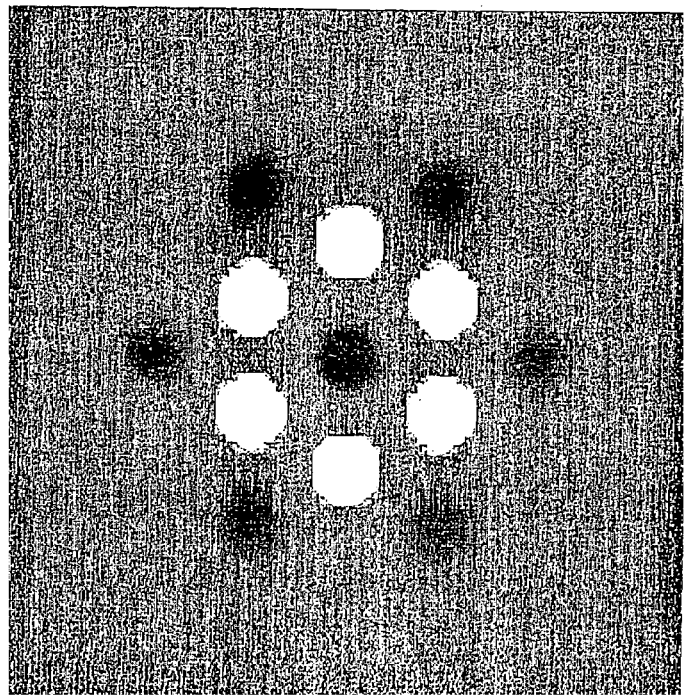
Figure 30:
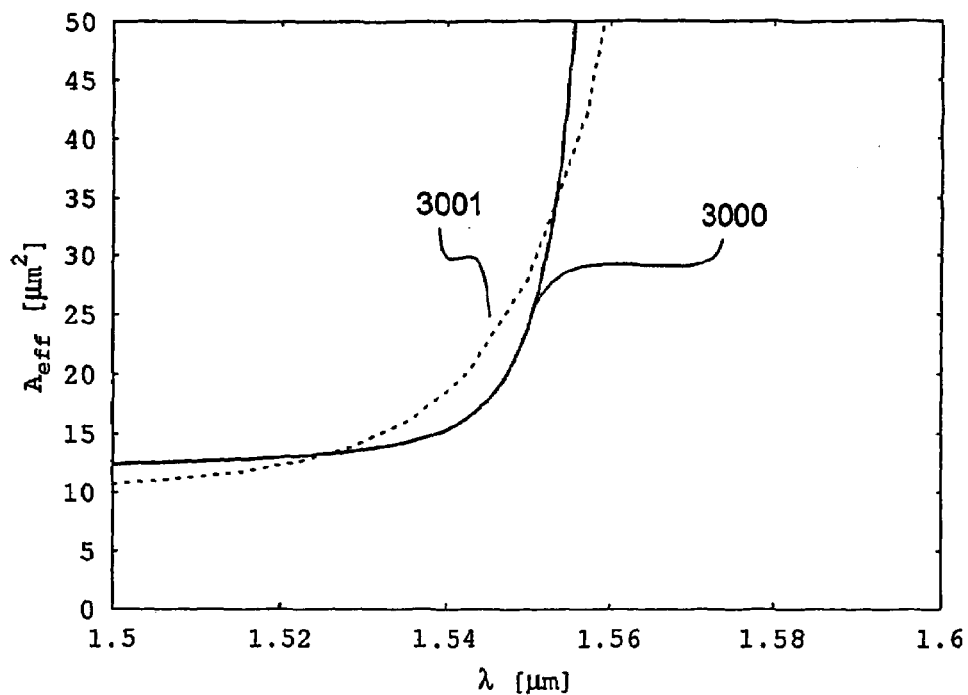
FIG. 30 shows a comparison of the effective area of the fibers in the two previous figures.
Figure 31:
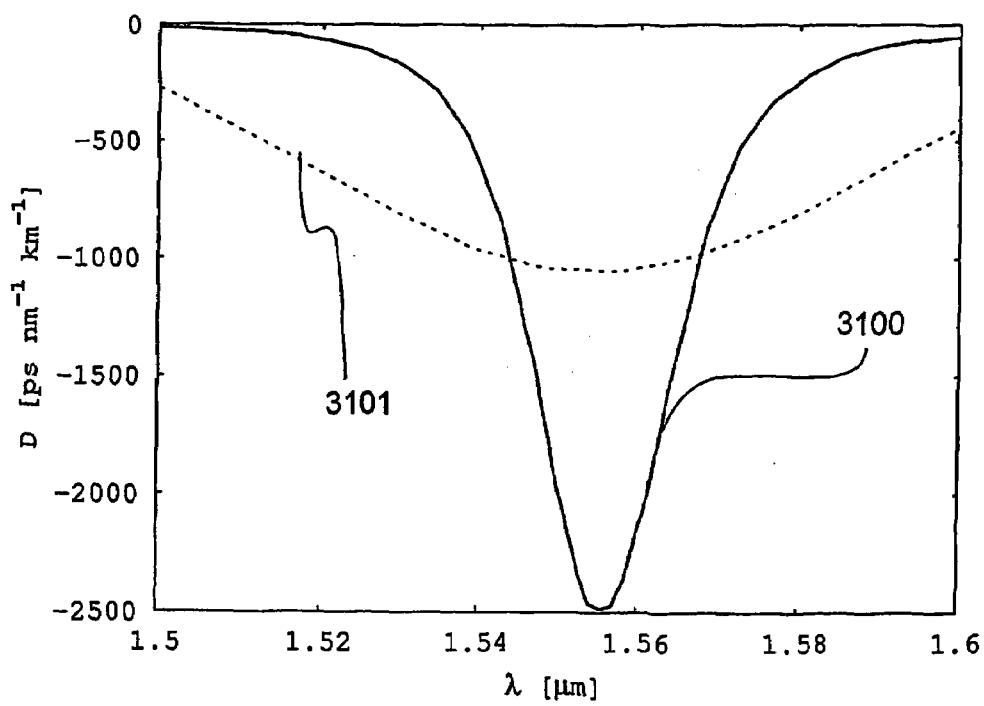
FIG. 31 shows a comparison of the dispersion of the fibers in FIGS. 28 and 29.

It is at this stage worth comparing the fiber in FIG. 28, to one of the previously studied fibers with a core not being in contact with the inner cladding features. FIG. 29a shows dispersion and effective area of the fundamental mode for a fiber with a design as shown in FIG. 12a. In FIG. 29a, a normalization factor $\Lambda$ (center-to-center hole spacing in the inner cladding region) has been employed. For a more direct comparison using absolute values of the design parameters, the two fibers of FIGS. 28b and 29b may be designed for dispersion compensation around $\lambda=1550$ nm. FIG. 30 shows the effective area of the fundamental mode of the fiber of FIG. 28 (dashed curve 3001) and of FIG. 29b (solid curve 3000). As apparent from the figure, both fibers may exhibit an effective area of more than 15 μm² at wavelengths around 1550 nm, and in fact more than 20 μm² may be exhibited by both fibers. While this is comparable to conventional dispersion compensating fibers, it is significantly larger than for the fibers disclosed in the previously discussed DiGiovanni et al. and Birks et al. references. Considering next the dispersion of the fibers according to the present invention, FIG. 31, shows that both fibers may exhibit a negative dispersion around 1550 nm that is significantly larger than what is obtained using conventional dispersion compensation fibres as well as the fibers disclosed by Hasegawa et al. in EP 1 118 887. Hence, the present invention provides new dispersion compensating fibers have effective areas being comparable to conventional dispersion compensating fibers, but with significantly larger negative dispersion.

For a further comparison of fibers having a high-index core in direct contact with the inner cladding features and a high-index core being separated from the inner cladding, FIG. 31 shows that a stronger dispersion may be obtained in the latter case. A further important issue is the mode field distribution in and around the core at the wavelengths of negative dispersion. Looking at FIGS. 28a and 29a, it is found that the negative dispersion occurs for $\lambda/2R$ of around 0.8 for the fiber in FIG. 28b and for $\lambda/\Lambda$ of around 0.36 for the fiber in FIG. 29. For operation of around 1550 nm, this yields 2R of around 1.9 µm and $\Lambda$ of around 4.3 µm. Hence, the inner cladding features for the fiber in FIG. 29b will be positioned substantially further away from the fiber center compared to the inner cladding features of the fiber in FIG. 28. Since both fibers have approximately similar effective area at wavelengths around 1550 nm (as shown in FIG. 30), the field overlap of the guided mode with the inner cladding features will be substantially lower for the fiber in FIG. 29b compared to the fiber in FIG. 28. Generally, the inner cladding features are air holes and may be desirable to limit the amount of field in the air holes in order to lower potential loss mechanism attributed to the air holes (this may for example be absorption losses from OH content in the air holes or scattering losses from surface roughness of the air holes). Also in the case of lowering PMD, it may be an advantage to move the air holes as far away from the mode field as possible, since the high index contrast between the air holes and the background material may result in significant polarization effects. For these reasons it may be preferred to have dispersion compensating fibers according to the present invention where the first core comprises a high-index features being isolated from the inner cladding features. Preferably, the first core feature has a diameter of around 0.7$\Lambda$ or less. In other cases, however, it may be preferred to have as large an overlap between the mode field and the inner cladding features as possible. This may for example be the case for tuneable dispersion compensating fibers, where the material in the inner cladding features may be altered in one way or another (for example by changing the refractive index of the inner cladding features dynamically using non-linear optical, acoustic-optical, or thermal processes, other mechanisms could be physical pressurizing or bending of the fibers). This may be particularly interesting for dispersion compensating fibres according to the present invention comprising polymers in the inner cladding features.

Numerous possibilities exist for obtaining the required dispersion compensating effect as described in the previous text. In the following a number of further examples of fibers according to the present invention shall be presented.

Figure 32:
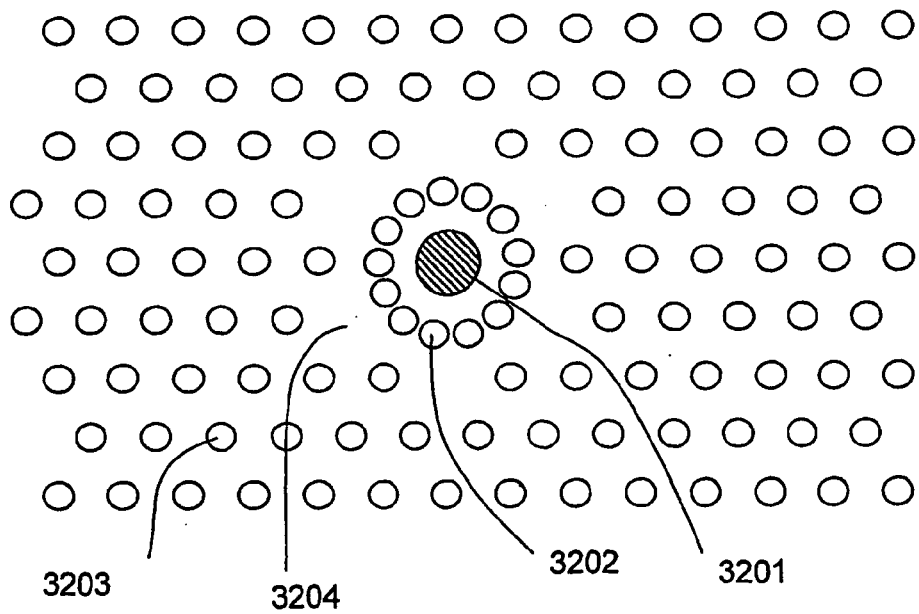
FIG. 32 shows schematically the cross-section of a microstructured fiber for dispersion compensation, the fiber has a core with a doped feature, the core being surrounded by an annular inner cladding section containing more closely placed air holes than those used to form the microstructured outer cladding. Between the inner and outer cladding regions, a higher effective index is obtained in an annular segment, where air holes have been removed (compared to the outer cladding).

In FIG. 32 is schematically shown a preferred embodiment of the desired fiber. Here the cross-section of a micro-structured fibre for dispersion compensation is shown having a doped central core 3201 surrounded by an annular inner cladding section containing more closely placed air holes 3202 than those used to form the micro-structured outer cladding 3203. Between the inner and outer cladding regions, a higher effective index is obtained in an annular segment 3204, where air-holes have been removed (compared to the air-filling fraction of the outer cladding). It should be noted that the closer spacing of the holes provides the desired lowering of the effective index, but the present type of design becomes more simple from a manufacturing point of view, because it indicates how similar effects may be obtained both through control of air-hole spacing and through control of their size.

Figure 33:
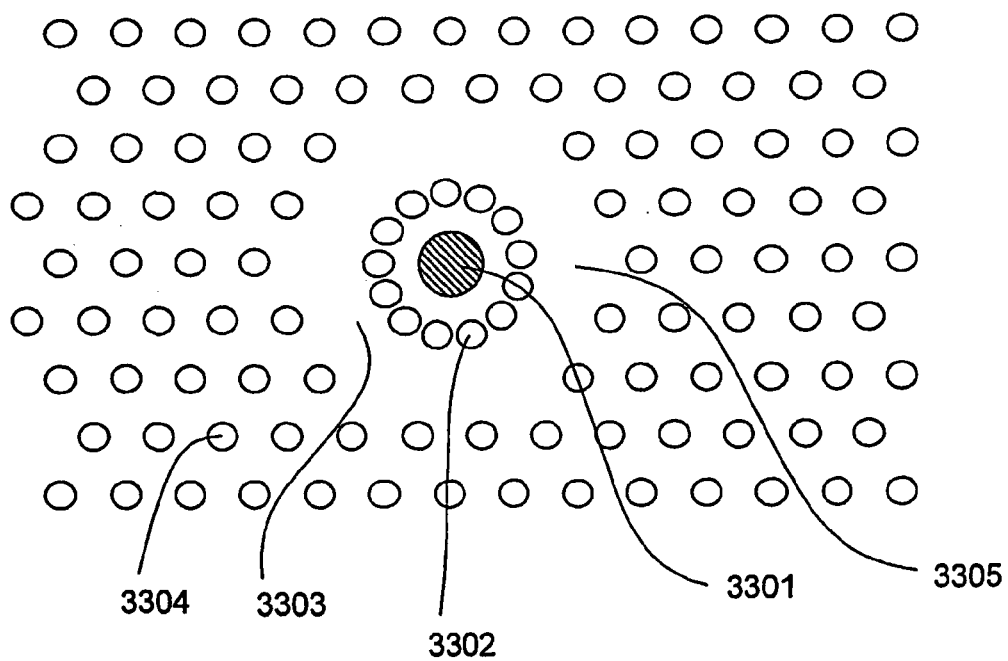
FIG. 33 shows schematically the cross-section of a microstructured fiber for dispersion compensation, the fiber having a core with a doped portion and the core is surrounded by an annular inner cladding section containing more closely placed air holes than those used to form the microstructured outer cladding. Compared to the previous figure, additional air holes have been removed in the outer core region.
Figure 34:
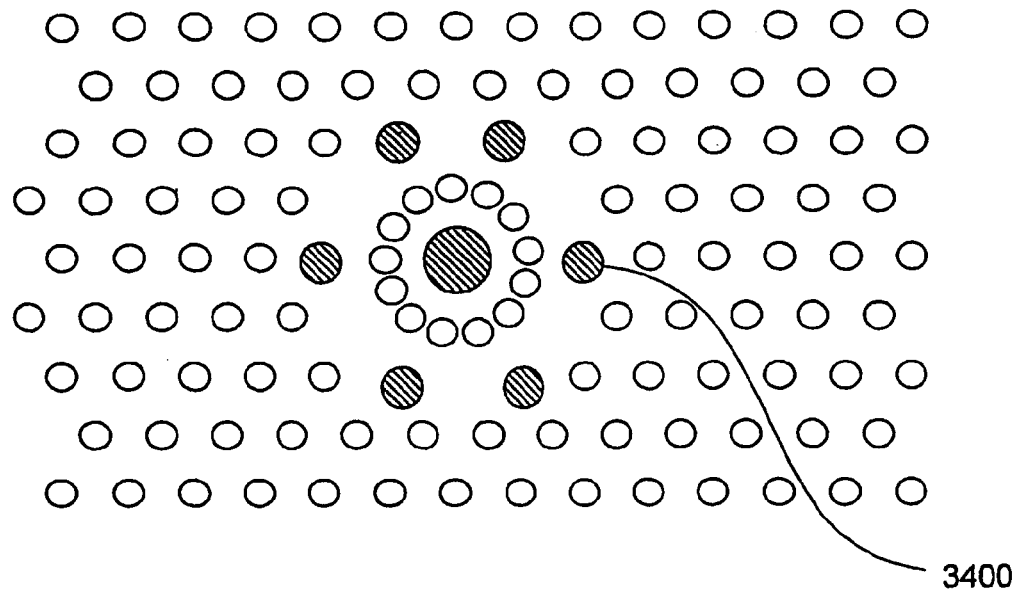
FIG. 34 schematically shows the cross-section of a microstructured fiber according to the invention, in which the outer core comprises high-index features.
Figure 35:
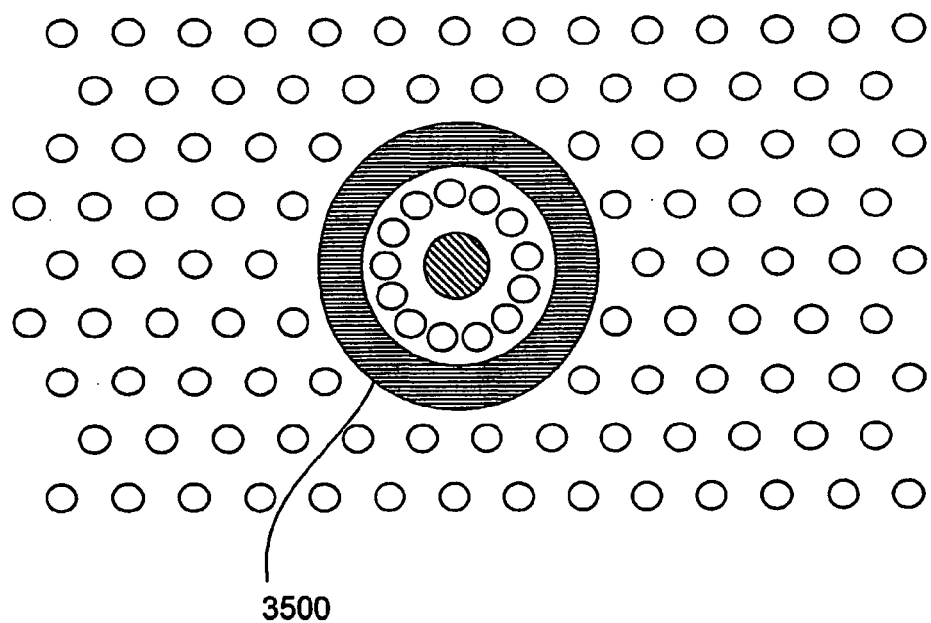
FIG. 35 schematically shows the cross-section of a microstructured fiber according to the invention, in which the outer core comprises a single annular feature with a higher refractive index than the outer cladding background material.

Yet another example of a preferred embodiment of a fiber according to the invention is schematically shown in FIG. 33. In this embodiment, the cross-section of a micro-structured fibre for dispersion compensation is realized by having a doped central core 3301 surrounded by an annular inner cladding section containing more closely placed air holes 3302 than those used to form the micro-structured outer cladding 3303. This is in accordance with the example illustrated in FIG. 32. However, compared to previous examples, additional air holes have been removed in the outer core region 3303, hereby allowing for a higher effective refractive index. Comparing FIG. 32 and FIG. 33, we may formulate the differences as follows. The fibre structure presented in FIG. 32 has an outer annular core section formed by a micro-structured section (in which the air-hole spacing is larger than that of the outer cladding), whereas the structure illustrated in FIG. 33 has an outer core region formed by a solid material. It should be noted that these examples only indicate some of the design possibilities and optimal designs according to the parameters specified in this invention include the possibilities that not only size and spacing of air holes but also background doping may be used for example using high-index features or a annular element having a center that coincides with the fiber center—as previously discussed. The outer core region may for example contain a number of solid, high-index features 3400 as illustrated in FIG. 34—or be a homogeneous annular region 3500 with refractive index higher than the refractive index of the outer cladding background material, as illustrated in FIG. 35.

Figure 36:
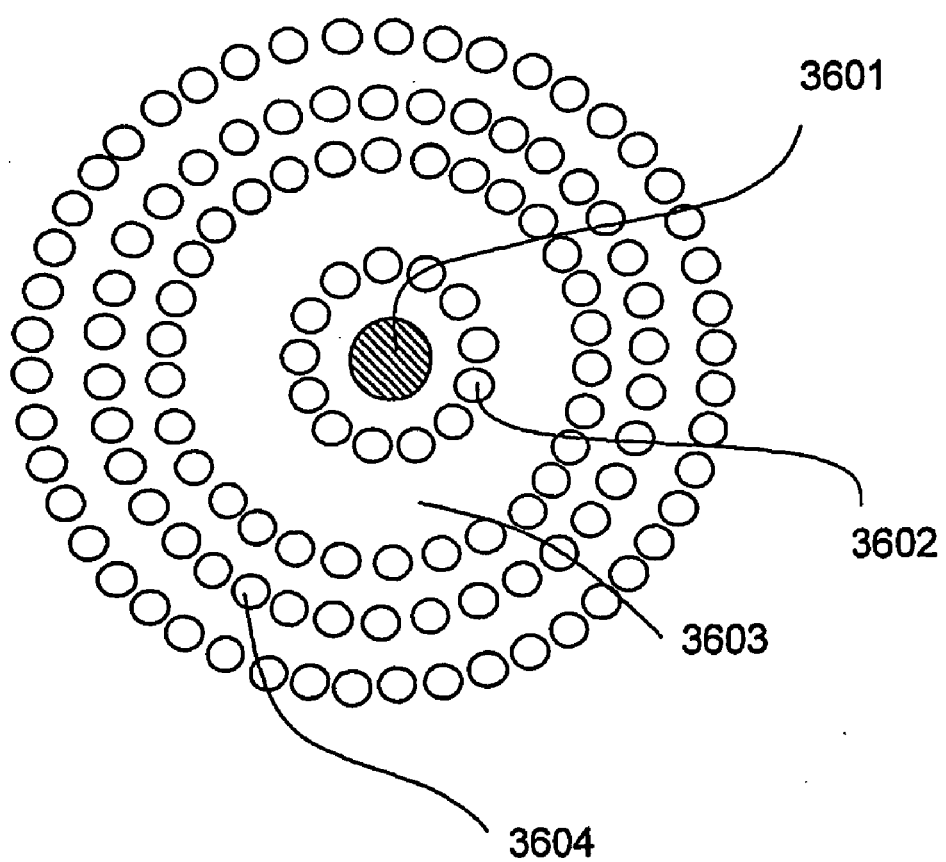
FIG. 36 schematically shows the cross-section of a microstructured fiber according to the invention, in which the outer cladding is formed by air holes placed in concentric circles.

In the examples of the invention presented so far, the microstructured outer cladding has been illustrated as close packed air holes placed in a background material. It should be stressed that other air-hole distributions may be used to obtain the desired optical properties. Examples of such placements of air holes could be in rectangular-, honeycomb-, or Kagomé structures. However, even further possibilities exist, and one preferred embodiment is schematically shown in FIG. 36, where the cross-section of a microstructured fiber according to the invention is shown. In this preferred embodiment the outer cladding is formed by air-holes 3604 placed in concentric circles. The fiber has a doped central core 3601 surrounded by an annular inner cladding section containing concentrically placed air holes 3602. Between the inner and outer claddings, the second core region 3603 is shown. Note that in this specific example, the second core region is formed by a homogeneous material (such as pure silica or silica doped with germanium, fluorine and/or other material(s)), but it could also be realized through a microstructured section containing low- and/or high-index features.

Figure 37A:
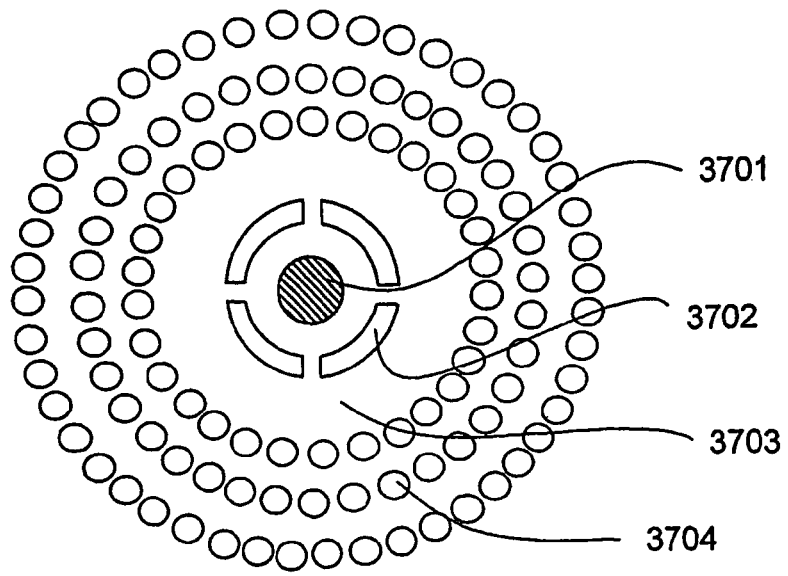
FIG. 37 schematically shows the cross-section of a microstructured fiber according to the invention, in which the outer cladding is formed by air-holes placed in concentric circles, and where the inner cladding is formed by air holes of a non-circular cross section. a) Four glass segments are used to keep the central part of the fiber in place. b) Three glass segments are used to keep the central part of the fiber in place.
Figure 37B:
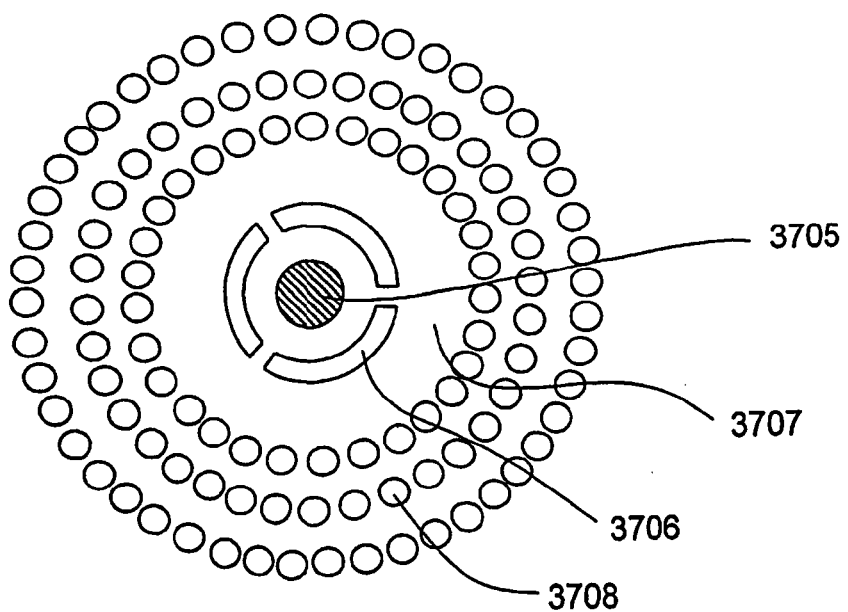

The air holes that are used to tailor the effective refractive index do not necessarily have to be of circular cross sections. In FIG. 37, a preferred embodiment of a fiber according to the invention is schematically shown. FIG. 37a illustrates the cross-section of a micro-structured fibre according to the invention, in which the outer cladding is formed by air-holes 3704 placed in concentric circles, and where the inner cladding is formed by air holes of a non-circular cross section 3702. As in the previously discussed embodiments of the invention, the fiber has a doped central core 3701 surrounded by the annular inner cladding section. Between the inner and outer claddings, the second core region 3703 is shown. FIG. 37b shows yet another preferred embodiment having a doped central core 3705 surrounded by an annular inner cladding section containing non-circular air holes 3706. Between the inner cladding and the outer cladding 3708, the second core region 3707 is shown.

To further illustrate this difference between standard fibers and micro-structured fibers, we move on to showing the possibility of having a mode with large negative dispersion in a design where one would expect this to be impossible using standard index analogies between micro-structured fibers and standard fibers, such as those shown in FIGS. 1–3. We employ a central core design such as the one shown in FIG. 8, however, we assume the doping material does create a material with a refractive index being lower than the refractive index of silica (one could dope with e.g. fluorine to obtain this effect). Surrounding the inner cladding is an outer silica core, while the outer cladding is a micro-structured cladding with a small pitch. According to the standard view of the core regions (such as illustrated in FIGS. 1–3) we, therefore, have an inner core with a refractive index being lower than the refractive index of the outer core. According to this view, the fundamental and the second order mode will, therefore, swap place (the fundamental mode will be in the outer core at short wavelengths, and in the inner core at long wavelengths) compared to the design suggested by Thyagarajan et al. in IEEE Photonics Technology Letters, Vol. 8, pp. 1510–12, 1996. This has detrimental effects on the performance of the fiber, which is the reason why Thyagarajan et al. suggested the higher index in the central core.

Figure 38:
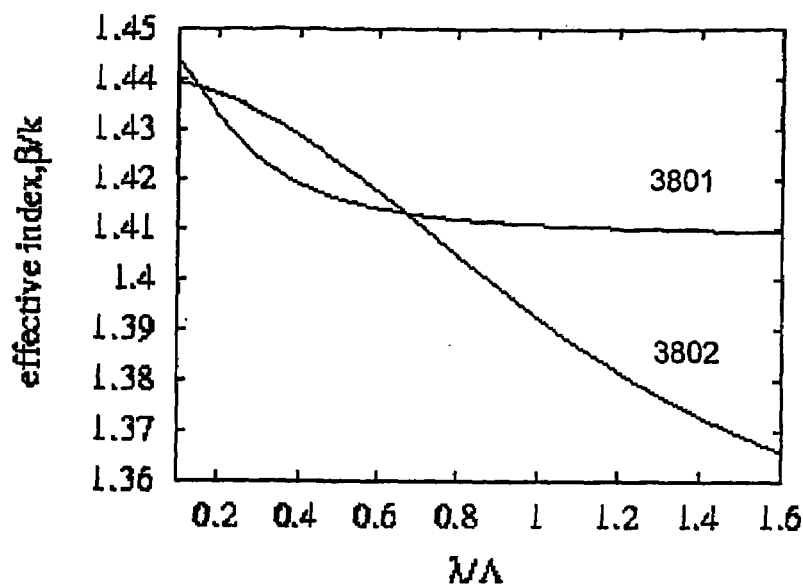
FIG. 38 shows schematically the effective index variation of microstructures that may be utilised for realising fibers according to the present invention with a core comprising material with a maximum refractive index being lower than a highest refractive index of any material in the remainder of the fiber.

The present inventors have, however, realized that it may also be preferred that the central core region does not comprise the highest refractive index material of the fiber. FIG. 38 illustrates the effective core index 3802 (which is the honeycomb-index corresponding to the inner core and the inner cladding) and the cladding index 3801. The core index 3802 is seen to cross the cladding index 3801 while 3802 has a large negative slope. This will make it possible to have a fundamental mode with the desired dispersion characteristics, provided that the silica regions of the outer core are sufficiently small to ensure that the effective mode index of the outer core is near the outer cladding effective refractive index. Notice, that this crossing between the core and the cladding indices is made possible, despite the low refractive index of the core region and the large holes in the inner cladding, by a small inter-hole distance in the outer cladding region, compared to the inter-hole distance in the inner cladding region (the inter-hole distance in the inner cladding region is three times the inter-hole distance in the outer cladding).

We now turn to a different aspect of the present invention. Micro-structured cladding structures with a periodically varying refractive index have the potential of exhibiting photonic band gaps. These are frequency regions where no light transmittance is allowed in the cladding region (see e.g. Barkou et al., Optical Fiber Communication Conference, FG5-1, pp. 117–119, 1999). By employing a periodically varying refractive index it is, therefore, possible to obtain guidance of light within low index core regions. It has been shown both theoretically (Broeng et. al., Optics Letters, Vol. 25, pp. 96–98, 2000) and experimentally (Cregan et. al., Science, Vol. 285, pp. 1539–1539, 1999) that this even allows guidance of light within a hollow core, a result that cannot be explained by the theories of standard optical fibers. Standard fibers, on the other hand, always demand that the core region has the higher refractive index, while the cladding region has the lower refractive index.

The present inventors have realized that one can also have a guided fundamental mode with negative group velocity dispersion with effective mode-index that is below the effective refractive index of the cladding region. It is important to stress that such a mode cannot be guided according to standard fiber technology.

It is well-known from the theory of photonic band gap fibres that a mode with a mode-index below the effective refractive cladding index can only be guided if the propagation constant of the guided mode lies within a photonic band gap at the particular wavelength. It is not known (and not at all obvious) that it is possible to make a photonic band gap fibre design where a fundamental mode with large numerical group velocity dispersion exists. The present inventors have realized a way to obtain this.

As with the designs described above we need a dual concentric core arrangement to obtain such a fundamental mode. Also the fundamental mode should be guided mainly in the outer core region at long wavelengths and in the inner core region at shorter wavelengths. As with the fibers described above the fundamental mode exhibits large negative group velocity dispersion only if the slope of the mode-index as a function of the wavelength differ significantly between the two modes when phase matching between the two potential modes occur. This is an analogue to the case of the preceding fibers. The core design, however, that may obtain this feature in photonic band gap guiding fibres turn out to be quite different.

Figure 39:
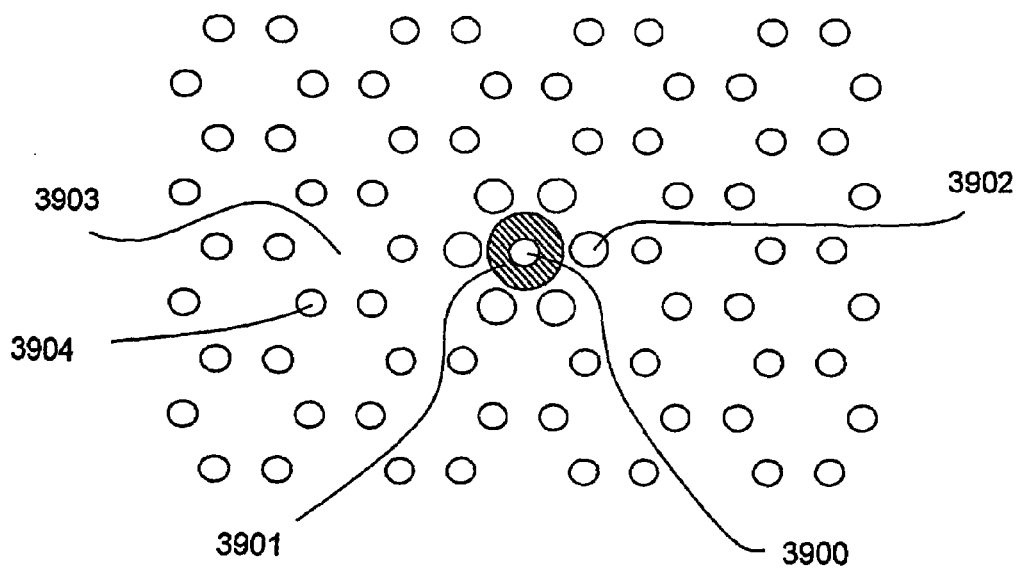
FIG. 39 schematically shows the cross-section of a microstructured photonic band gap fiber according to the invention. A honeycomb-structured cladding has been used, and the core is formed by an additional hole. Surrounding the central hole is a doped region.

Consider the design shown schematically in FIG. 39. The outer cladding consists of air holes 3904 placed on a periodic lattice (a honeycomb lattice in the example shown). The holes are distributed within a background dielectric material 3903, such as silica. The enlarged air holes 3902 correspond to the inner cladding of the preceding designs. They act to lower the effective refractive index of the central core region at long wavelengths so that no guided modes exist in the central core region at long wavelengths. At shorter wavelengths a mode becomes guided within a photonic band gap. This may happen even without the central hole 3900 and the high-index ring 3901 being present. The purpose of 3900 and 3901 will be explained later.

Figure 40:
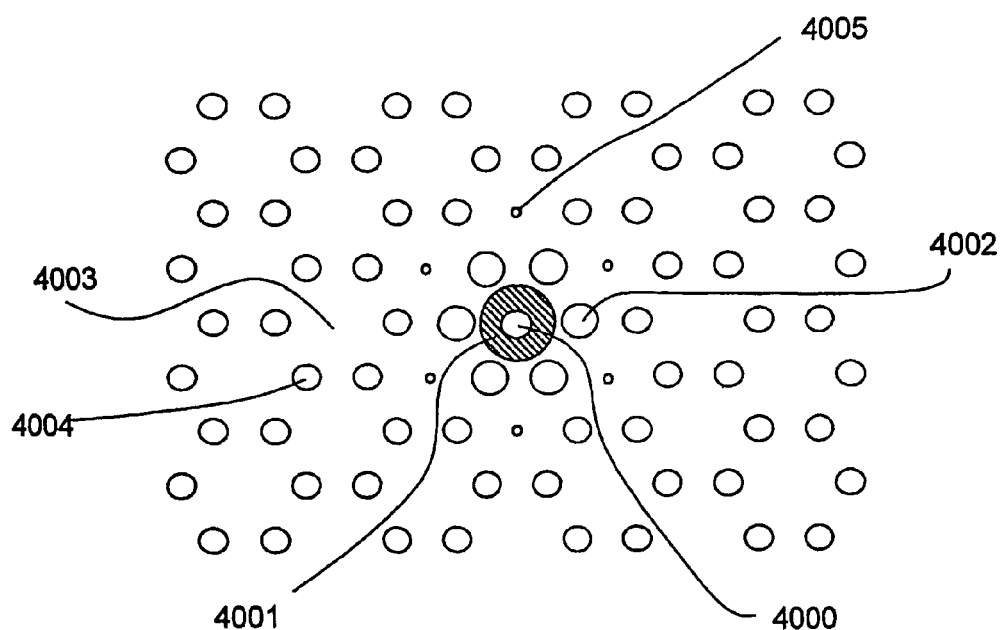
FIG. 40 schematically shows the cross-section of a microstructured photonic band gap fibre according to the invention. The fiber contains an annular ring with a number of additional air holes placed to enhance the dispersion compensating properties of the PBG fiber, and the outer core comprises small low-index features.

In the design shown in FIG. 40 an outer, low-index core region is included. It is created by adding air holes 4005 within the six innermost honeycombs. Notice that this would not act as a core in a standard fiber, since we have effectively lowered the effective index of the outer core region. In FIG. 40 the outer cladding air holes 4004, the background material 4003, the inner cladding air holes 4002 the high-index ring 4001 and the central air hole 4000 correspond to the ones shown in FIG. 39.

Figure 41:
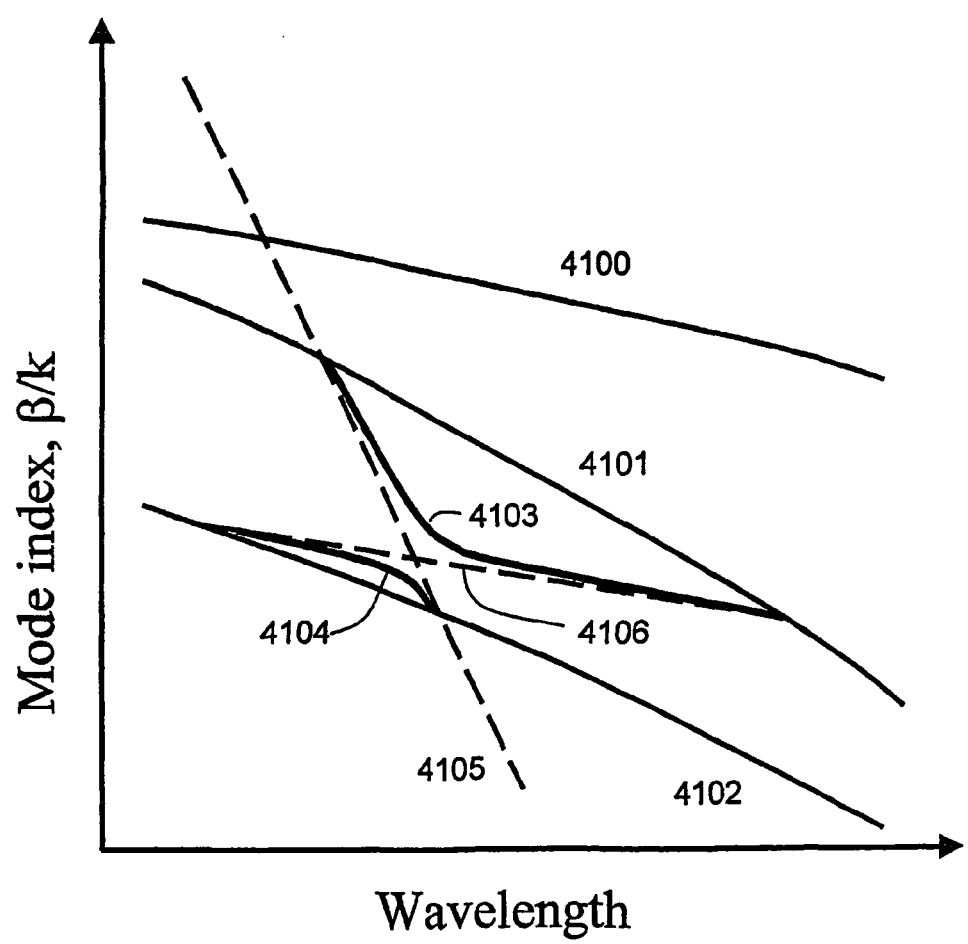
FIG. 41 illustrates the effective index of a band gap guided mode in a fiber structure according to the invention.

In FIG. 41 is shown some effective indices that may be obtained in a fiber with the principal design shown in FIG. 40. The effective refractive index 4100 of the outer cladding lies at the top, corresponding to the fact that no index guided modes exist in the micro-structured fiber, at the wavelengths where the fundamental mode exhibits numerically large negative group velocity dispersion (index-guided modes exist at shorter wavelengths, however, these of not shown for reasons of clarity). Below 4100 are the photonic band gap edges 4101 and 4102. Any guided mode that is not an index guided mode must have a mode-index between the two photonic band gap edges, since these define the intervals that are not allowed to propagate in the cladding.

A micro-structured fiber-structure such as the one shown in FIG. 39 will have a mode-index as shown by 4105. The purpose of the central air-hole 4000 and the ring with raised refractive index 4001 compared to the background refractive index of the outer cladding is to obtain a mode-index 4105 which traverses the photonic band gap bounded by 4101 and 4102 as steeply as possible. Notice that the mode-index enters the top of the photonic band gap 4101 at short wavelengths and then descends through the band gap as the wavelength is increased.

A fiber with only the outer core region created by the added air-holes 4005 on the other hand will have a mode-index behaving as 4106. Notice that this mode-index enters the bottom of the photonic band gap 4102 at short wavelengths and then rises through the band gap as the wavelength is increased. The two types of cores therefore give rise to modes that traverse the photonic band gap quite differently. The slope of the mode-index as a function of the wavelength of the two modes is therefore quite different when they have an equal mode-index (when they are phase-matched).

Combining the two cores, as shown in FIG. 26 an operation with avoided-crossing is created similar to that referred to with the index-guiding designs. The fundamental mode has the effective index 4103, while the second mode (that need not carry any energy) has the effective index 4104. The curvature of 4103 corresponds to numerically large negative group velocity dispersion, while the curvature of 4104 corresponds to numerically large positive group velocity dispersion. Notice that the slope of the two modes 4103 and 4104 tend toward the slope of the two core modes 4105 and 4106 at wavelengths differing from the wavelengths with numerically large group velocity dispersion. In the wavelength region with numerically large group velocity dispersion the energy of the mode 4103 is moved from the inner core region 4001 to the outer core region 4005 as the wavelength is increased. Correspondingly, the energy of the mode 4104 is moved from the outer core region 4005 to the inner core region 4001 as the wavelength is increased.

The inventors have realized that a number of advantages exist for designs such as the one shown in FIG. 40, compared to index guiding fiber designs for group velocity dispersion. It is an advantage that the negative slope of 4102 is larger than the negative slope of 4106. This acts to suppress the mode 4104 if the mode-index of the fundamental mode 4103 is near the photonic band gap bottom, when the fundamental mode exhibits large negative group velocity dispersion.

It is a further advantage that fibers with a design similar to the one shown in FIG. 40 may be designed so that the positive group velocity dispersion of the mode 4104 occurs at wavelengths where the mode-index of 4104 is near the upper photonic band gap edge 4101. This will act to suppress the fundamental mode 4103 so that the positive group velocity dispersion of 4104 can be exploited.

It is therefore an advantage that micro-structured fibers with the design shown in FIG. 40 may be designed to exhibit large positive group velocity dispersion. This is expected to be of increasing importance as fiber systems with negative group velocity dispersion become more common, in order to e.g. reduce self-phase modulation in fiber systems.

The present inventors have realized that it is advantageous to use fibers that guide light by the photonic band gap effect for dispersion compensating purposes. This may seem as a surprise to those skilled in the field, since fibers guiding light by the photonic band gap effect typically have positive dispersion. However, using a dual concentric core arrangement it becomes possible to have a fundamental super mode with negative group velocity dispersion. The present inventors have realized that dual concentric core fibers that guide light by the photonic band gap effect are able to have even larger numerical values of the group velocity dispersion than the group velocity dispersion made possible by the prior art.

As indicated by FIG. 41 the large values of group velocity dispersion appear near the wavelength where 4105 crosses 4106. Curve 4105 may be seen as the mode-index of the guided mode within the central core 4001 when the outer core 4005 is omitted, and 4106 may correspondingly be seen as the mode-index of the guided mode within the outer core 4005 when the central core 4001 is omitted.

Using dual concentric cores for group velocity dispersion the amount of group velocity dispersion that can be obtained is directly linked to the difference between the group velocity of the guided modes with a mode-index corresponding to 4105 and 4106. This difference is maximized when the group velocity corresponding to 4105 is minimized while the group velocity corresponding to 4106 is maximized for a given mode-index, $\beta/k$.

To investigate the group velocities that can be obtained for guided modes in silica-air fibers, a formula known and understood by those skilled in the art can be applied.

$$v_g = c \frac{\beta}{k} \frac{\int_\Pi E \times H^* \cdot z dA}{\int_\Pi n^2 E \times H^* \cdot z dA}$$

Here $v_g$ is the group velocity, c is the vacuum velocity of light, $$\frac{\beta}{k}$$

is the mode-index, E is the electric field, H* is the conjugated magnetic field, n is the refractive index of the material at the given place, Π is the cross-section where the mode exist, and z is the length direction of the fiber. Assuming as an example that the fiber consist of material with n=1 (air) and n=1.45 (silica) we can rewrite this formula as $$v_g = c \frac{\beta}{k} \frac{\int_{air} E \times H^* \cdot z dA + \int_{silica} E \times H^* \cdot z dA}{\int_{air} E \times H^* \cdot z dA + n_{silica}^2 \int_{silica} E \times H^* \cdot z dA}$$

The formula shows that the group velocity of a guided mode depends on the mode-index, $$\frac{\beta}{k},$$

as well as the amount of the modal power that propagates in silica, relative to the modal power that propagates in air. To be more specific the relative amount, $f_{silica}$, of the modal power, $$P = \int_\Pi E \times H^* \cdot z \, dA,$$

that exist in silica, $$\frac{\int_{silica} E \times H^* \cdot z \, dA}{P},$$

can be used to calculate the group velocity for a guided mode at a given mode-index, such that:

$$v_g = \frac{c\frac{\beta}{k}}{1 + f_{silica}(n_{silica}^2 - 1)}$$

From this formula it is seen that a guided mode with the lowest group velocity possible in silica/air will have all its power propagating in silica. Such a mode will have the group velocity $$v_g = \frac{c\frac{\beta}{k}}{n_{silica}^2}.$$

The maximum group velocity possible corresponds to a mode with as much of the field as possible propagating in air. When the mode-index is less than 1 this corresponds to a mode with all its power propagating in air. Such a mode has the group velocity:

$$v_g = c\frac{\beta}{k}, \text{ where } \frac{\beta}{k} \le 1.$$

When the mode-index is greater than 1 the maximum group velocity is equal to the phase-velocity of the mode such that:

$$v_g = \frac{c}{\beta/k}, \text{ where } \frac{\beta}{2} \ge 1.$$

The group velocity dispersion, GVD, of a guided mode may be written as:

$$GVD = \frac{d\left(\frac{1}{v_g}\right)}{d\lambda}$$

where $\lambda$ is the free space wavelength of the mode. The amount of group velocity that can be obtained for a given mode-index can therefore be qualitatively estimated by showing the inverse group velocity, $$\frac{1}{v_g}$$

as a function of the mode-index, $$\frac{\beta}{k}.$$

Figure 42:
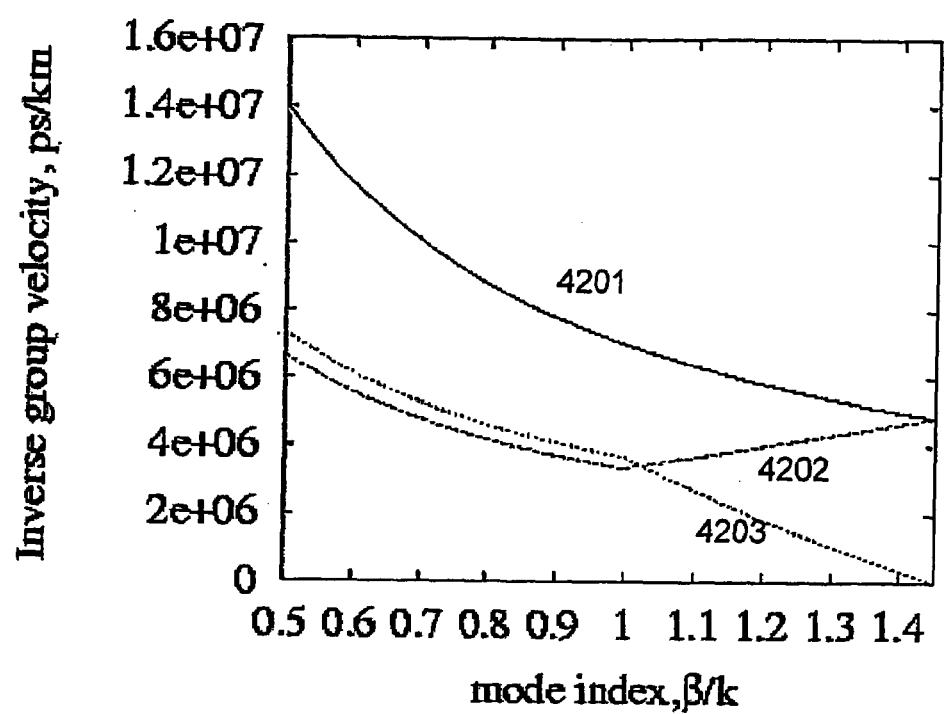
FIG. 42 shows a simulation of the inverse group velocity dispersion that may be obtained for fibers according to the present invention.

Such a plot is shown in FIG. 42, where 4201 shows the inverse group velocity of a mode that propagates solely in silica, 4202 shows a mode that propagates with the maximum group velocity possible. 4203 is 4202 subtracted from 4201 and therefore shows the propagation time-difference (in pico-seconds, ps) between the slow 4201 and the fast 4202 mode per kilometre of fiber. Curve 4203 clearly indicates that the propagation time-difference increases strongly as the mode-index, $$\frac{\beta}{k}$$

is lowered. Since this propagation time-difference is also a measure of the maximum group velocity dispersion, GVD, that can be obtained by using coupled core regions, curve 4203 therefore also indicates that it is advantageous to have a low mode-index, $$\frac{\beta}{k},$$

for dispersion compensating purposes. Since this is possible by using photonic band gap technology, curve 4203 therefore shows that it is an advantage to use fibers that guide light by the photonic band gap effect for group velocity dispersion. The present invention therefore also covers photonic crystal fibers with a cladding structure that exhibits photonic band gaps.

It is also important to notice that the present invention may be utilized for fiber applications, wherein fibers according to the present invention guides light in higher order modes. The dispersion of higher order mode may be even stronger than the dispersion of the fundamental mode. Apart from the negative dispersion, as a special case, higher order modes in fibers according to the present invention may exhibit very high positive dispersion. Such fibers, guiding light in a higher order mode, and having large positive dispersion may be used for dispersion compensating schemes for fiber-optical communication systems having a negative dispersion over the transmission length. Hence, the present invention also covers dispersion compensating fibers that are guiding light in a higher order mode. Especially, the present invention covers dispersion compensating fibers that are guiding light in a higher order mode with a large positive dispersion. Typically, it is necessary to employ mode converters in systems that utilize dispersion compensating fibers that guide light in a higher order mode. Finally, it should be mentioned, that for both single mode dispersion compensation as well as for higher order mode dispersion compensation, the dispersion compensating fibers are typically packed in modules, and the present invention also covers modules that incorporate fibres being disclosed in the present invention.

Figure 43:
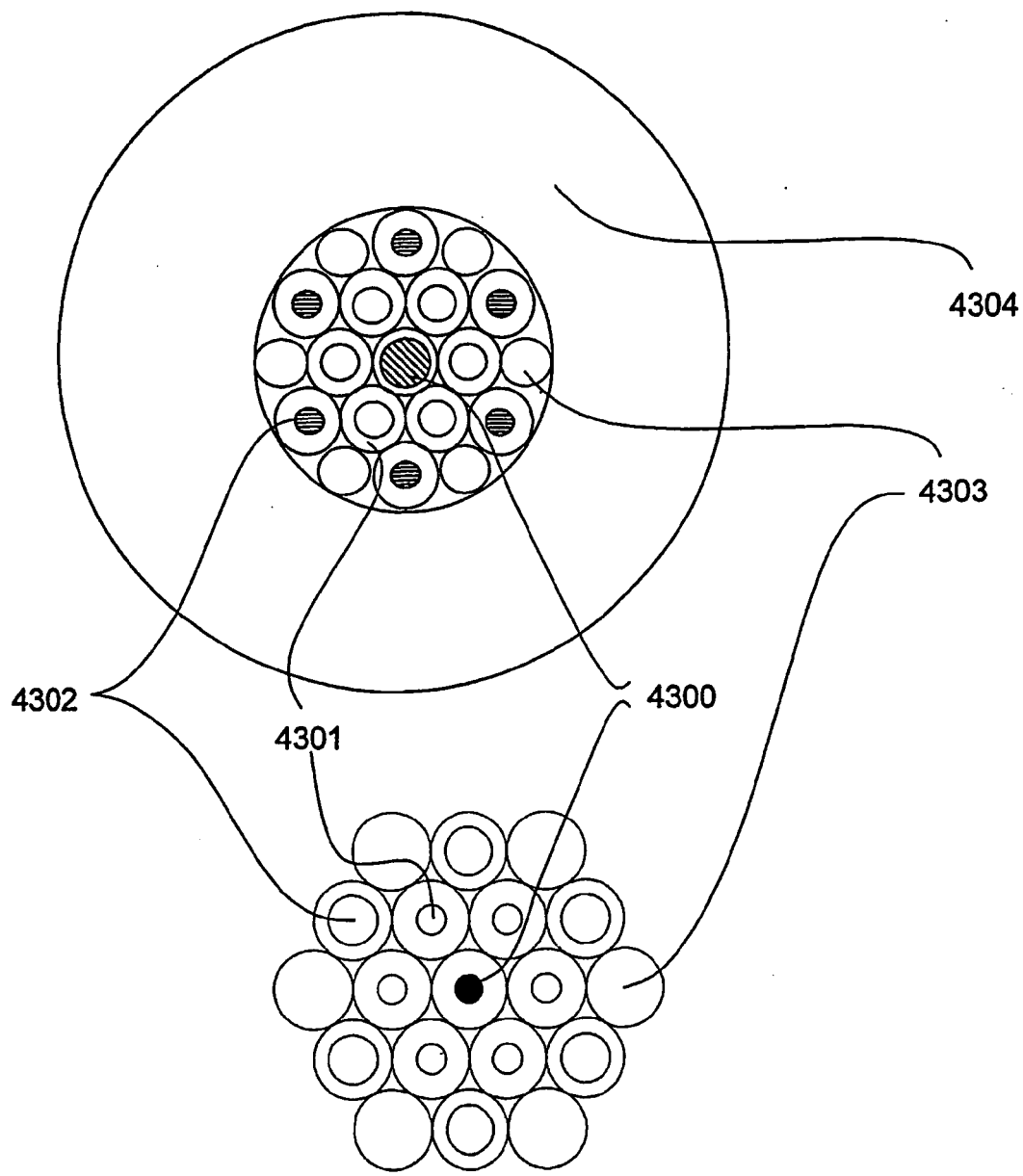
FIG. 43 shows microscope pictures of a real fiber according to the present invention. The figure further shows the dispersion characteristics of the fiber at wavelengths around 1550 nm.

To fabricate fibers according to the present invention known techniques of stacking and pulling capillary tubes and rods may be used—see for example U.S. Pat. No. 5,802,236. FIG. 43 shows a schematic example of the cross-section of a preform that may be used to fabricate a fiber with a design as schematically shown in FIG. 12a. The preform comprises a central rod 4300 with a high-index material in its center. The rod may have various profiles of the refractive index distribution—for example a step-index profile or a parabolic profile—and it may preferably be fabricated using MCVD techniques. Surrounding the central rod is, for this example, six capillary tubes 4301. The capillary tubes are surrounded by a number of rods— including rods 4302 comprising a high-index material. The stack of rods and tubes may be put into a larger over-cladding tube 4304 to yield a final preform. This preform may be drawn into fiber in one or more steps as described for example in U.S. Pat. No. 5,802,236.

In order to realise different size of voids in the first and the second cladding, it may be advantageous to provide a different pressure to the tubes in the two different regions during one or more steps of the fibre drawing process. In this manner it may for example be advantageous to supply a higher pressure to tubes that define larger voids and a lower pressure to tube that define smaller voids. Depending on the material, of the fiber, drawing temperatures and speeds may vary significantly and experiments may be needed to determine optimum drawing conditions including pressure. Alternatively, the preform may be stacked with tubes of different size, for example different inner diameter. If the preform is drawn at a relatively low temperature, such as around 1850° C.–1900° C. the preform may be drawn to fiber such that the tubes do not collapse. The tubes with smaller inner diameter will thereby result in voids of smaller size. Pressure control of the tubes may be advantageous in providing additional control of the void size. Various manners of applying pressure may be used. It is for example possible to draw the fiber in two steps, wherein a first step tubes are kept open in both ends and the dimensions of the preform is scaled approximately linearly to a cane during drawing in a fiber drawing tower at a temperature of around 1900° C. to 2000° C. The preform may have a diameter of around 1–50 mm and the cane a diameter of around 1–5 mm. In the second step, the cane may be drawn to fiber, where one or more regions are connectorized to a pressure-control chamber such that void size in the final fiber may be controlled. One way of using pressure control for realisation of microstructured fibers has for example been described by Russell et al. in WO 00/49436.

Figure 44A:
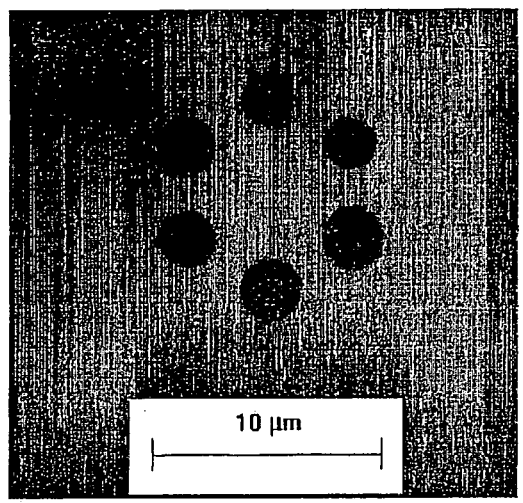
FIGS. 44a–44c show microscope pictures of another real fiber according to the present invention. The figure further shows the dispersion characteristics of the fiber at wavelengths around 1550 nm.
Figure 44B:
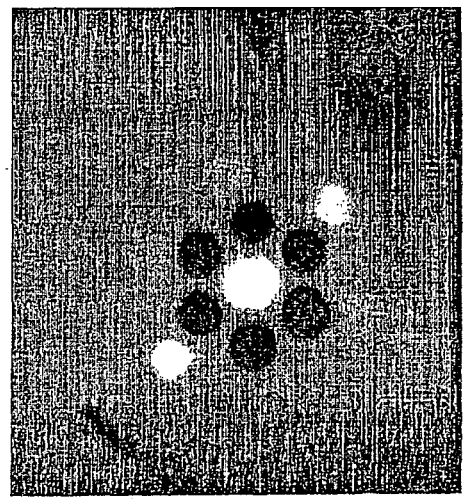
Figure 44C:
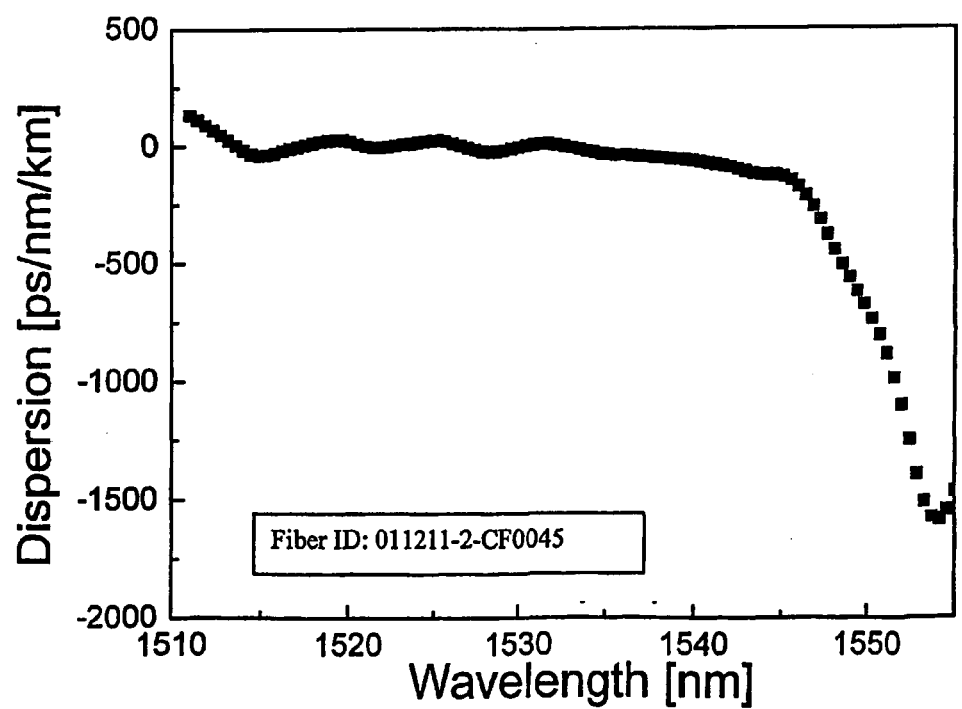

FIG. 44 shows two microscope pictures (top and bottom illumination with white light) of a fabricated fiber according to the present invention having a design as schematically shown in FIG. 12a. The fibre has Λ of around 4 µm and is designed to exhibit negative dispersion around 1550 nm. The figure also shows the measured dispersion characteristics of the fiber (bottom figure). The fiber is seen to exhibit a dispersion of around −1000 ps/nm/km around 1550 nm—as desirable for dispersion compensating applications. The fiber further has a strong negative dispersion slope with a relative dispersion slope (RDS)—as desirable for dispersion compensation in WDM systems. The measured dispersion characteristic is for a mode confined to the central (or first) core of the fiber. The mode field diameter at 1550 nm is around 4 mm, giving an effective area of around 15 µm². Hence, the experimental results confirm the simulated results present in the FIGS. 16–23. The core comprises a high-index features being separated from the inner cladding features. The core features have a refractive index profile with a maximum refractive index of around 1.47 and a diameter of around 0.7 times the center-to-center spacing of the inner cladding features. The fiber has six high-index features in the outer (or second) core that each has a refractive index profile with a maximum refractive index of around 1.46. The six second core features have a diameter similar to the first core feature. The features in the first and second core are not directly visible in the microscope picture with top illumination (right, top figure) that mainly serves to show the dimensions of the inner cladding features and their position. However, using bottom illumination of the fiber and coupling white light to both the first and second core, the high-index features of the two cores become more visible (left, top figure). It should briefly be mentioned that for operation of the dispersion compensating fibres at near-infrared wavelengths, the mode index of the two cores region is significantly different for light in the visible range (and in according with this and the description of the fibers according to the present invention) and the cores become largely decoupled at the visible where light will be more tightly confined to the high-index features than for the wavelengths of negative dispersion (wavelengths around the previously discussed coupling wavelength regime).

Figure 45A:
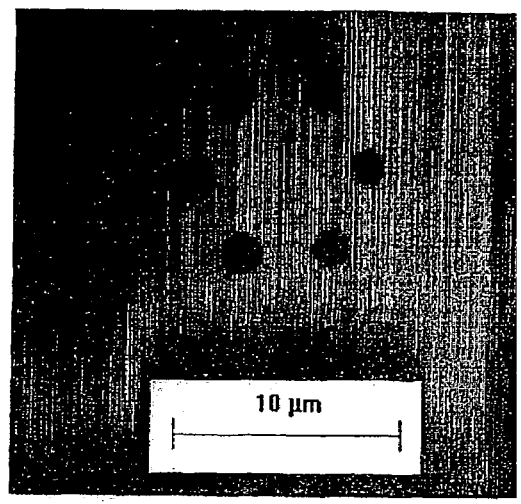
FIGS. 45a–45c show another example of a real fiber according to the present invention.
Figure 45B:
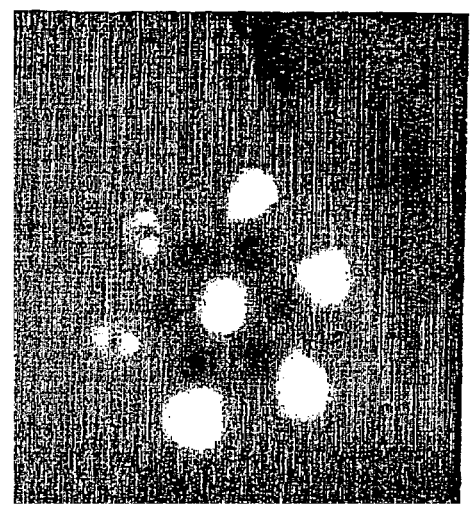
Figure 45C:
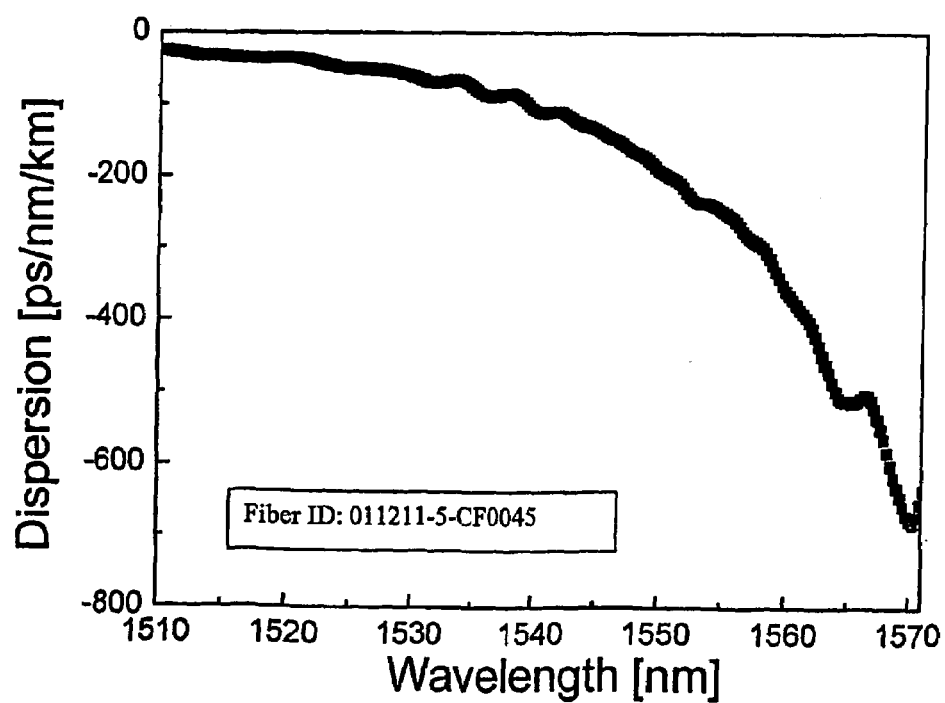

FIG. 45 shows another example of a real fiber according to the present invention. In comparison with the fiber in FIG. 44, the inner cladding features have a smaller size and the dispersion characteristics is seen to exhibit a less negative minimum, but a broader dispersion "dip". This result is also in agreement with the previously presented simulation results. The fiber presented in FIG. 45 has spectrally broad negative dispersion characteristics and a relatively large RDS, hence making the fiber attractive for dispersion compensation of WDM systems operating around 1550 nm.

Figure 46A:
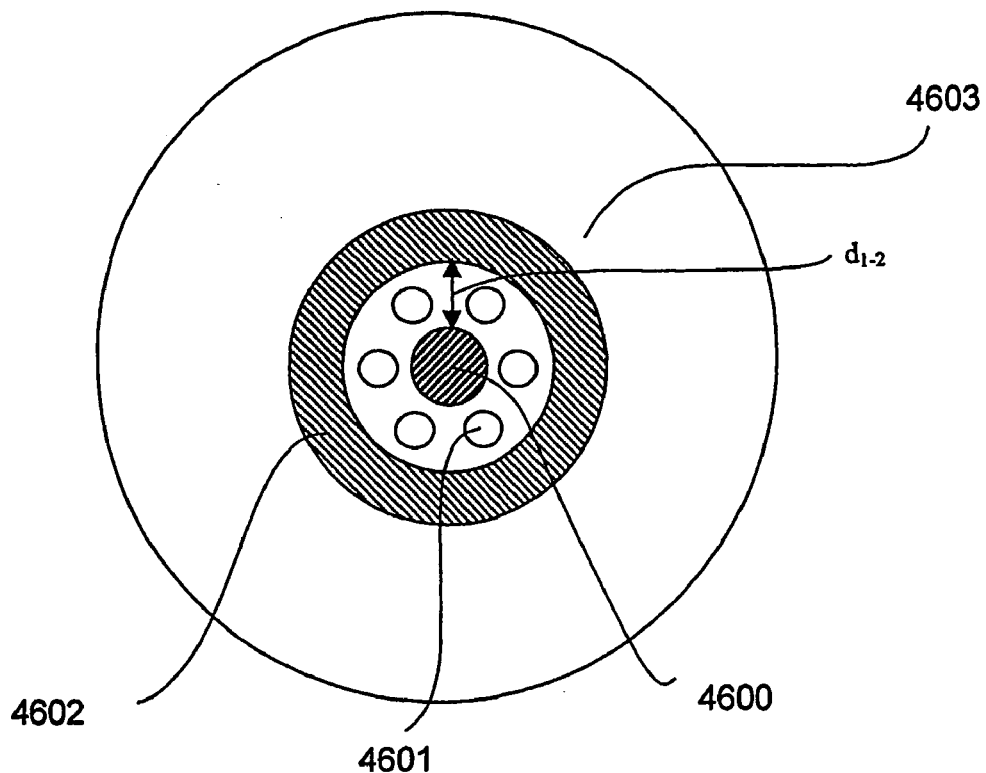
FIGS. 46a–46b provide a schematic example of a fiber according to the present invention.
Figure 46B:
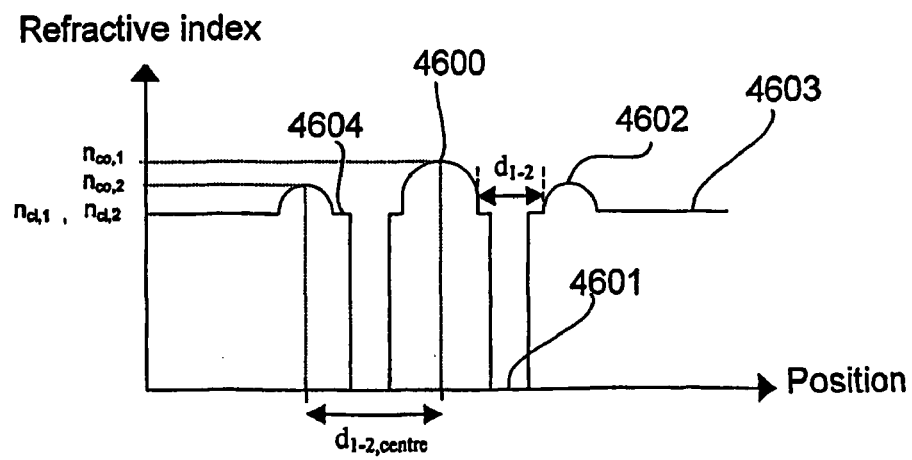
Figure 47A:
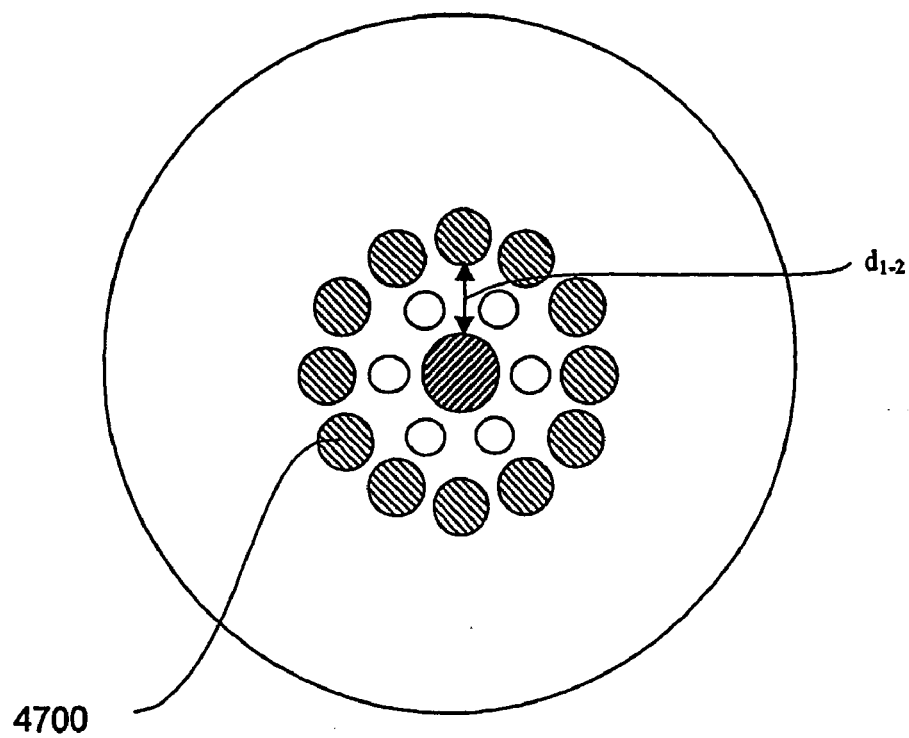
FIGS. 47a–47b provide a similar schematic example.
Figure 47B:
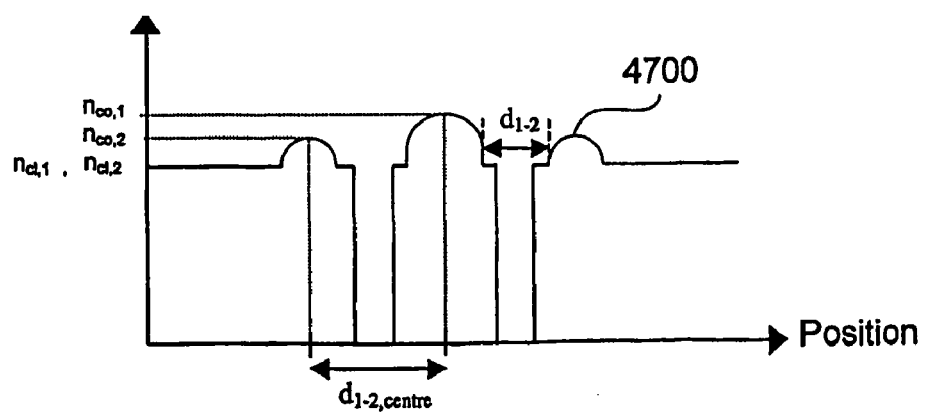

FIG. 46 provides a schematic example of a fiber according to the present invention, where the separation between the first core 4600 and the second core 4602 it illustrated. The separation is characterised by the distance $d_{1-2}$. The first cladding region comprises low-index features 4601 and the second cladding 4602 is homogeneous. The figure further illustrates the refractive index profile along one radial direction in the cross-section of the fiber. The index profile illustrates how the core 4600 is not in contact with the low-index features 4601, but separated by a region 4604. In preferred embodiments, this region comprises a background material being pure silica. The index profile further shows the radial distance from a center of the second core region to a center of the first core region, $d_{1-2}$. Twice this distance is also referred to as the diameter of the second core. FIG. 47 shows a similar illustration as FIG. 46, but for a fiber where the second core is formed from an ensemble of high-index features (4700). The use of a separation between the first core and the low-index elements has several advantageous—as for example discussed in connection with FIG. 31, and the use of a relatively large diameter of the second core has several advantages as for example discussed in connection with FIG. 18. While FIGS. 46 and 47 illustrates close to parabolic index profiles of the first and second cores, a broad range of other profiles may be used according to the present invention.

The invention claimed is:

1. An optical fiber for transmitting light, said optical fiber having an axial direction and a cross section perpendicular to said axial direction, said optical fiber comprising:
   (1) a first core region comprising a first core material having a refractive index $N_{co,1}$,
   (2) a microstructured first cladding region surrounding the first core region, said first cladding region comprising a first cladding material and a plurality of spaced apart first cladding features or elements that are elongated in the fiber axial direction and disposed in the first cladding material, said first cladding material having a refractive index $N_{cl,1}$, and each said first cladding feature or element having a refractive index being lower than $N_{cl,1}$, whereby a resultant geometrical index $N_{ge,cl,1}$ of the first cladding region is lowered compared to $N_{cl,1}$, (3) a second core region surrounding said first cladding region, said second core region comprising a second core material having a refractive index $N_{co,2}$, and (4) a second cladding region surrounding the second core region, said second cladding region comprising a second cladding material having a refractive index $N_{cl,2}$, wherein the first core material, the first cladding material and the first cladding features, the second core material, and the second cladding material are selected and arranged so that $N_{co,1} > N_{ge,cl,1}$, $N_{co,2} > N_{ge,cl,1}$, and $N_{co,2} > N_{cl,2}$.

2. The optical fiber according to claim 1 wherein the second cladding region is homogeneous.

3. The optical fiber according to claim 1 wherein the second core region is micro-structured having a plurality of spaced apart second core features or elements that are elongated in the fiber axial direction and disposed in the second core material, each said second core feature or element having refractive index, $N_{co,2}$ being higher than a refractive index, $N_{co,back,2}$, of the second core material, whereby a resultant geometrical index $N_{ge,co,2}$ of the second core region is higher compared to $N_{co,back,2}$.

4. The optical fiber according to claim 1 wherein $N_{cl,2}$ is equal to or lower than $N_{co,back,2}$.

5. The optical fiber according to claim 1 wherein $N_{cl,2}$ is equal to or lower than $N_{cl,1}$.

6. The optical fiber according to claim 1 wherein the second cladding region is micro-structured having a plurality of spaced apart second cladding features or elements that are elongated in the fiber axial direction and disposed in the second cladding material, each said second cladding feature or element having a refractive index being lower than $N_{cl,2}$, whereby a resultant geometrical index $N_{ge,cl,2}$ of the second cladding region is lowered compared to $N_{cl,2}$.

7. The optical fiber according to claim 1 wherein the first core region is a solid core region.

8. The optical fiber according to claim 1 wherein $N_{co,1}$ is larger than $N_{co,2}$.

9. The optical fiber according to claim 1 wherein $N_{co,1}$ is identical to $N_{co,2}$.

10. The optical fiber according to claim 1 wherein $N_{co,1}$ is lower than $N_{co,2}$.

11. The optical fiber according to claim 1 wherein said second core region is a homogeneous region.

12. The optical fiber according to claim 1 wherein the second core region is micro-structured having a plurality of spaced apart second core features or elements that are elongated in the fiber axial direction and disposed in the second core material, each said second core feature or element having a refractive index being lower than $N_{co,2}$, whereby a resultant geometrical index $N_{ge,co,2}$ of the second core region is lowered compared to $N_{co,2}$, and wherein $N_{ge,co,2} > N_{ge,cl,1}$, and $N_{ge,co,2} > N_{ge,cl,2}$.

13. The optical fiber according to claim 3 wherein the second core region further comprises low index second core features.

14. The optical fiber according to claim 1 wherein the first cladding features or elements are positioned equidistantly with respect to a center of the fiber.

15. The optical fiber according to claim 14 wherein the first cladding features or elements are of similar size.

16. The optical fiber according to claim 3 wherein the second core features or elements are positioned equidistantly with respect to a center of the fiber.

17. The optical fiber according to claim 16 wherein the second core features are of similar size.

18. The optical fiber according to claim 14 wherein the size of the second core features is larger or equal to the size of the first cladding features.

19. The optical fiber according to claim 14 wherein the size of the second core features is smaller or larger than the size of the first cladding features.

20. The optical fiber according to claim 1 wherein the optical fiber comprises silica glass and $N_{co,2}$ is equal to or larger than 1.444.

21. The optical fiber according to claim 1 wherein the number of first cladding features is in the range from 6 to 18.

22. The optical fiber according to claim 3 wherein the number of second core features is in the range from 6 to 18.

23. The optical fiber according to claim 22 wherein the second core features are characterized by a representative center-to-center distance, $\Lambda_{co,2}$ between two adjacent second core features.

24. The optical fiber according to claim 23 wherein the second core features are characterized by a cross-sectional dimension in the range from $0.2\Lambda_{co,2}$ to $0.9\Lambda_{co,2}$.

25. The optical fiber according to claim 1 wherein $N_{co,1}$ is in the range from 1.45 to 1.49, and $N_{cl,1}$ is in the range from 1.43 to 1.45, and $N_{co,2}$ is in the range from 1.44 to 1.47, and $N_{cl,2}$ is in the range from 1.43 to 1.45.

26. The optical fiber according to claim 1 wherein the first core region is micro-structured having one or more spaced apart first core features or elements that are elongated in the fiber axial direction and disposed in the first core material, each said first core feature having a refractive index being lower than $N_{co,1}$, whereby a resultant geometrical index $N_{ge,co,1}$ of the first core region is lowered compared to $N_{co,1}$, and wherein $N_{ge,co,1} > N_{ge,cl,1}$.

27. The optical fiber according to any one of the claim 1 wherein the first core region is micro-structured having one or more spaced apart first core features or elements that are elongated in the fiber axial direction and disposed in the first core material, each said first core feature or element having a refractive index being higher than $N_{co,1}$, whereby a resultant geometrical index $N_{ge,co,1}$ of the first core region is higher compared to $N_{co,1}$.

28. The optical fiber according to claim 27 wherein the optical fiber comprises one first core feature or element.

29. The optical fiber according to claim 28 wherein the first-core feature or element is not making contact with the first cladding features or elements.

30. The optical fiber according to claim 28 wherein the first core feature or element has a diameter in the range from 2 µm to 4 µm.

31. The optical fiber according to claim 28 wherein the first core feature or element has a diameter in the range from 0.5 to 0.8 times a center-to-center distance between two adjacent first cladding features or elements.

32. The optical fiber according to claim 28 wherein the first core region has a background material being identical to the first cladding background material.

33. The optical fiber according to claim 26 wherein $N_{ge,co,1}$ is larger than $N_{ge,co,2}$.

34. The optical fiber according to claim 26 wherein $N_{ge,co,1}$ is identical to $N_{ge,co,2}$.

35. The optical fiber according to claim 26 wherein $N_{ge,co,1}$ is lower than $N_{ge,co,2}$.

36. The optical fiber according to claim 1 wherein the first core material is a background material of the first core region, the first cladding material is a background material of the first cladding region, the second core material is a background material of the second core region, and/or the second cladding material is a background material of the second cladding region.

37. The optical fiber according to claim 1 wherein the first cladding region has a substantially annular shape in the cross section.

38. The optical fiber according to claim 1 wherein the second core region has a substantially annular shape in the cross section.

39. The optical fiber according to claim 1 wherein the second cladding region has a substantially annular shape in the cross section.

40. The optical fiber according to claim 1 wherein the fiber is dimensioned for transmitting or guiding light of one or more predetermined wavelengths.

41. The optical fiber according to claim 40 wherein one of said predetermined wavelengths is in the range from 1.3 μm to 1.7 μm.

42. The optical fiber according to claim 1 wherein said first core region has a first inscribed core diameter, $D_{co,1}$, being larger than 3 times said predetermined wavelength.

43. The optical fiber according to claim 1 wherein said first core region has a first inscribed core diameter, $D_{co,1}$, in the range from 4 μm to 25 μm.

44. The optical fiber according to claim 1 wherein said first core region has a varying refractive index profile, said varying refractive index profile having a highest refractive index equal to $N_{co,1}$, and said varying index profile being characterized by an α-profile, where α is in the range from 0 to 100.

45. The optical fiber according to claim 3 wherein said second core features are positioned sub-stantially circularly symmetric with respect to a center of said first core region.

46. The optical fiber according to claim 3 wherein said second core features are arranged in a single layer surrounding said first core region, such that a distance from a second core feature to a center of said first core region is substantially identical for all second core features.

47. The optical fiber according to claim 3 wherein said second core features are arranged in two or more layers surrounding said first core region.

48. An optical fiber according to claim 3 wherein $\Lambda_{co,2}$ is in the range from 0.2 μm to 20 μm.

49. The optical fiber according to claim 1 wherein said first cladding features are positioned substantially circularly symmetric with respect to a center of said first core region.

50. The optical fiber according to claim 1 wherein said first cladding features are arranged in a single layer surrounding said first core region, such that a distance from a first cladding feature to a center of said first core region is substantially identical for all first cladding features.

51. The optical fiber according to claim 1 wherein said first cladding features are arranged in two or more layers surrounding said first core region.

52. The optical fiber according to claim 1 wherein the number of said first cladding features is equal to or larger than 3.

53. The optical fiber according to claim 1 wherein said first cladding features have a diameter $D_{cl,1}$ and a center-to-center spacing between nearest first cladding features of $\Lambda_{cl,1}$, and $D_{cl,1}/\Lambda_{cl,1}$ is in the range from 0.2 to 0.8.

54. The optical fiber according to claim 53 wherein $D_{cl,1}$ is in the range from 0.1 μm to 10 μm.

55. The optical fiber according to claim 53 wherein $\Lambda_{cl,1}$ is in the range from 0.2 μm to 20 μm.

56. The optical fiber according to claim 5 wherein said second cladding features have a diameter $D_{cl,2}$ and a center-to-center spacing between nearest second cladding features of $\Lambda_{cl,2}$, where $D_{cl,2}/\Lambda_{cl,2}$ is in the range from 0.01 to 0.5.

57. The optical fiber according to claim 56 wherein $D_{cl,2}$ is in the range from 0.1 μm to 5 μm.

58. The optical fiber according to claim 56 wherein $\Lambda_{cl,2}$ is in the range from 0.2 μm to 20 μm.

59. The optical fiber according to claim 56 wherein $\Lambda_{cl,1}$ is larger than $\Lambda_{cl,2}$.

60. The optical fiber according to claim 56 wherein $\Lambda_{cl,1}$ is substantially identical to $\Lambda_{cl,2}$.

61. The optical fiber according to claim 56 wherein $D_{cl,1}$ is larger than $D_{cl,2}$.

62. The optical fiber according to claim 56 wherein $D_{cl,1}/\Lambda_{cl,1}$ and $D_{cl,2}/\Lambda_{cl,2}$ are substantially identical.

63. The optical fiber according to claim 1 wherein said optical fiber comprises one or more glass materials.

64. The optical fiber according to claim 63 wherein said optical fiber comprises silica.

65. The optical fiber according to claim 1 wherein said optical fiber comprises polymer.

66. The optical fiber according to claim 63 wherein said first cladding features, second core features, and/or second cladding features are voids comprising vacuum, air, or another gas.

67. The optical fiber according to claim 1 wherein said optical fiber has a non-circular shape of the outer cladding.

68. The optical fiber according to claim 67 wherein said outer shape has a predetermined orientation in the cross section, the predetermined orientation being determined from the position of said first cladding features.

69. The optical fiber according to claim 1 wherein said first core region has a non-circular shape in the cross section, such as an elliptical shape, providing a high birefringence in the optical fiber.

70. The optical fiber according to claim 1 wherein said first cladding region has a non-circular, inner shape in the cross section, such as an elliptical, inner shape, providing a high birefringence in the optical fiber.

71. The optical fiber according to claim 1 wherein said optical fiber guides light at a pre-determined wavelength in a single mode.

72. The optical fiber according to claim 1 wherein said optical fiber guides light at a pre-determined wavelength in a higher order mode.

73. The optical fiber according to claim 1 wherein the second core has a diameter larger than 10 μm.

74. The optical fiber according to claim 1 wherein the first core has a diameter larger than 3 μm.

75. The optical fiber according to claim 1 wherein the first core and the second core are separated by a distance of at least 3 μm.

76. The optical fiber according to claim 1 wherein the first core has a non-zero distance to a low-index feature of the first cladding.

77. The optical fiber according to claim 1 wherein light is propagating substantially in the first core.

78. The optical fiber according to claim 1 wherein light is coupled substantially to the first core.

79. The optical fiber according to claim 1 wherein the second core has a larger area than the first core.

80. The optical fiber according to claim 1 wherein the second core has an effective refractive index, $n_{co2,\mathit{eff}}$ being larger than $(n_{co,1,\mathit{eff}}+n_{cl,2,\mathit{eff}})/2$ or larger than $(n_{co,1,\mathit{eff}}+n_{cl,1,\mathit{eff}})/2$, where $n_{co,1,\mathit{eff}}$ is an effective refractive index of the first core region, $n_{cl,1,\mathit{eff}}$ is an effective refractive index of the first cladding region, and $n_{cl,2,\mathit{eff}}$ is an effective refractive index of the second cladding region.

81. The optical fiber according to claim 1 wherein the second core has a mean or geometric refractive index, $n_{co2,g}$ being larger than $(n_{co,1,g}+n_{cl,2,g})/2$ or larger than $(n_{co,1,g}+n_{cl,1,g})/2$, where $n_{co,1,g}$ is a mean or geometric refractive index of the first core region, $n_{cl,1,g}$ is a mean or geometric refractive index of the first cladding region, and $n_{cl,2,g}$ is a mean or geometric refractive index of the second cladding region.

82. The optical fiber according to claim 1 wherein said fiber is dimensioned to guide light in a single mode in the first core region at a first wavelength, $\lambda_1$, being in the range from 1500 to 1640 nm, and said optical fiber exhibits negative dispersion at $\lambda_1$.

83. The optical fiber according to claim 82 wherein the optical fiber is dimensioned to guide light in the second core region for light shorter than a cut-off wavelength, $\lambda_c$, where $\lambda_c$ is more than 30 nm shorter than $\lambda_1$.

84. An article comprising a module, said module being employed for dispersion compensation in an optical communication system, said module comprising an optical fiber according to claim 1.

85. An optical fiber for transmitting light, said optical fiber having an axial direction and a cross section perpendicular to said axial direction, said optical fiber comprising:
(1) a first core region comprising a first core material having a refractive index $N_{co,1}$ and at least one first core feature having a refractive being lower than $N_{co,1}$, whereby a resultant geometrical index $N_{ge,co,1}$ of the first core region is lowered compared to $N_{co,1}$,
(2) a micro-structured first cladding region, said first cladding region surrounding the first core region, and said first cladding region comprising a first cladding material and a plurality of spaced apart first cladding features that are elongated in the fiber axial direction and disposed in the first cladding material, said first cladding material having a refractive index $N_{cl,1}$ and each said first cladding feature having a refractive index being lower than $N_{cl,1}$ whereby a resultant geometrical index $N_{ge,cl,1}$ of the first cladding region is lowered compared to $N_{cl,1}$.
(3) a second core region, said second core region surrounding said first cladding region, and said second core region comprising a second core material having a refractive index $N_{co,2}$, and
(4) a micro-structured second cladding region, said second cladding region surrounding the second core region, and said second cladding region comprising a second cladding material and a plurality of spaced apart second cladding features that are elongated in the fiber axial direction and disposed in the second cladding material, said second cladding material having a refractive index $N_{cl,2}$ and each said second cladding feature having an refractive index being lower than $N_{cl,2}$, whereby a resultant geometrical index $N_{ge,cl,2}$ of the second cladding region is lowered compared to $N_{cl,2}$, wherein
the first core material, the first cladding material and the first cladding features, the second core material, and the second cladding material and the second cladding features are selected and arranged so that
$N_{co,1}>N_{ge,cl,1}$, $N_{co,2}>N_{ge,cl,2}$, $N_{ge,cl,1}<N_{ge,cl,2}$, and the second cladding features are placed in a substantially two dimensionally periodic structure, whereby the second cladding region exhibits photonic band gap effect.

86. The optical fiber according to claim 85 wherein said second cladding features are placed in a substantially two dimensional periodic structure.

87. The optical fiber according to claim 85 wherein said second cladding features are placed in a radial periodic structure.

88. The optical fiber according to claim 85 wherein the second core has a diameter larger than 10 µm.

89. The optical fiber according to claim 85 wherein the first core has a diameter larger than 3 µm.

90. The optical fiber according to claim 85 wherein the first core and the second core are separated by a distance of at least 3 µm.

91. The optical fiber according to claim 85 wherein the first core has a non-zero distance to a low-index feature of the first cladding.

92. The optical fiber according to claim 85 wherein light is propagating substantially in the first core.

93. The optical fiber according to claim 85 wherein light is coupled substantially to the first core.

94. The optical fiber according to claim 85 wherein the second core has a larger area than the first core.

95. The optical fiber according claim 85 wherein the second core has an effective refractive index, $n_{co2,\mathit{eff}}$ being larger than $(n_{co,1,\mathit{eff}}+n_{cl,2,\mathit{eff}})/2$ or larger than $(n_{co,1,\mathit{eff}}+n_{cl,1,\mathit{eff}})/2$, where $n_{co,1,\mathit{eff}}$ is an effective refractive index of the first core region, $n_{cl,1,\mathit{eff}}$ is an effective refractive index of the first cladding region, and $n_{cl,2,\mathit{eff}}$ is an effective refractive index of the second cladding region.

96. The optical fiber according to claim 85 wherein the second core has a mean or geometric refractive index, $n_{co2,g}$ being larger than $(n_{co,1,g}+n_{cl,2,g})/2$ or larger than $(n_{co,1,g}+n_{cl,1,g})/2$, where $n_{co,1,g}$ is a mean or geometric refractive index of the first core region, $n_{cl,1,g}$ is a mean or geometric refractive index of the first cladding region, and $n_{cl,2,g}$ is a mean or geometric refractive index of the second cladding region.

97. The optical fiber according to claim 85 wherein said fiber is dimensioned to guide light in a single mode in the first core region at a first wavelength, $\lambda_1$, being in the range from 1500 to 1640 nm, and said optical fiber exhibits negative dispersion at $\lambda_1$.

98. The optical fiber according to claim 97 wherein the optical fiber is dimensioned to guide light in the second core region for light shorter than a cut-off wavelength, $\lambda_c$, where $\lambda_c$ is more than 30 nm shorter than $\lambda_1$.

99. An article comprising a module, said module being employed for dispersion compensation in an optical communication system, said module comprising an optical fiber according to claim 85.

100. An optical fiber f or transmitting or guiding light, said optical fiber having an axial direction and a cross section perpendicular to said axial direction, said optical fiber comprising:
(1) a first core region comprising a first core material having a refractive index $N_{co,1}$,
(2) a microstructured first cladding region surrounding the first core region, said first cladding region comprising a first cladding material and a plurality of spaced apart first cladding features or elements that are elongated in the fiber axial direction and disposed in the first cladding material, said first cladding material having a refractive index $N_{cl,1}$ and each said first cladding feature or element having a refractive index being lower than $N_{cl,1}$, whereby a resultant geometrical index $N_{ge,cl,1}$ of the first cladding region is lowered compared to $N_{cl,1}$, (3) a second core region surrounding said first cladding region, said second core region comprising a second core material having a refractive index $N_{co,2}$, and (4) a micro-structured second cladding region surrounding the second core region, said second cladding region comprising a second cladding material and a plurality of spaced apart second cladding features or elements that are elongated in the fiber axial direction and disposed in the second cladding material, said second cladding material having a refractive index $N_{cl,2}$ and each said second cladding feature or element having an refractive index being lower than $N_{cl,2}$ whereby a resultant geometrical index $N_{ge,cl,2}$ of the second cladding region is lowered compared to $N_{cl,2}$, wherein the first core material, the first cladding material and the first cladding features or elements, the second core material, and the second cladding material and the second cladding features or elements are selected and arranged so that $N_{co,1} > N_{ge,cl,1}$, $N_{co,2} > N_{ge,cl,1}$, and $N_{co,2} > N_{ge,cl,2}$.

101. The optical fiber according to claim 100 wherein the second core region is micro-structured having a plurality of spaced apart second core features or elements that are elongated in the fiber axial direction and disposed in the second core material, each said second core feature or element having a refractive index being higher than $N_{co,2}$, whereby a resultant geometrical index $N_{ge,co,2}$ of the second core region is higher compared to $N_{co,2}$.

102. The optical fiber according to claim 101 wherein $N_{co,1}$ is larger than $N_{ge,co,2}$.

103. The optical fiber according to claim 101 wherein $N_{co,1}$ is identical to $N_{ge,co,2}$.

104. The optical fiber according to claim 101 wherein $N_{co,1}$ is lower than $N_{ge,co,2}$.

105. The optical fiber according to claim 101 wherein the number of said second core features is equal to or larger than 6.

106. The optical fiber according to claim 101 wherein said second core features have a diameter $D_{co,2}$ and a center-to-center spacing between nearest second core features of $\Lambda_{co,2}$, and $D_{co,2}/\Lambda_{co,2}$ is in the range from 0.01 to 0.5.

107. The optical fiber according to claim 106 wherein $D_{co,2}$ is in the range from 0.1 μm to 5 μm.

108. The optical fiber according to claim 100 wherein said first cladding features have a diameter $D_{cl,1}$ and a center-to-center spacing between nearest first cladding features of $\Lambda_{cl,1}$, and $D_{cl,1}/\Lambda_{cl,1}$ is in the range from 0.2 to 0.8.

109. The optical fiber according to claim 108 wherein $D_{cl,1}/\Lambda_{cl,1}$ is larger than $D_{co,2}/\Lambda_{co,2}$.

110. An optical fiber for transmitting light, said optical fiber having an axial direction and a cross section perpendicular to said axial direction, said optical fiber comprising:

(1) a first core region comprising a first core material having a refractive index $N_{co,1}$ and at least one first core feature having a refractive being lower than $N_{co,1}$, whereby a resultant geometrical index $N_{ge,co,1}$ of the first core region is lowered compared to $N_{co,1}$, (2) a micro-structured first cladding region, said first cladding region surrounding the first core region, and said first cladding region comprising a first cladding material and a plurality of spaced apart first cladding features that are elongated in the fiber axial direction and disposed in the first cladding material, said first cladding material having a refractive index $N_{cl,1}$ and each said first cladding feature having a refractive index being lower than $N_{cl,1}$, whereby a resultant geometrical index $N_{ge,cl,1}$ of the first cladding region is lowered compared to $N_{cl,1}$, (3) a second core region, said second core region surrounding said first cladding region, and said second core region comprising a second core material having a refractive index $N_{co,2}$, and (4) a micro-structured second cladding region, said second cladding region surrounding the second core region, and said second cladding region comprising a second cladding material and a plurality of spaced apart second cladding features that are elongated in the fiber axial direction and disposed in the second cladding material said second cladding material having a refractive index $N_{cl,2}$ and each said second cladding feature having an refractive index being lower than $N_{cl,2}$, whereby a resultant geometrical index $N_{ge,cl,2}$ of the second cladding region is lowered compared to $N_{cl,2}$, wherein the first core material, the first cladding material and the first cladding features, the second core material, and the second cladding material and the second cladding features are selected and arranged so that $N_{co,1} > N_{ge,cl,1}$, $N_{co,2} > N_{ge,cl,1}$, $N_{co,2} > N_{ge,cl,2}$, $N_{ge,co,1} < N_{ge,cl,2}$, and the second cladding features are placed so that the second cladding region exhibits photonic band gap effect.

111. The optical fiber according to claim 110 wherein the second core has a diameter larger than 10 μm.

112. The optical fiber according to claim 110 wherein the first core has a diameter larger than 3 μm.

113. The optical fiber according to claim 110 wherein the first core and the second core are separated by a distance of at least 3 μm.

114. The optical fiber according to claim 110 wherein the first core has a non-zero distance to a low-index feature of the first cladding.

115. The optical fiber according to claim 110 wherein light is propagating substantially in the first core.

116. The optical fiber according to claim 110 wherein light is coupled substantially to the first core.

117. The optical fiber according to claim 110 wherein the second core has a larger area than the first core.

118. The optical fiber according to claim 110 wherein the second core has an effective refractive index, $n_{co2,eff}$ being larger than $(n_{co,1,eff} + n_{cl,2,eff})/2$ or larger than $(n_{co,1,eff} + n_{cl,1,eff})/2$, where $n_{co,1,eff}$ is an effective refractive index of the first core region, $n_{cl,1,eff}$ is an effective refractive index of the first cladding region, and $n_{cl,2,eff}$ is an effective refractive index of the second cladding region.

119. The optical fiber according to claim 110 wherein the second core has a mean or geometric refractive index, $n_{co2,g}$ being larger than $(n_{co,1,g} + n_{cl,2,g})/2$ or larger than $(n_{co,1,g} + n_{cl,1,g})/2$, where $n_{co,1,g}$ is a mean or geometric refractive index of the first core region, $n_{cl,1,g}$ is a mean or geometric refractive index of the first cladding region, and $n_{cl,2,g}$ is a mean or geometric refractive index of the second cladding region.

120. The optical fiber according to claim 110 wherein said fiber is dimensioned to guide light in a single mode in the first core region at a first wavelength, $\lambda_1$, being in the range from 1500 to 1640 nm, and said optical fiber exhibits negative dispersion at $\lambda_1$.

121. The optical fiber according to claim 120 wherein the optical fiber is dimensioned to guide light in the second core region for light shorter than a cut-off wavelength, $\lambda_c$, where $\lambda_c$ is more than 30 nm shorter than $\lambda_1$.

122. An article comprising a module, said module being employed for dispersion compensation in an optical communication system, said module comprising an optical fiber according to claim 110.

123. The article according to claim 122 wherein the dispersion compensating fiber has a relative dispersion slope of more than 0.01 nm$^{-1}$.

124. An article comprising a module, said module being employed for dispersion compensation in an optical communication system, said module comprising an optical fiber according to claim 110.

* * * * *